United States Patent
Kim et al.

(10) Patent No.: US 10,321,358 B2
(45) Date of Patent: Jun. 11, 2019

(54) METHOD FOR TRANSMITTING AND RECEIVING DATA IN WIRELESS COMMUNICATION SYSTEM, AND DEVICE THEREFOR

(71) Applicant: LG ELECTRONICS INC., Seoul (KR)

(72) Inventors: Taehun Kim, Seoul (KR); Sungduck Chun, Seoul (KR); Jinsook Ryu, Seoul (KR); Laeyoung Kim, Seoul (KR); Jaehyun Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/576,690

(22) PCT Filed: May 23, 2016

(86) PCT No.: PCT/KR2016/005452
§ 371 (c)(1),
(2) Date: Nov. 22, 2017

(87) PCT Pub. No.: WO2016/190641
PCT Pub. Date: Dec. 1, 2016

(65) Prior Publication Data
US 2018/0139651 A1    May 17, 2018

Related U.S. Application Data

(60) Provisional application No. 62/165,205, filed on May 22, 2015, provisional application No. 62/188,470, (Continued)

(51) Int. Cl.
*H04W 28/06*    (2009.01)
*H04L 5/00*    (2006.01)
(Continued)

(52) U.S. Cl.
CPC ............. *H04W 28/065* (2013.01); *H04L 5/00* (2013.01); *H04L 29/12* (2013.01); *H04W 8/24* (2013.01);
(Continued)

(58) Field of Classification Search
None
See application file for complete search history.

(56) References Cited

U.S. PATENT DOCUMENTS

2004/0148425 A1* 7/2004 Haumont .......... H04L 29/06027
709/236
2012/0092992 A1    4/2012 Pappas et al.
(Continued)

FOREIGN PATENT DOCUMENTS

EP    2843885    3/2015
WO    2014/013057    1/2014
(Continued)

OTHER PUBLICATIONS

PCT International Application No. PCT/KR2016/005452, Written Opinion of the International Searching Authority dated Aug. 29, 2016, 12 pages.
(Continued)

*Primary Examiner* — Kodzovi Acolatse
(74) *Attorney, Agent, or Firm* — Lee, Hong, Degerman, Kang & Waimey

(57) ABSTRACT

A method for transmitting and receiving data in a wireless communication system, and a device therefor are disclosed. Particularly, a method for transmitting downlink data in a packet data network gateway (P-GW) in a wireless communication system can comprise the steps of: receiving, from an application server, downlink data in which an Internet protocol (IP) header including an IP address of a terminal is encapsulated; removing the IP header from the downlink
(Continued)

data; and transmitting, to a serving gateway (S-GW), the downlink data from which the IP header is removed through a bearer identified by the IP address of the terminal, so as to transmit, to the terminal, the downlink data from which the IP header is removed.

17 Claims, 31 Drawing Sheets

Related U.S. Application Data filed on Jul. 2, 2015, provisional application No. 62/212,596, filed on Sep. 1, 2015.

(51) Int. Cl.

| | |
|---|---|
| *H04L 29/12* | (2006.01) |
| *H04W 88/16* | (2009.01) |
| *H04W 8/24* | (2009.01) |
| *H04W 72/12* | (2009.01) |
| *H04W 76/12* | (2018.01) |
| *H04W 4/70* | (2018.01) |

(52) U.S. Cl.
CPC ..... *H04W 72/121* (2013.01); *H04W 72/1236* (2013.01); *H04W 72/1273* (2013.01); *H04W 76/12* (2018.02); *H04W 88/16* (2013.01); *H04W 4/70* (2018.02)

(56) References Cited

U.S. PATENT DOCUMENTS

| | | | |
|---|---|---|---|
| 2012/0182934 A1 | 7/2012 | Diachina et al. | |
| 2014/0105011 A1* | 4/2014 | Chandramouli | H04W 4/08 370/230 |
| 2014/0185438 A1 | 7/2014 | Patel et al. | |
| 2014/0314088 A1* | 10/2014 | Li | H04W 28/06 370/392 |
| 2016/0302121 A1* | 10/2016 | Kim | H04W 36/14 |
| 2016/0353337 A1* | 12/2016 | Zhu | H04W 36/0055 |

FOREIGN PATENT DOCUMENTS

| | | | | |
|---|---|---|---|---|
| WO | 2014058219 | | 4/2014 | |
| WO | 2015028058 | | 3/2015 | |
| WO | WO 2017/032399 | * | 8/2015 | ............ H04W 28/06 |
| WO | WO 2016/071311 | * | 11/2015 | ............ H04W 76/02 |

OTHER PUBLICATIONS

European patent application No. 16800280.6, European search report dated Dec. 19, 2018, 13 pages.

\* cited by examiner

[FIG. 1]
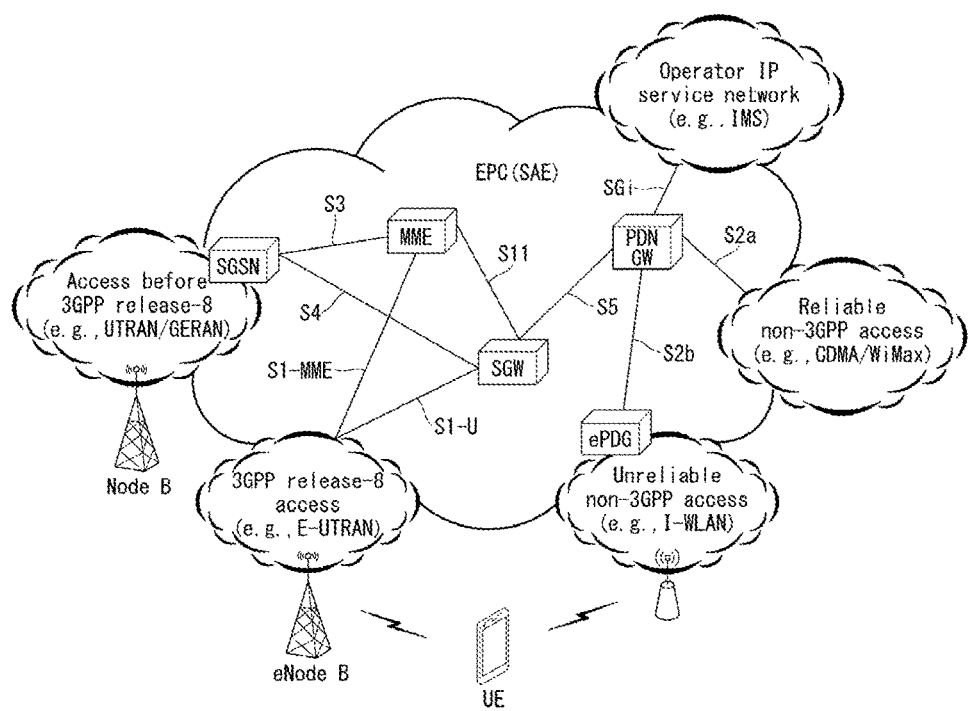

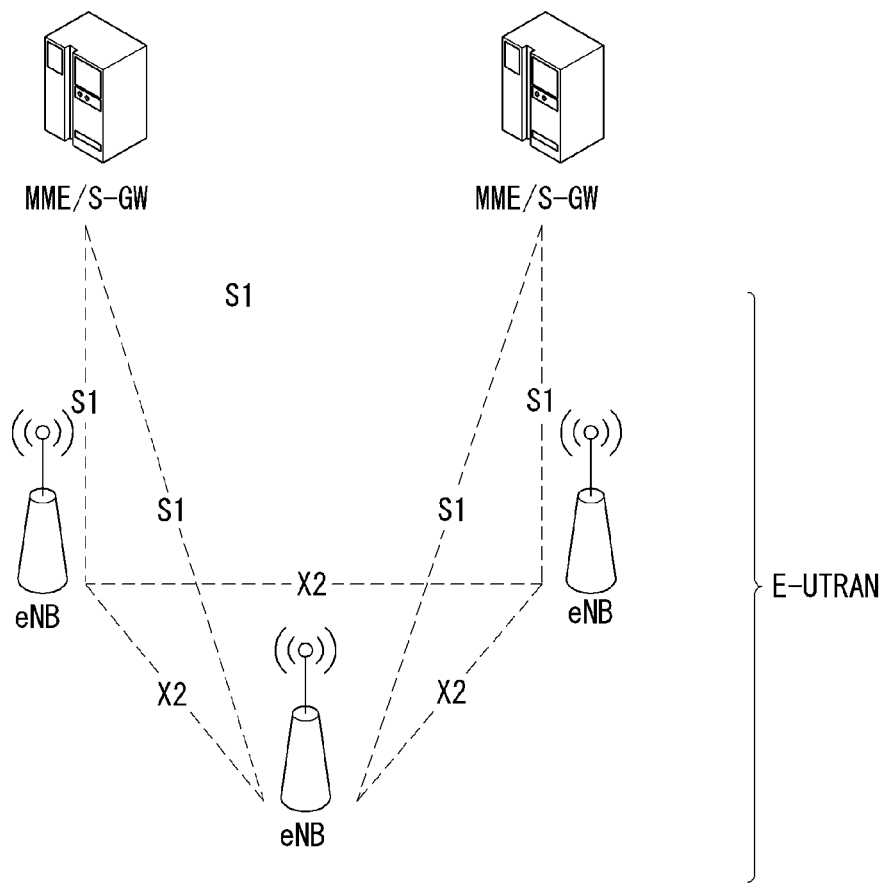
[FIG. 2]

[FIG. 3]
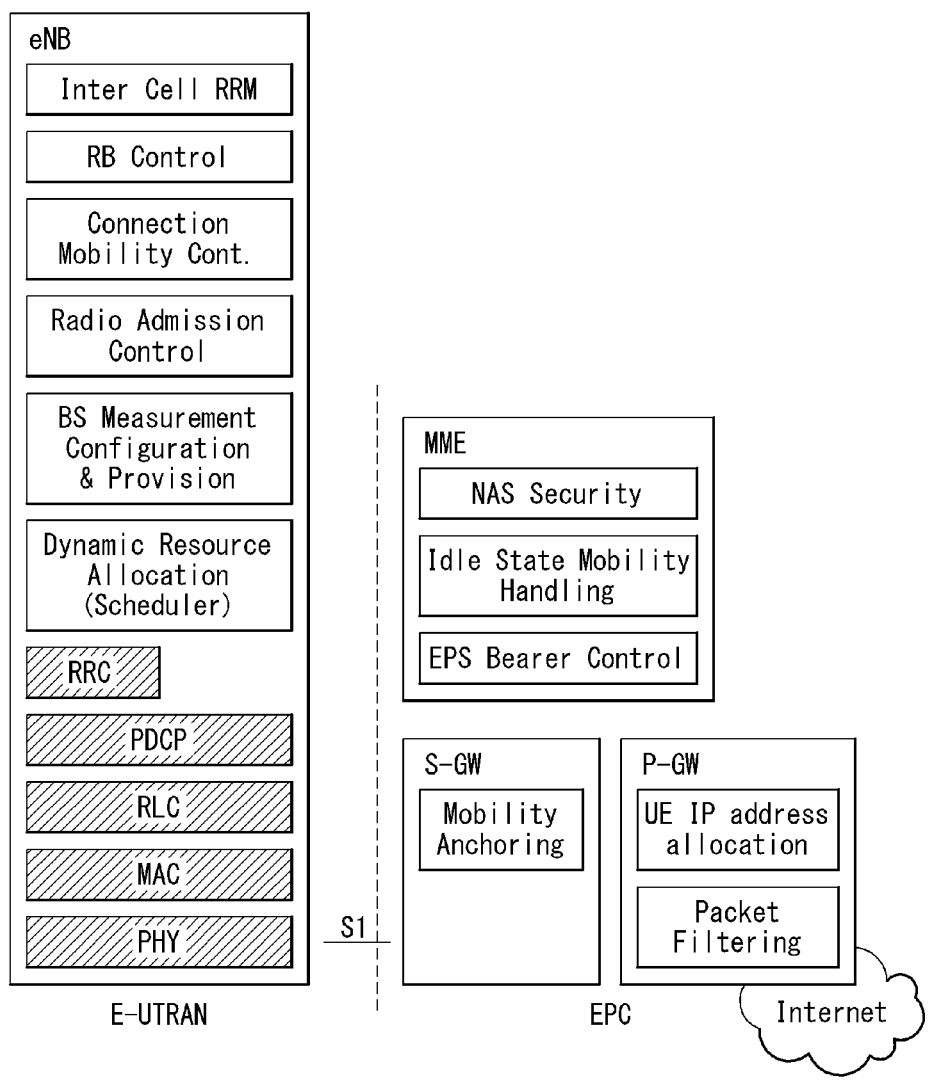

[FIG. 4]
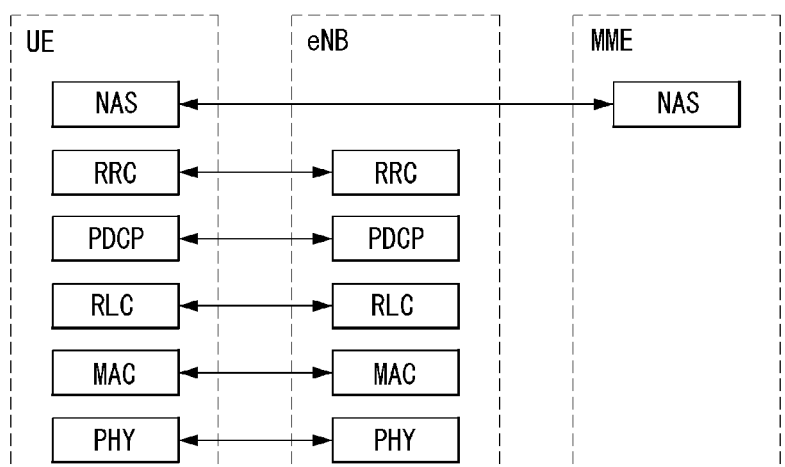
(a) Control plane protocol stack
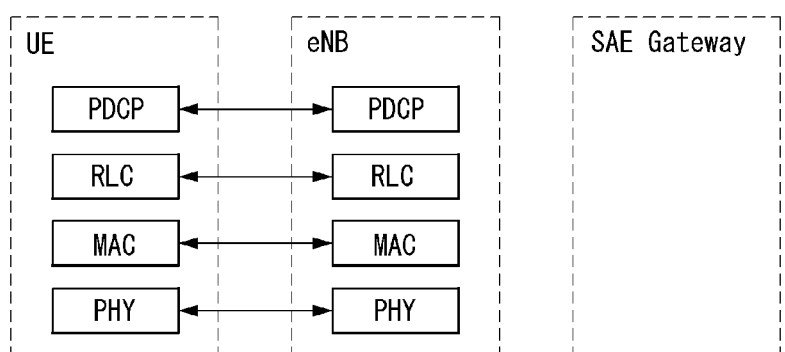
(b) User plane protocol stack

[FIG. 5]
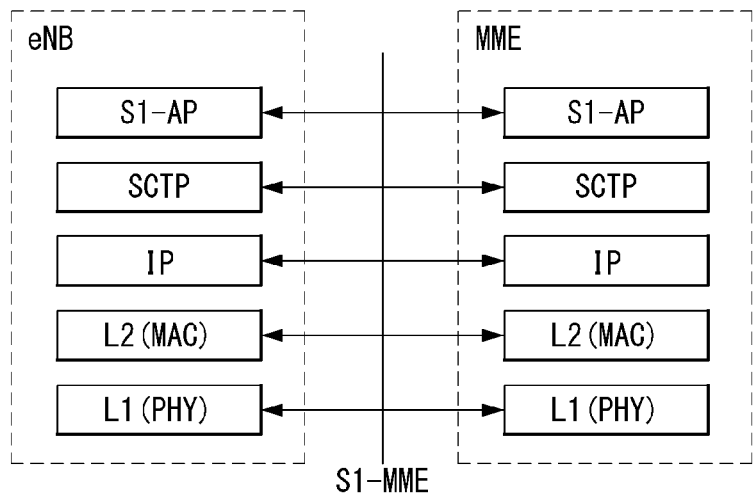
(a) Control plane protocol stack
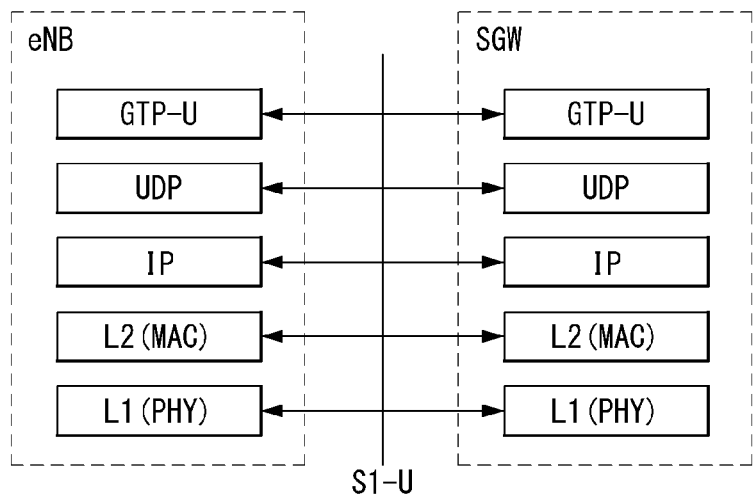
(b) User plane protocol stack

[FIG. 6]
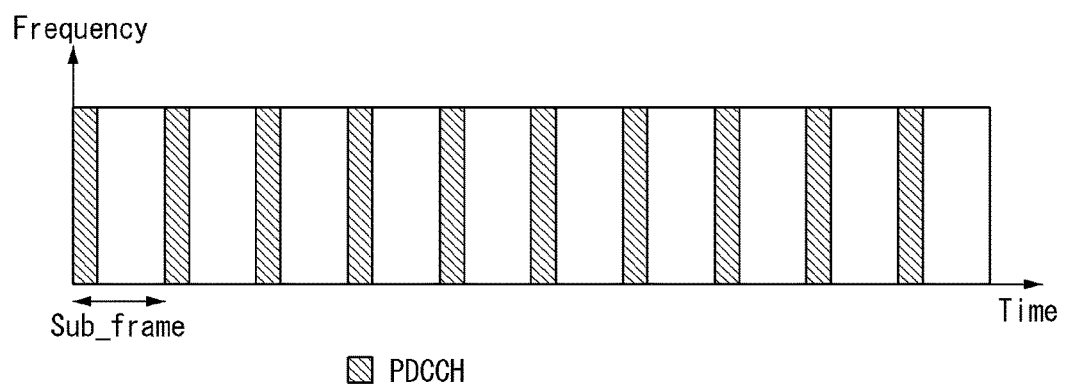
[FIG. 7]
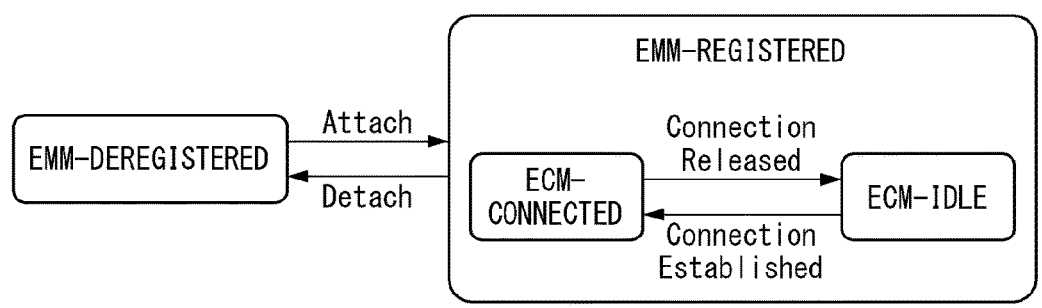

[FIG. 8]
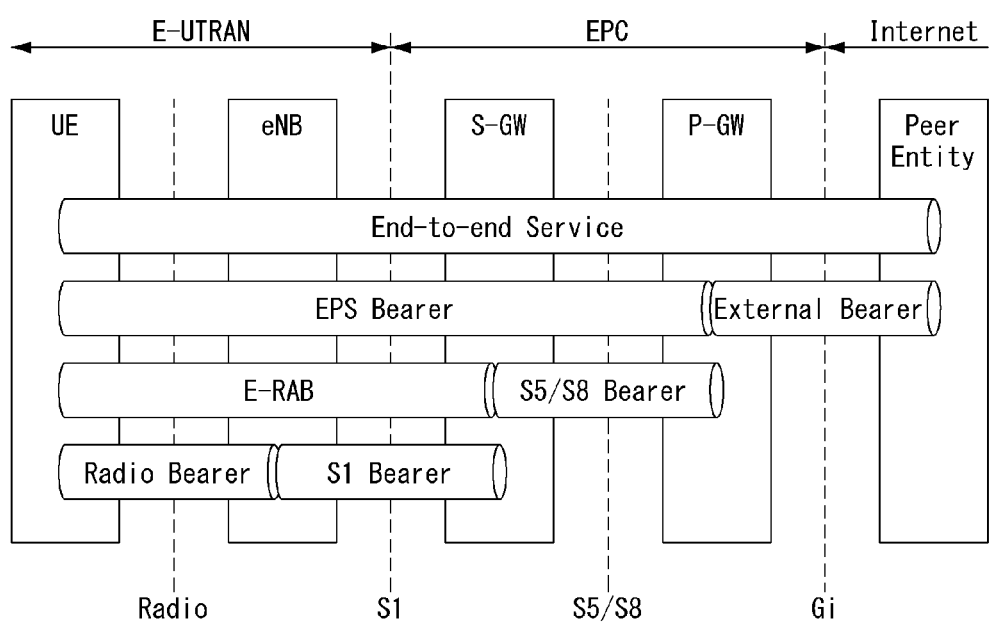

[FIG. 9]
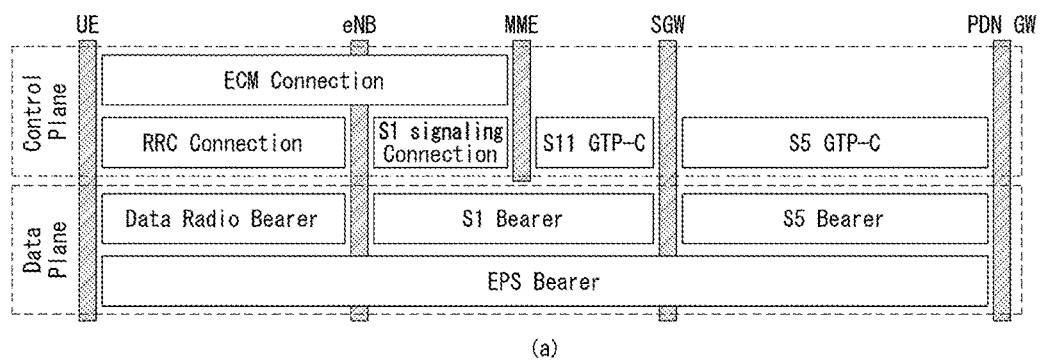
(a)
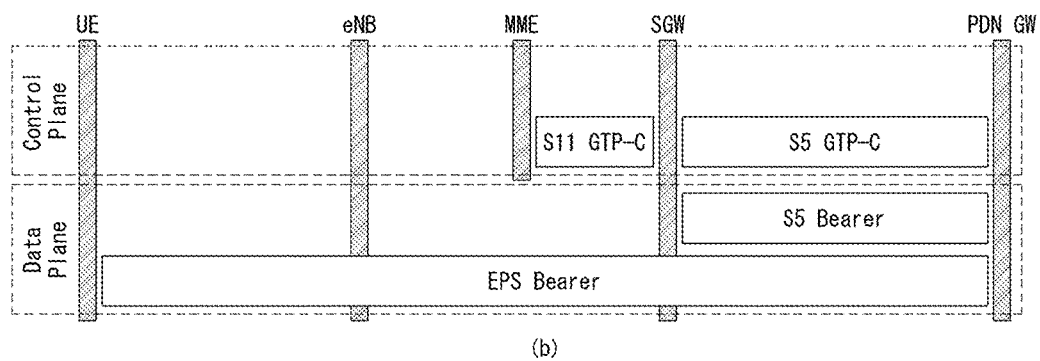
(b)

【FIG. 10】
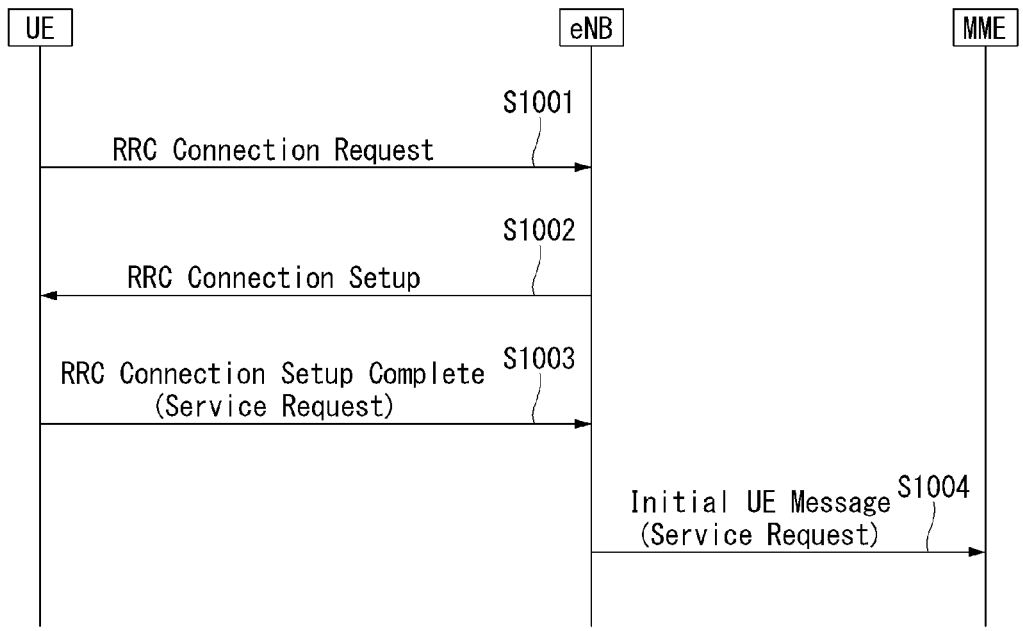
【FIG. 11】
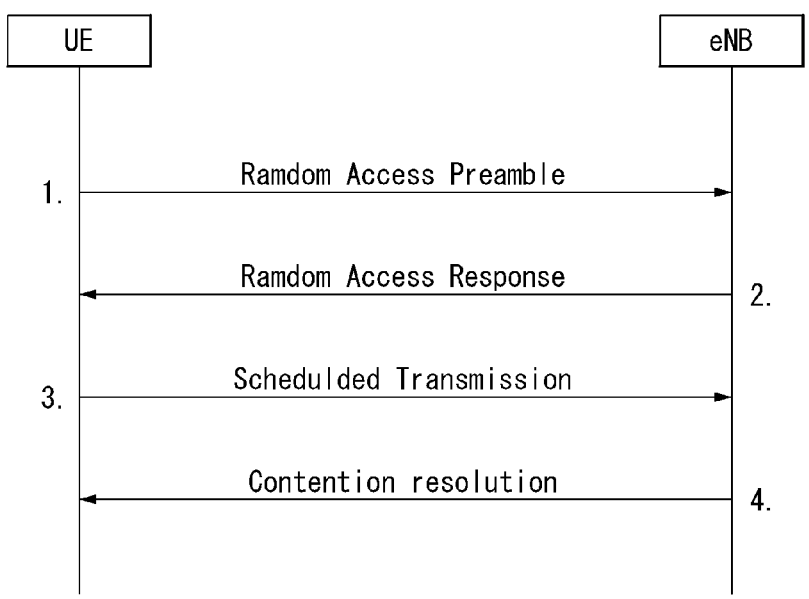

[FIG. 12]
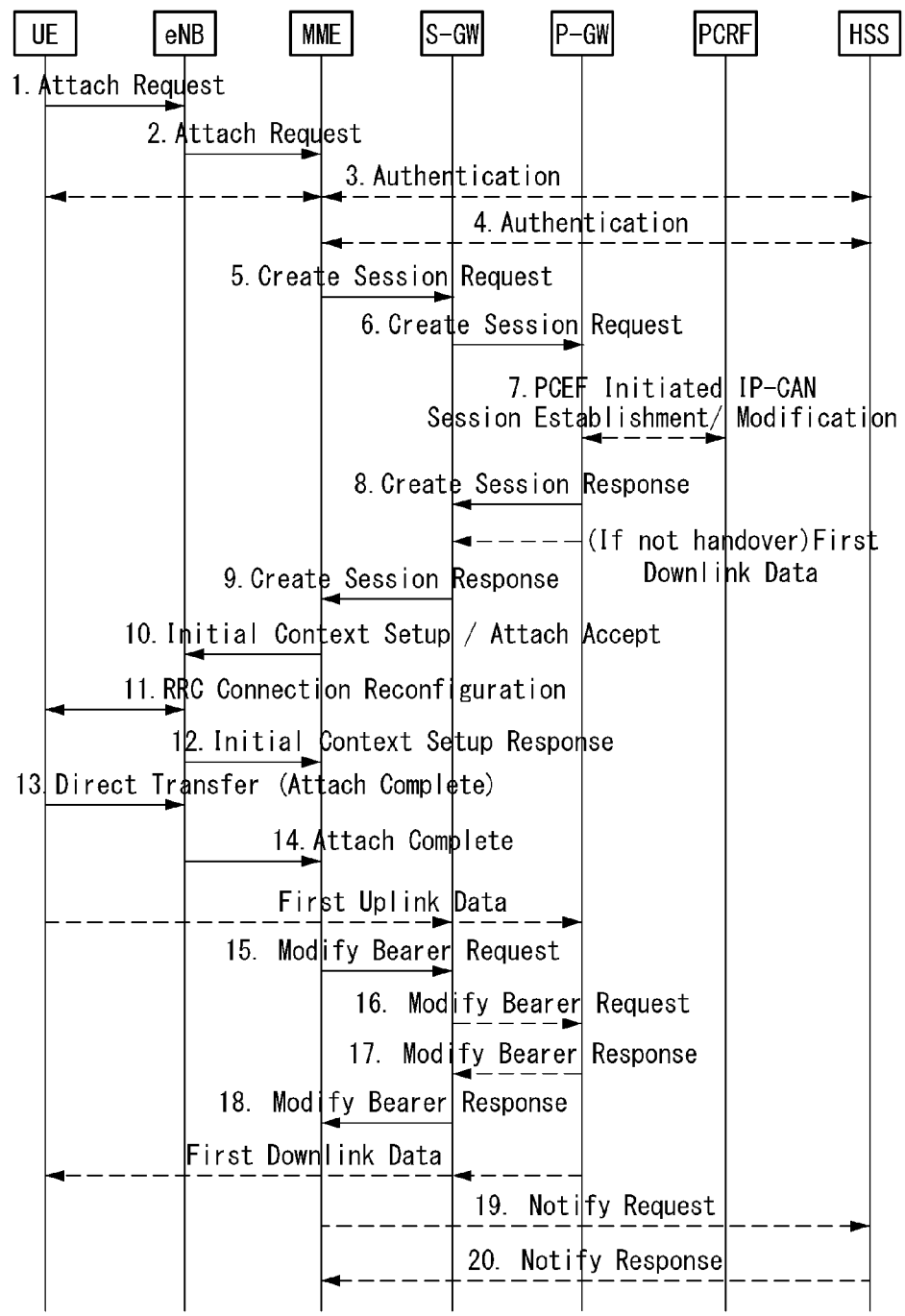

[FIG. 13]
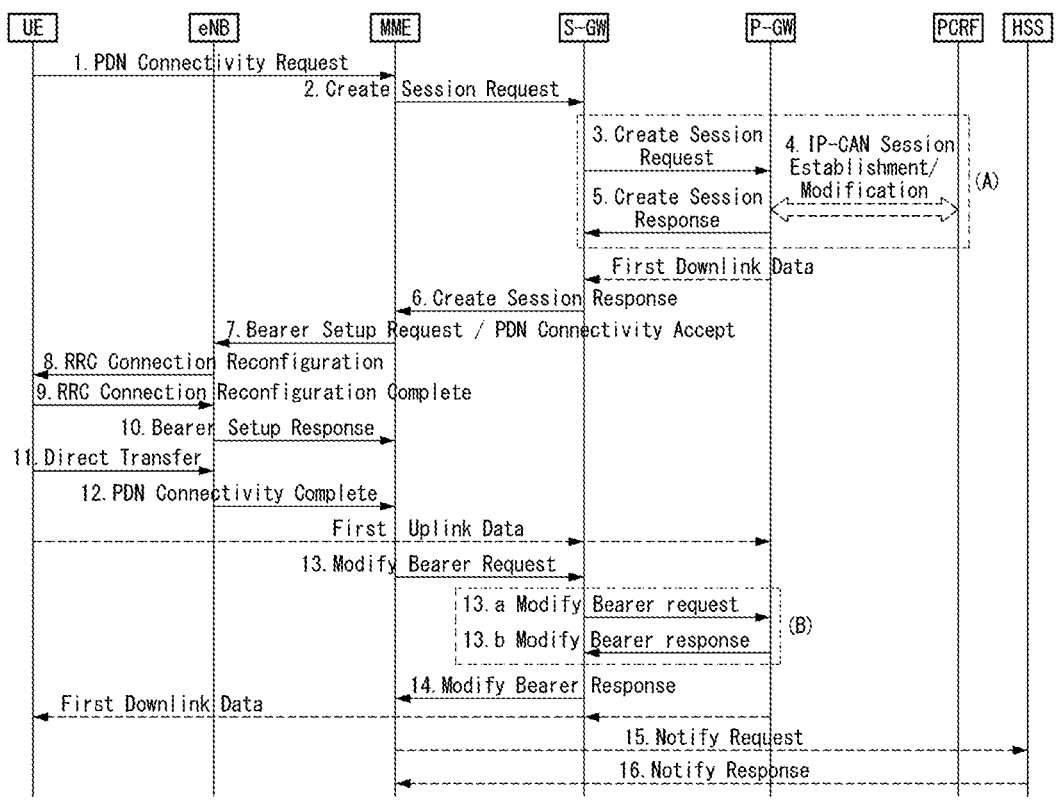

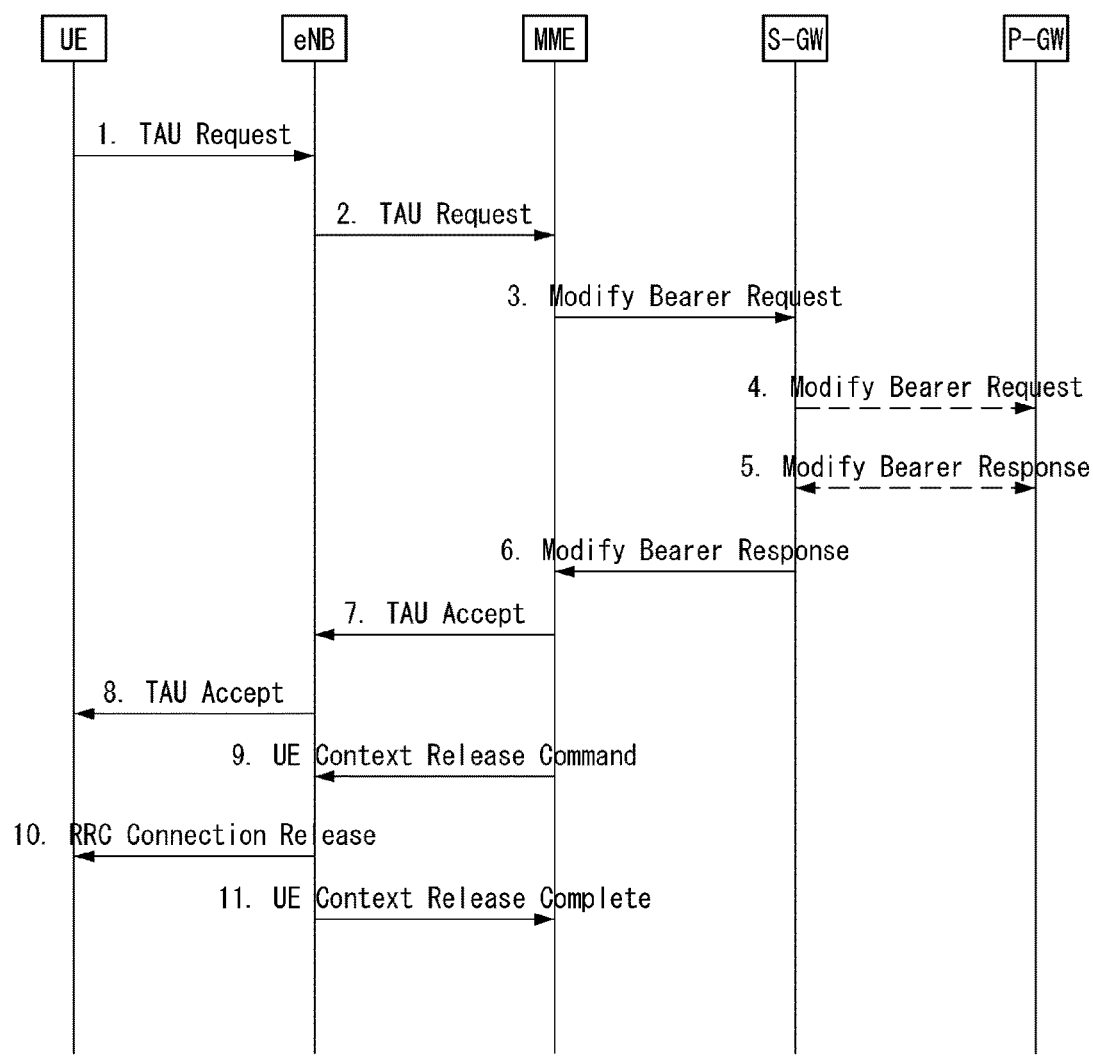
[FIG. 14]

【FIG. 15】
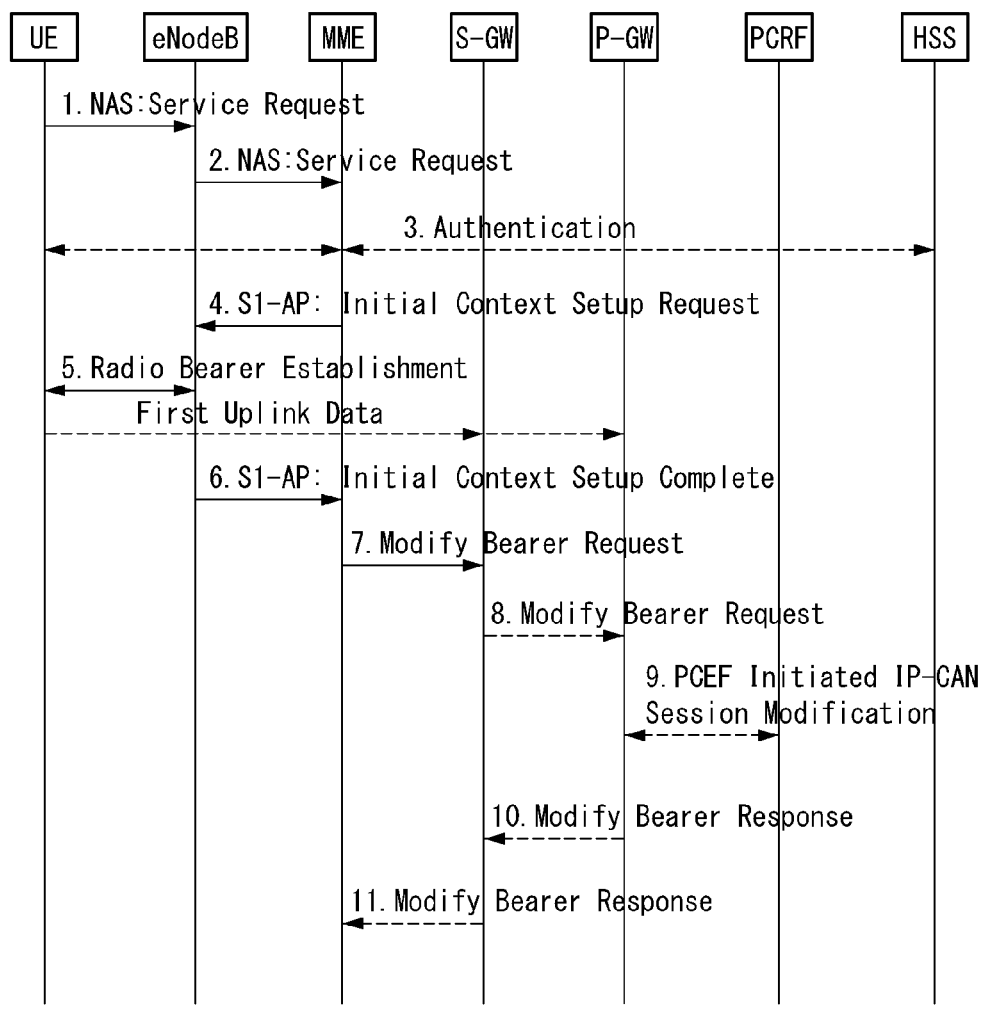

[FIG. 16]
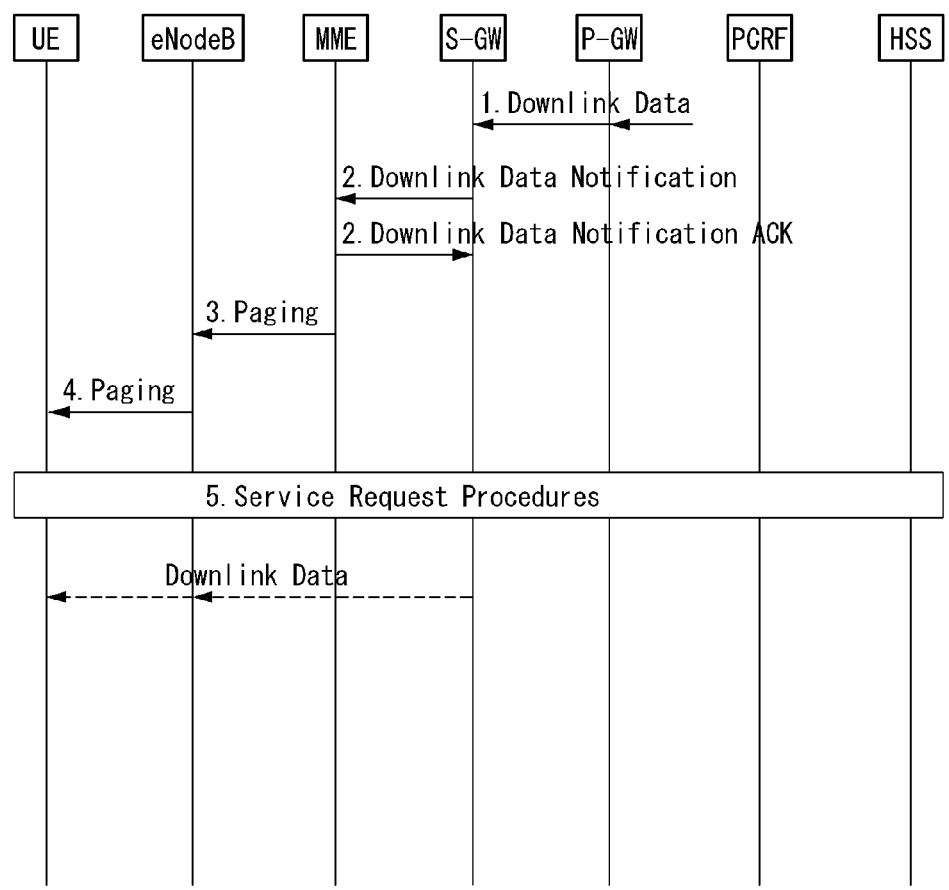

[FIG. 17]
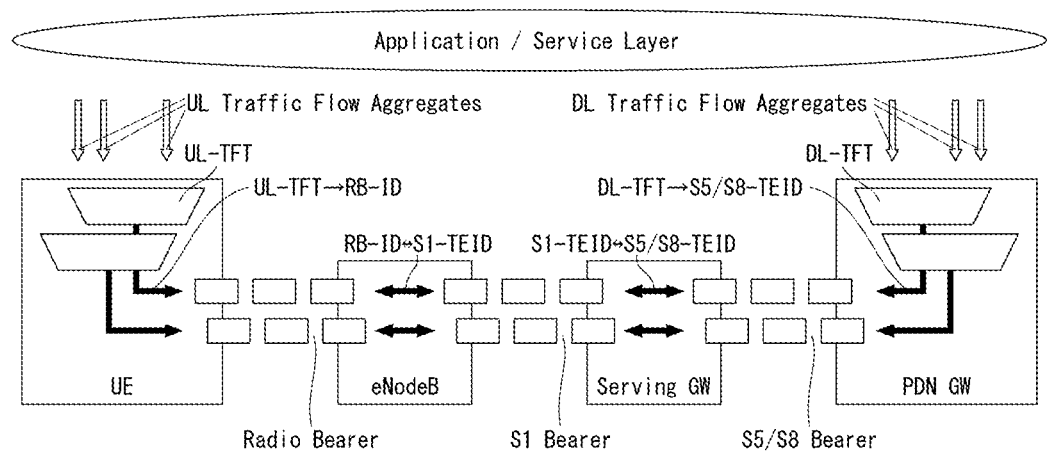

[FIG. 18]
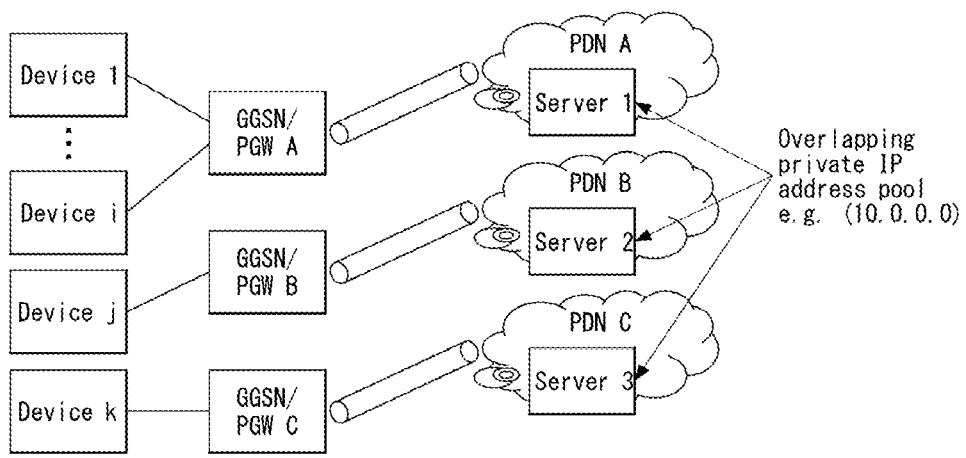

【FIG. 19】
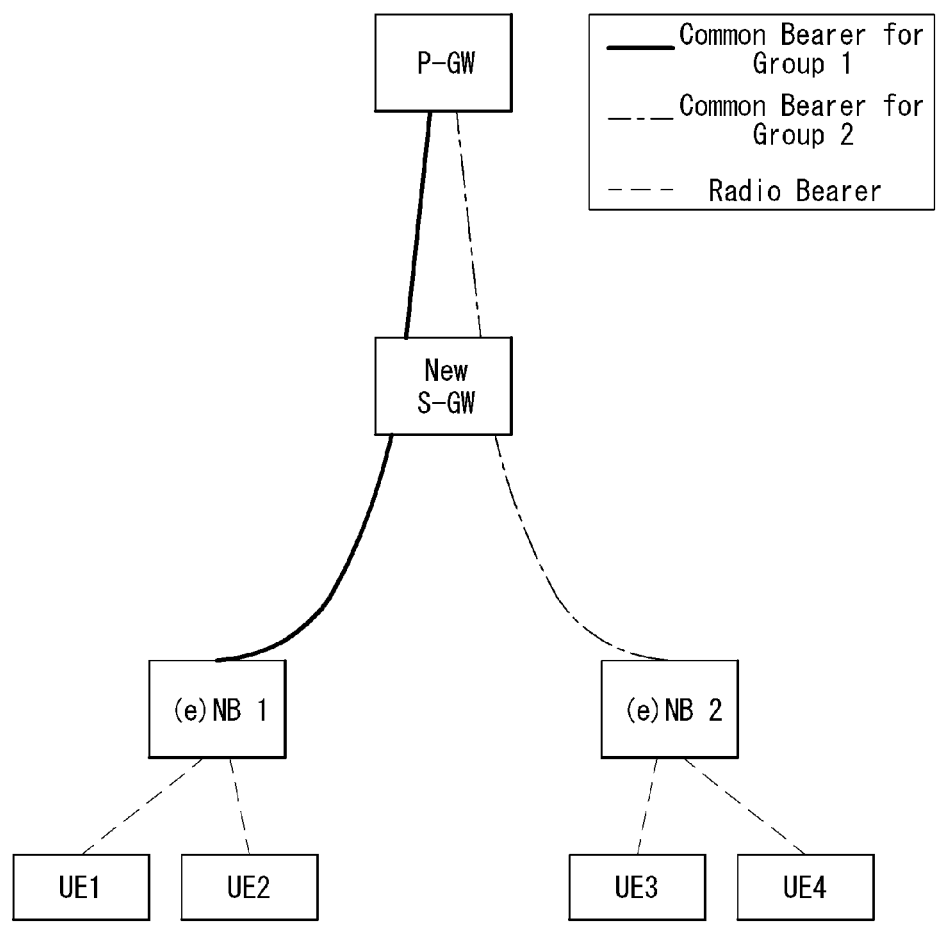

[FIG. 20]
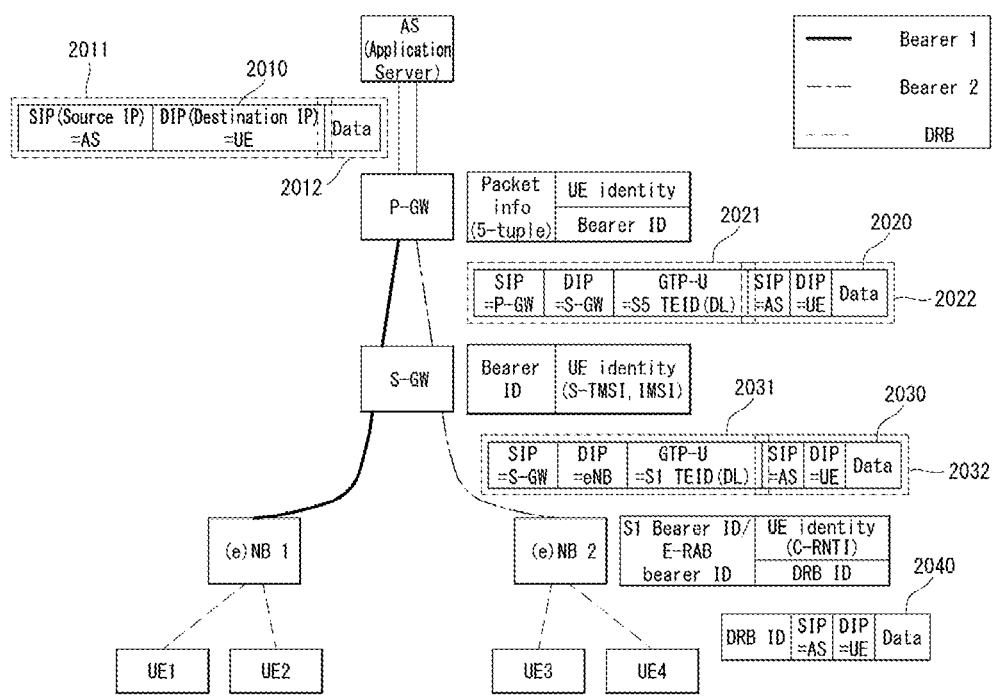

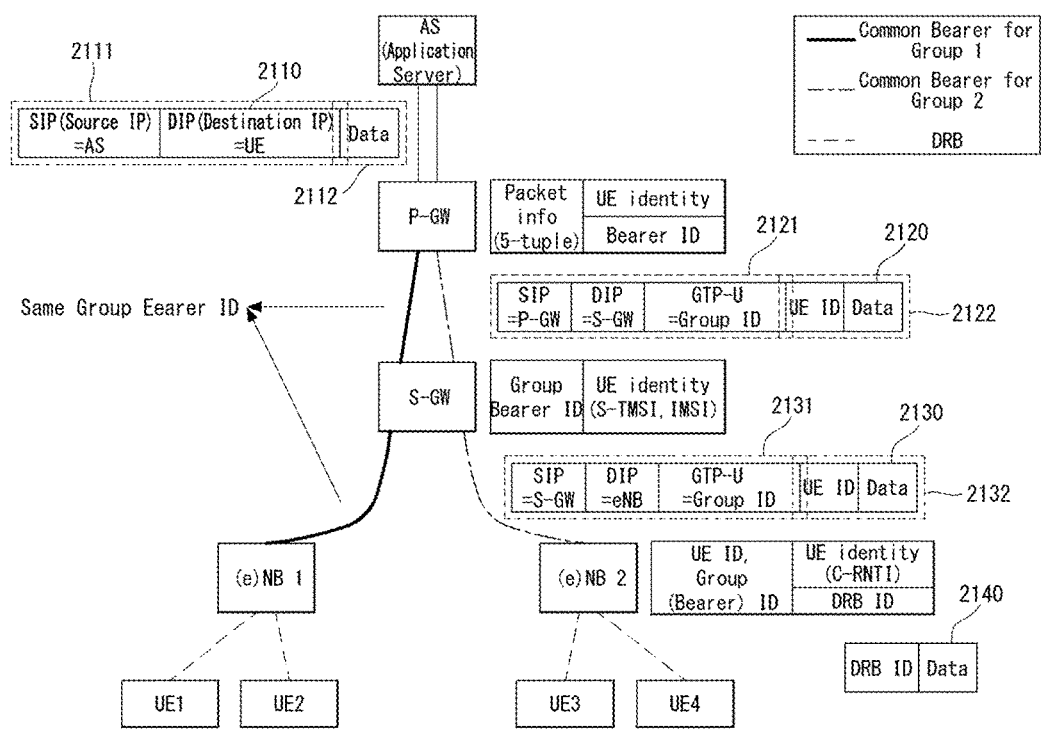
[FIG. 21]

[FIG. 22A]
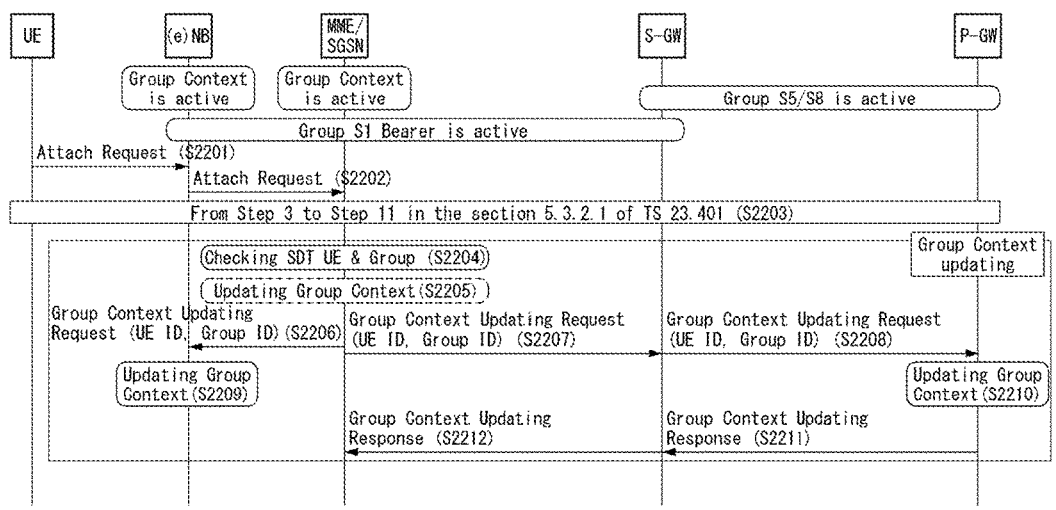

[FIG. 22B]
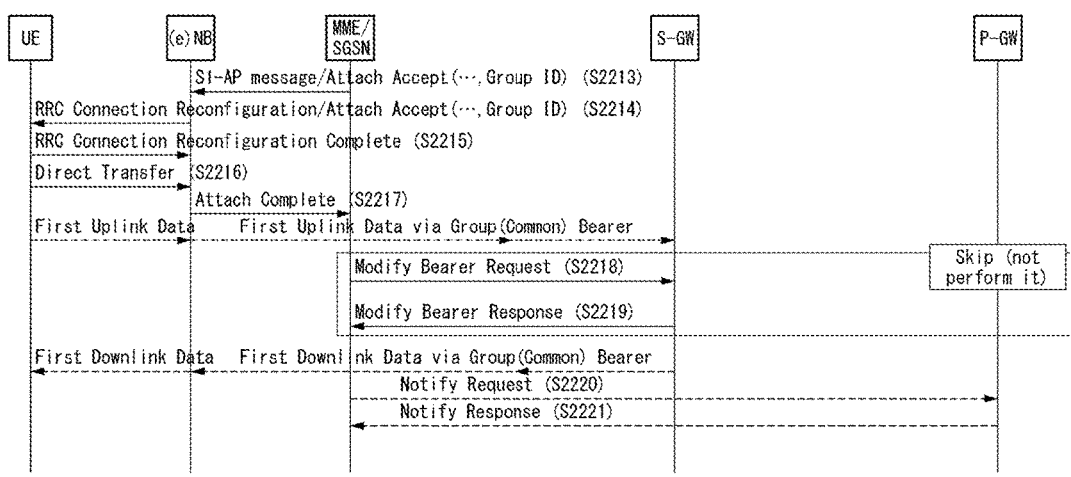

[FIG. 23]
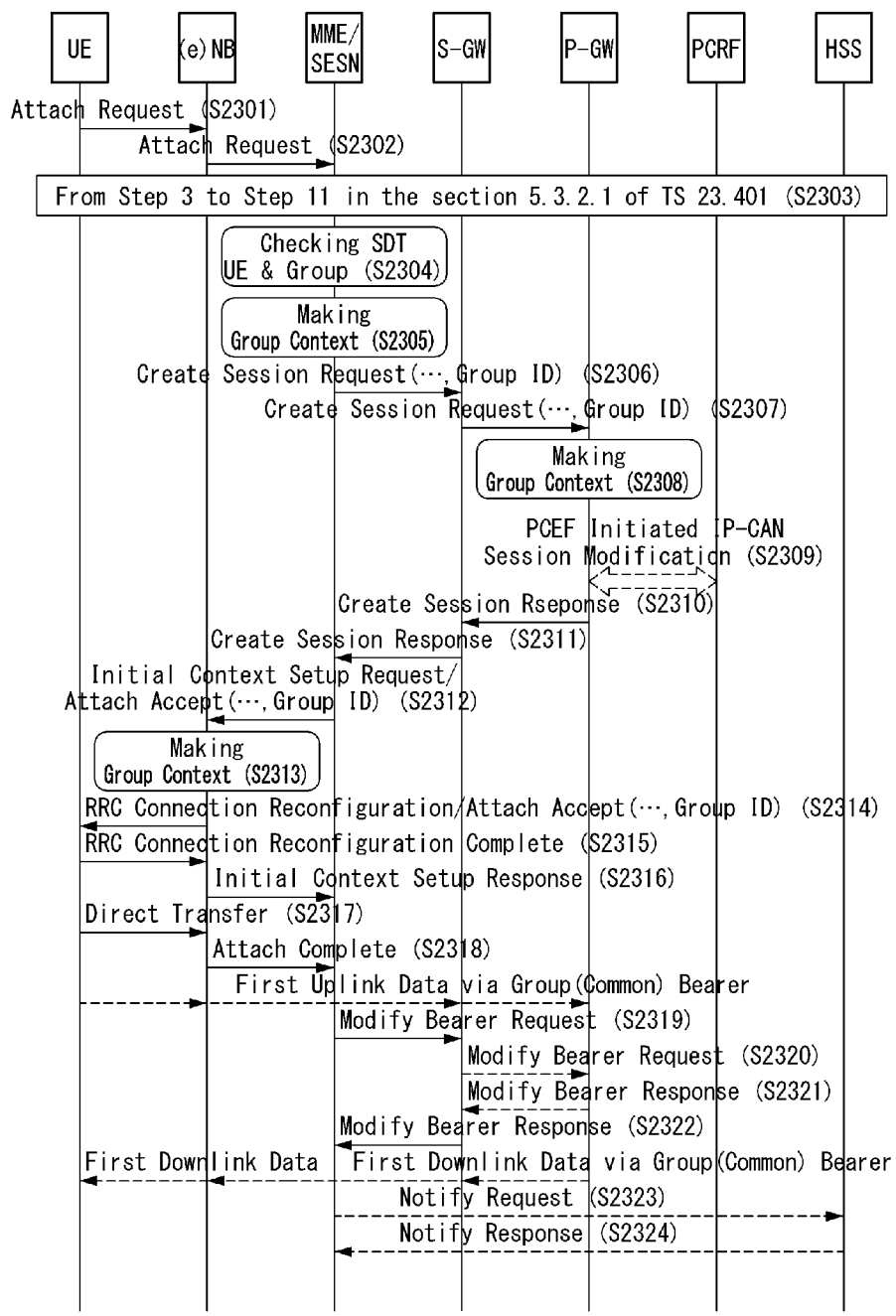

[FIG. 24A]
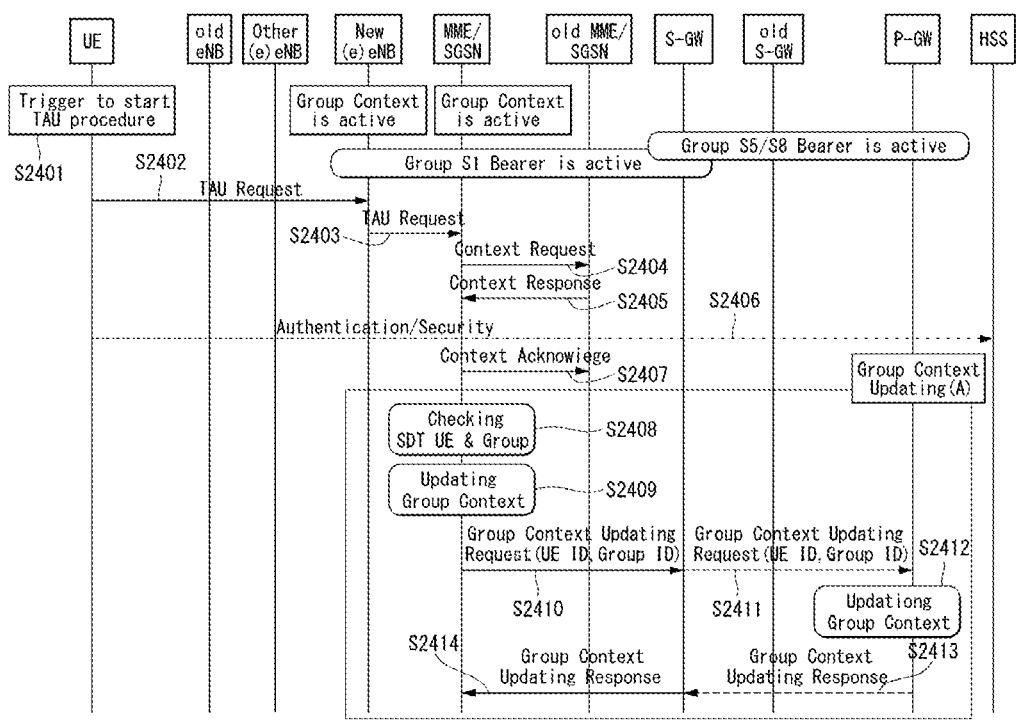

【FIG. 24B】
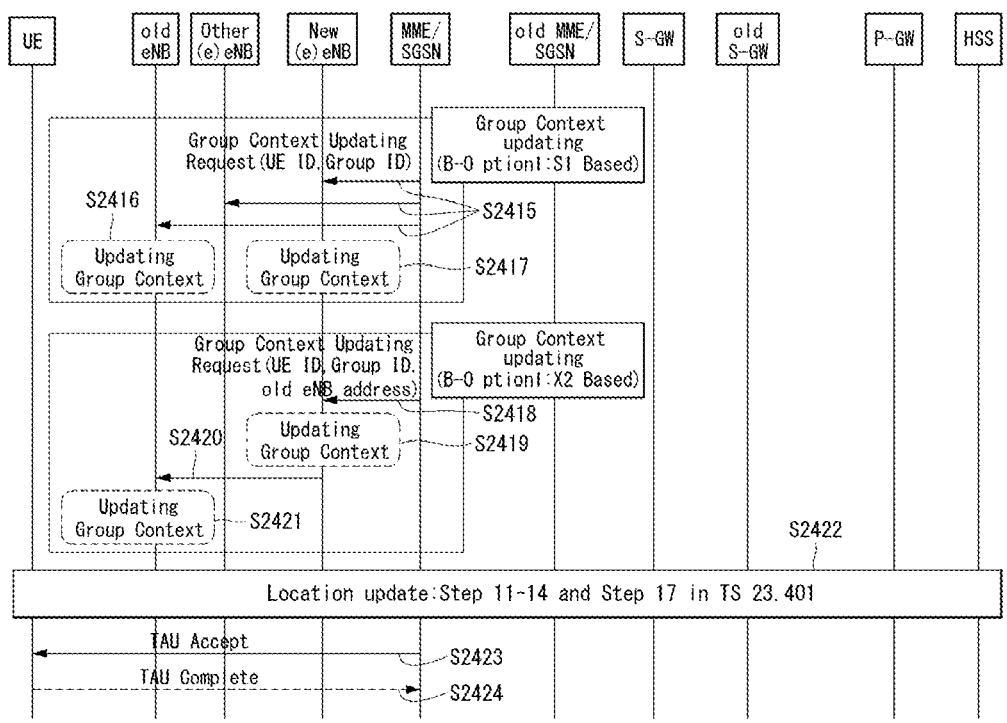

[FIG. 25]
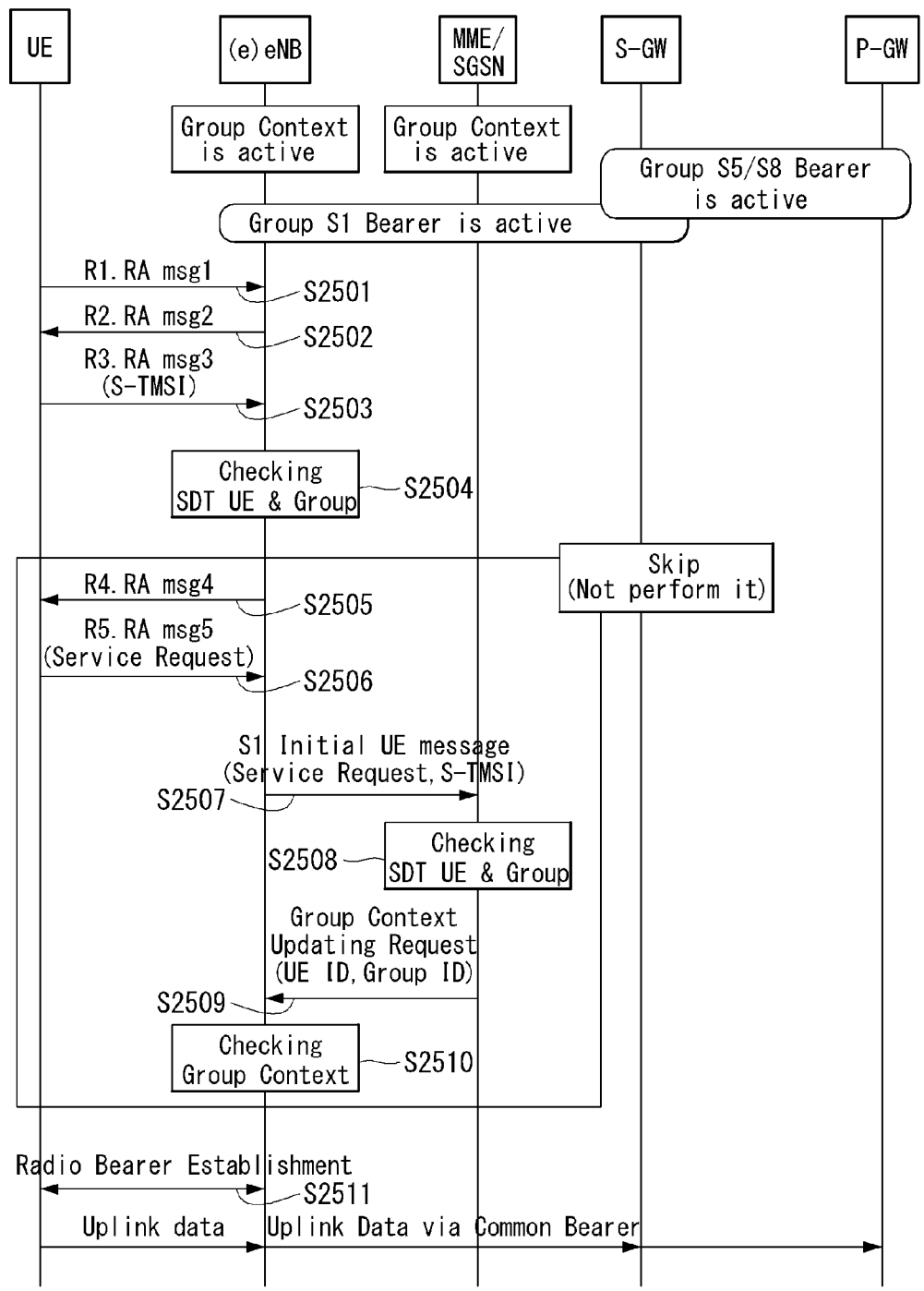

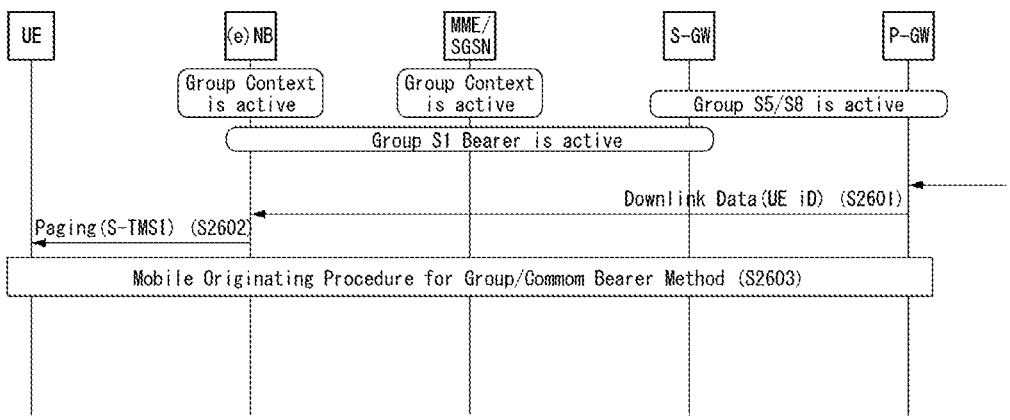
[FIG. 26]

[FIG. 27]
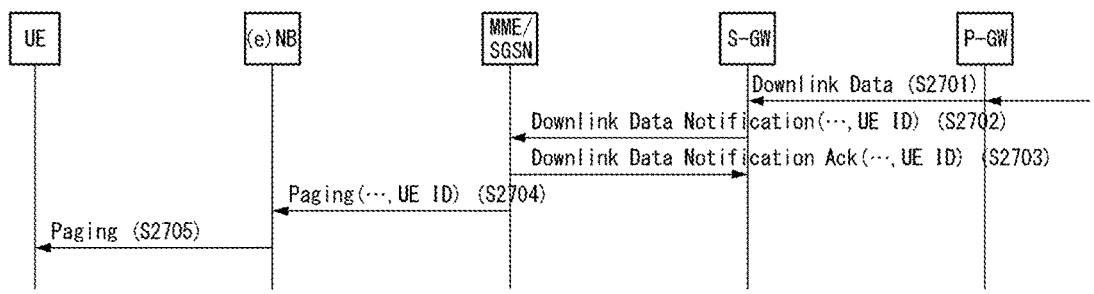

[FIG. 28]
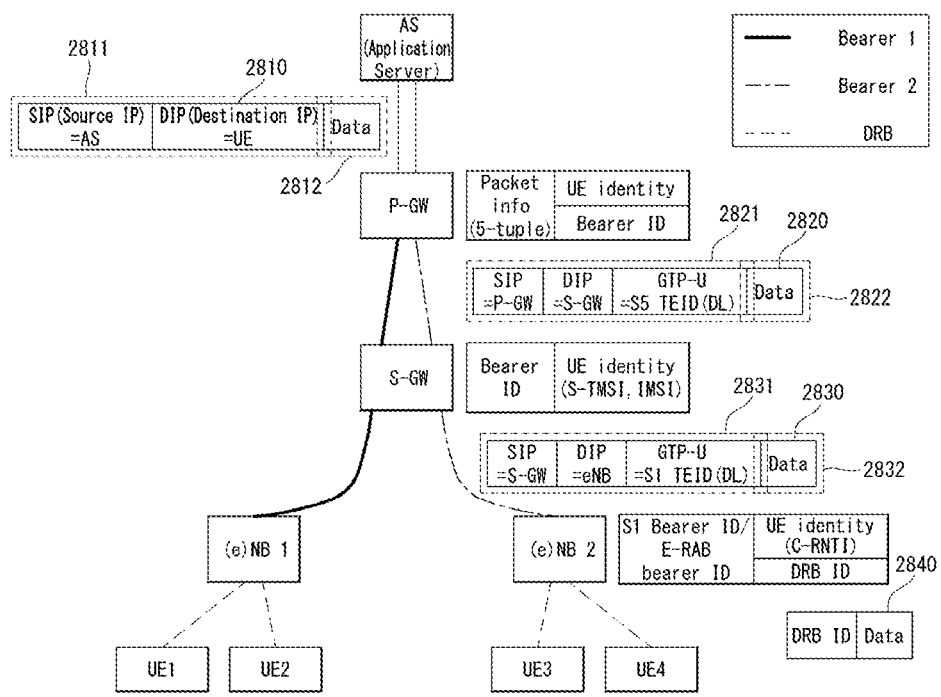

[FIG. 29]
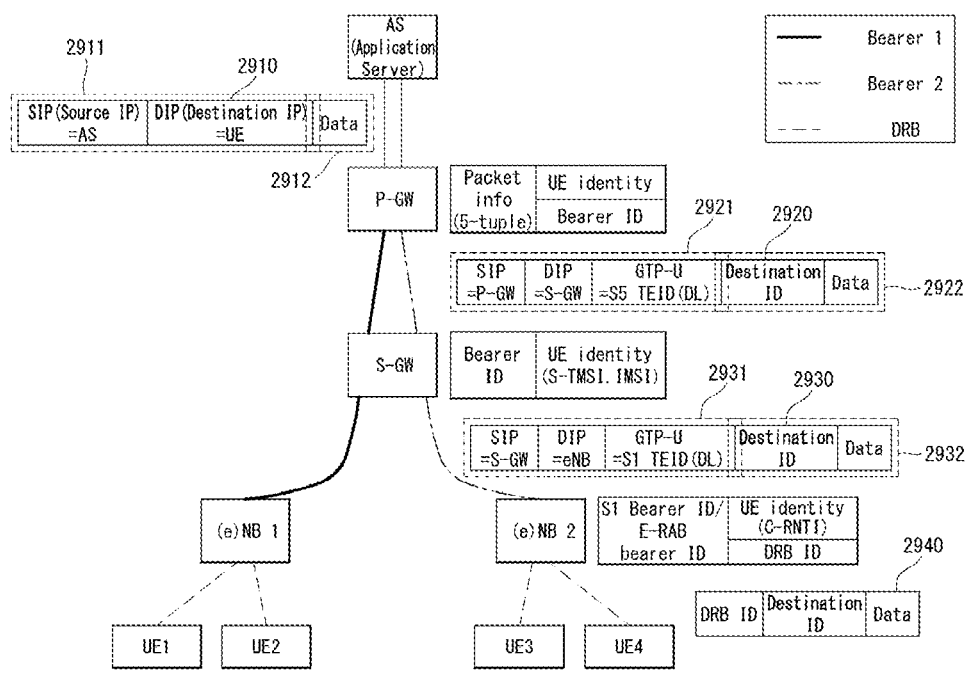

[FIG. 30]
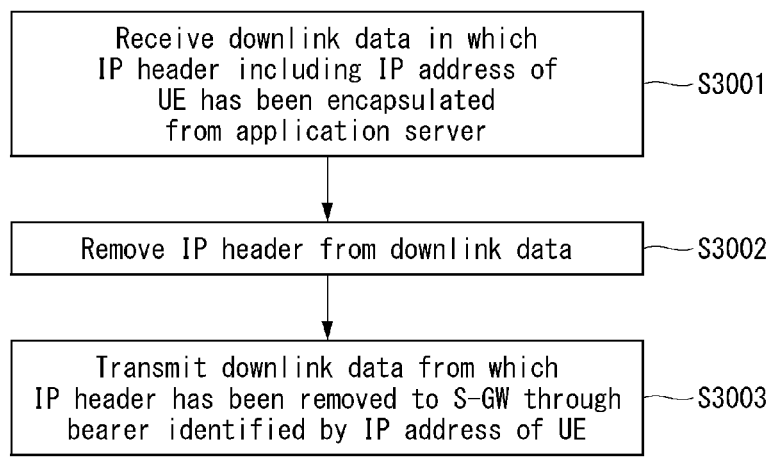
[FIG. 31]
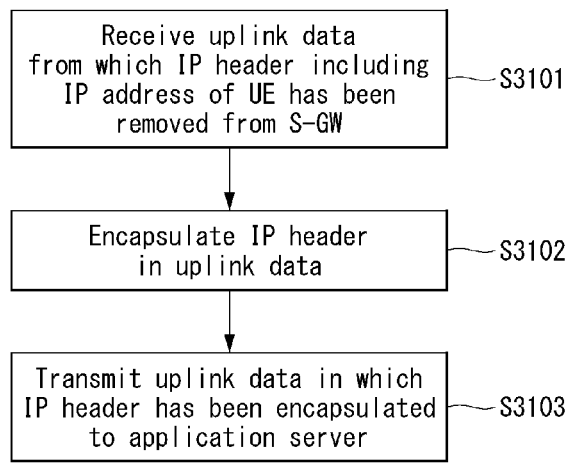

[FIG. 32]
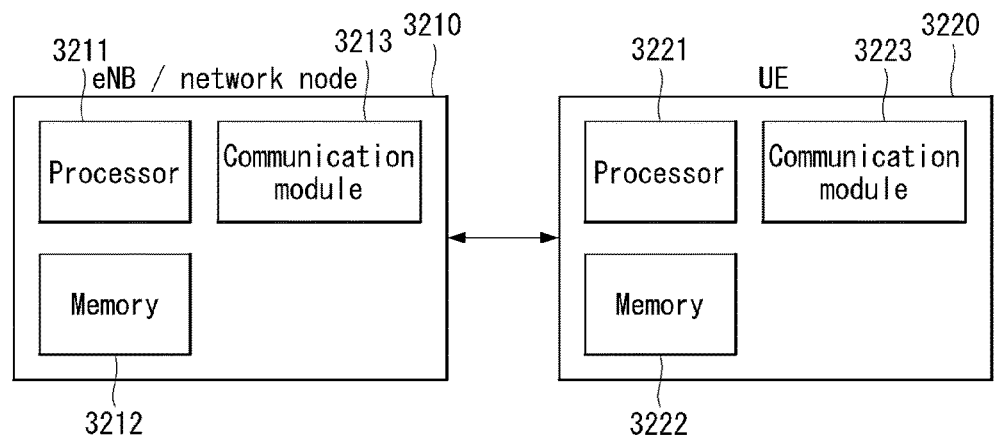
[FIG. 33]
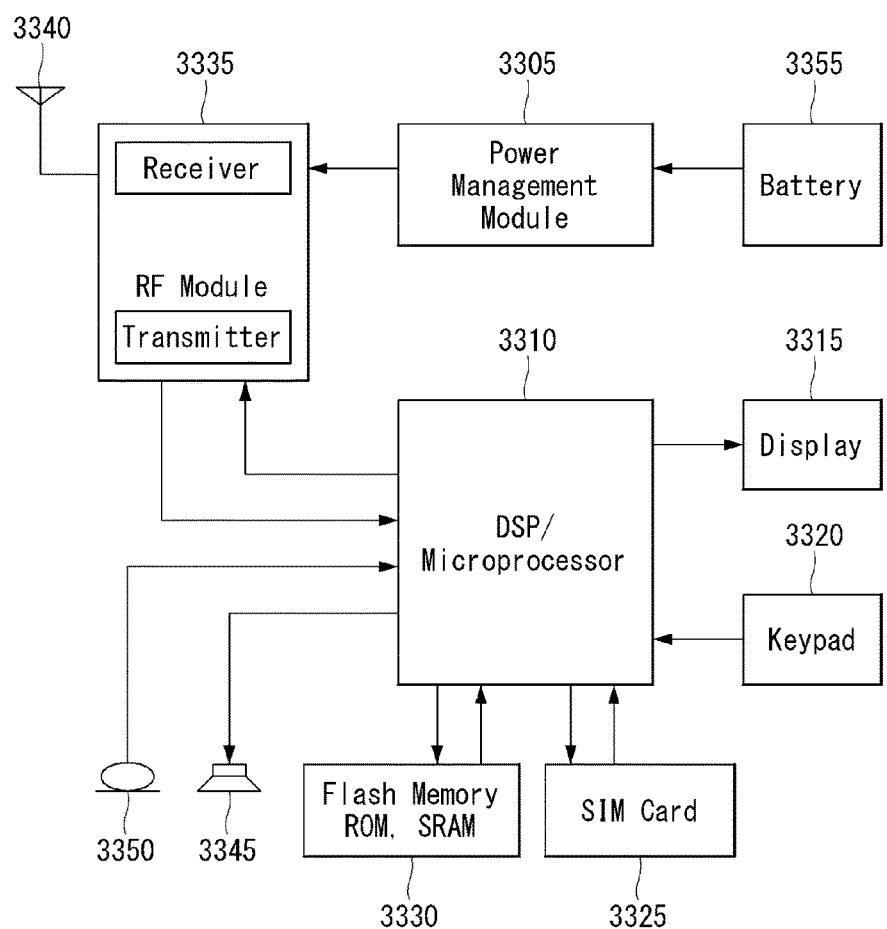

METHOD FOR TRANSMITTING AND RECEIVING DATA IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2016/005452, filed on May 23, 2016, which claims the benefit of U.S. Provisional Application No. 62/165,205, filed on May 22, 2015, 62/188,470, filed on Jul. 2, 2015, and 62/212,596, filed on Sep. 1, 2015, the contents of which are all hereby incorporated by reference herein in their entirety.

TECHNICAL FIELD

The present invention relates to a wireless communication system and, more specifically, to a method of transmitting/receiving uplink data/downlink data by a terminal or supporting the same, and a device therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method of efficiently transmitting/receiving uplink/downlink data by a terminal.

Another object of the present invention is to provide a method of efficiently transmitting/receiving uplink/downlink data by a terminal which has limited mobility and intermittently transmits data having a small size.

Yet another object of the present invention is to provide a method of controlling an Internet protocol (IP) address when uplink/downlink data is transmitted and received between an external network and a mobile communication network.

The technical problems solved by the present invention are not limited to the above technical problems and those skilled in the art may understand other technical problems from the following description.

Technical Solution

In an aspect of the present invention, a method for transmitting downlink data by a packet data network gateway (P-GW) in a wireless communication system includes: receiving, from an application server, downlink data in which an Internet protocol (IP) header including an IP address of a UE has been encapsulated; removing the IP header from the downlink data; and transmitting the downlink data from which the IP header has been removed to a serving gateway (S-GW) through a bearer identified by the IP address of the UE in order to transmit the downlink data from which the IP header has been removed to the UE.

In another aspect of the present invention, a method for transmitting uplink data by a packet data network gateway (P-GW) in a wireless communication system includes: receiving, from a serving gateway (S-GW), uplink data in which an IP header including an address of an application server and/or an IP address of a UE has been removed; encapsulating the IP header in the uplink data; and transmitting the uplink data in which the IP header has been encapsulated to the application server.

Preferably, the IP address of the UE nay identify packet data network (PDN) connection of the UE.

Preferably, the IP address of the UE may be assigned by the P-GW but may not be provided to the UE.

Preferably, when the downlink data is data for non-IP PDN connection, the IP header may be removed from the downlink data.

Preferably, when a single bearer is assigned per non-IP PDN connection of the UE, the downlink data may be transmitted to the UE on a single bearer assigned to the non-IP PDN connection.

Preferably, the uplink data in which the IP header has been encapsulated may be forwarded to the application server through a predetermined tunnel.

Preferably, the IP header may be encapsulated in the uplink data when the uplink data is data for non-IP PDN connection.

Preferably, when a single bearer is assigned per non-IP PDN connection of the UE, if non-IP PDN connection is identified by the ID of a bearer through which the uplink data is transmitted, the address of the application server according to the identified non-IP PDN connection may be encapsulated in the uplink data.

Preferably, a commonly used group bearer may be configured per group comprising one or more UEs, wherein the bearer is a group bearer of a group to which the UE belongs.

Preferably, one group bearer may be configured per group or the same group bearer may be configured for two or more groups.

Preferably, when the same group bearer is configured for two or more groups, groups matched to the group bearer may be identical over the entire section of a network node or different for sections between network nodes.

Preferably, information indicating whether the UE is a UE to which the group bearer is applied may be transmitted from the UE to a network or pre-configured in subscription information of the UE.

Preferably, the group may comprise one or more UEs for which the same default access point name (APN) is configured or one or more UEs requiring the same quality of service (QoS).

Preferably, all UEs belonging to the same eNB may be configured to the same group.

Preferably, the group bearer may maintain an activated state all the time, or may be released from the activated state when deactivated for a predetermined time and activated after the release.

Advantageous Effects

According to embodiments of the present invention, signaling overhead can be reduced when a terminal transmits/receives uplink/downlink data.

According to embodiments of the present invention, signaling overhead can be reduced and network resources or radio resources can be saved, particularly, when a terminal having limited mobility intermittently transmits data having a small size.

According to embodiments of the present invention, network resources or radio resources can be saved by controlling encapsulation/decapsulation of IP addresses.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 illustrates a structure of an S1 interface protocol to which the present invention can be applied.

FIG. 6 is a diagram schematically exemplifying a structure of physical channel in a wireless communication system to which the present invention can be applied.

FIG. 7 is a diagram exemplifying states of EMM and ECM in a wireless communication system to which the present invention can be applied.

FIG. 8 exemplifies a bearer structure in a wireless communication system to which the present invention can be applied.

FIG. 9 is a diagram exemplifying a transmission path of a control plane and a user plane in an EMM registered state in a wireless communication system to which the present invention can be applied.

FIG. 10 is a diagram exemplifying an ECM connection establishment procedure in a wireless communication system to which the present invention can be applied.

FIG. 11 is a diagram for describing the contention-based random access procedure in the wireless communication system to which the present invention can be applied.

FIG. 12 is diagram schematically exemplifying an attach procedure in a wireless communication system to which the present invention can be applied.

FIG. 13 is diagram schematically exemplifying a PDN connection procedure in a wireless communication system to which the present invention can be applied.

FIG. 14 is diagram schematically exemplifying a periodic tracking area update procedure in a wireless communication system to which the present invention can be applied.

FIG. 15 is diagram schematically exemplifying a terminal trigger service request procedure in a wireless communication system to which the present invention can be applied.

FIG. 16 is diagram schematically exemplifying a terminal trigger service request procedure in a wireless communication system to which the present invention can be applied.

FIG. 17 is a diagram for describing bearer mapping in a wireless communication system to which the present invention can be applied.

FIG. 18 is a diagram exemplifying an IP address assignment method in a wireless communication system to which the present invention can be applied.

FIG. 19 is a diagram exemplifying the concept of a common bearer according to an embodiment of the present invention.

FIG. 20 is a diagram exemplifying a packet forwarding method in a wireless communication system to which the present invention can be applied.

FIG. 21 is a diagram exemplifying a packet forwarding method using a group bearer according to an embodiment of the present invention.

FIGS. 22A and 22B exemplify an attach procedure using a group bearer according to an embodiment of the present invention.

FIG. 23 exemplifies an attach procedure using a group bearer according to an embodiment of the present invention.

FIGS. 24A and 24B exemplify a tracking area update procedure using a group bearer according to an embodiment of the present invention.

FIG. 25 exemplifies an uplink traffic transmission procedure using a group bearer according to an embodiment of the present invention.

FIG. 26 exemplifies a downlink traffic transmission procedure using a group bearer according to an embodiment of the present invention.

FIG. 27 is a diagram exemplifying a downlink traffic forwarding operation using a group bearer according to an embodiment of the present invention.

FIG. 28 is a diagram exemplifying a packet forwarding process using an IP address control method according to an embodiment of the present invention.

FIG. 29 is a diagram exemplifying a packet forwarding process using an IP address control method according to an embodiment of the present invention.

FIG. 30 is a diagram exemplifying an IP address control method according to an embodiment of the present invention.

FIG. 31 is a diagram exemplifying an IP address control method according to an embodiment of the present invention.

FIG. 32 exemplifies a block diagram of a communication device according to an embodiment of the present invention.

FIG. 33 exemplifies a block diagram of a communication device according to an embodiment of the present invention.

BEST MODE

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

FIG. 6 is a diagram schematically exemplifying a structure of physical channel in a wireless communication system to which the present invention can be applied.

Referring to FIG. 6, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

EMM and ECM State

In what follows, EPS Mobility Management (EMM) and EPS Connection Management (ECM) states will be described.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Similarly, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the position of the UE differs from the position recognized by the network while the UE is in the ECM-IDLE state, the UE can inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

EPS Bearer

FIG. 8 illustrates a bearer structure in a wireless communication system to which the present invention can be applied.

When the UE is connected to a Packet Data Network (PDN) (which is the peer entity of FIG. 8), PDN connection is established, which can be called an EPS session. The PDN provides a service function such as the Internet or IP Multimedia Subsystem (IMS) through an external or internal IP network of the service provider.

An EPS session comprises one or more EPS bearers. The EPS bearer refers to the transmission path of traffic generated between the UE and the PDN GW for the EPS to deliver user traffic. One or more EPS bearers can be set up for each UE.

Each EPS bearer can be classified into E-UTRAN Radio Access Bearer (E-RAB) or S5/S8 bearer, and the E-RAB can be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs can be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs can be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer can be one of two types: a default bearer and a dedicated bearer. The UE can have one default bearer and one or more dedicated bearers for each PDN. The minimum basic bearer that the EPS session can have with respect to one PDN is called default bearer.

The EPS bearer can be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And if new traffic is generated in the corresponding PDN, the E-RAB bearer is reconfigured to deliver traffic.

If the UE attempts to use a service of which the Quality of Service (QoS) (for example, Video on Demand (VoD) service) cannot be supported by the default bearer while using a service (for example, the Internet) through the default bearer, a dedicated bearer is created when the UE demands the high QoS service. In case there is no traffic from the UE, the dedicated bearer is released. The UE or the network can create a plurality of dedicated bearers depending on needs.

Depending on which service the UE uses, the IP flow can have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (for example, a QoS policy, gate status, and charging method).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or refused when only limited amount of resources are available. Also, the ARP can be used for the eNB to determine which bearer(s) to drop under the situation of limited resources (for example, handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

FIG. 9 illustrates transmission paths of a control plane and a user plane in an EMM registration state in a wireless communication system to which the present invention can be applied.

FIG. 9(a) illustrates ECM-CONNECTED state, and FIG. 9(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 9(a), in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, all of the DRB, S1 bearer, and S5 bearer are set up (namely, radio or network resources are allocated).

As shown in FIG. 9(b), in the ECM-IDLE state where there is no user traffic, the ECM connection (namely, RRC connection and S1 signaling connection) is released. However, the S11 GTP-C connection between the MME and the SGW; and the S5 GTP-C connection between the SGW and the PDN GW are retained.

Also, in the ECM-IDLE state, the DRB and the S1 bearer are all released, but the S5 bearer is retained (namely, radio or network resources are allocated).

FIG. 10 is a diagram exemplifying an ECM connection establishment procedure in a wireless communication system to which the present invention can be applied.

Referring to FIG. 10, a UE transmits a RRC connection request message to an eNB for requesting RRC connection (step, S1001).

The RRC connection request message includes a UE Identity (e.g., SAE temporary mobile subscriber identity (S-TMSI) or random ID) and an establishment cause.

The establishment cause may be determined according to NAS procedure (e.g., attach, detach, tracking area update, service request and extended service request).

The eNB transmits a RRC connection setup message to the UE in response to the RRC connection request message (step, S1002).

After receiving the RRC connection setup message, the UE transits to RRC_CONNECTED mode.

The UE transmits a RRC connection setup complete message to the eNB for verifying successful completion of the RRC connection establishment (step, S1003).

The UE transmits the RRC connection setup complete message with NAS message (e.g., initial attach message, service request message, etc.) being included to the eNB.

The eNB acquires the service request message from the RRC connection setup complete message, and transmits this to the MME through the Initial UE message, which is S1AP message (step, S1004).

The control signals between the eNB and the MME may be delivered through S1AP message with S1-MME interface. The S1AP message is delivered through S1 signaling connection for each user, and the S1 signaling connection is defined by an identity pair (i.e., eNB UE S1AP ID and MME UE S1AP ID) such that the eNB and the MME distinguish the UE.

The eNB transmits the Initial UE message including eNB UE S1AP ID by allocating eNB UE S1AP ID, and the MME setup S1 signaling connection between the eNB and the MME by allocating MME S1AP UE ID by receiving the Initial UE message.

Random Access Procedure

Hereinafter, a random access procedure which is provided in a LTE/LTE-A system will be described.

The random access procedure is used for a UE to obtain the UL synchronization with an eNB or to be allocated with UL radio resource. After turning on the power of UE, the UE acquires the DL synchronization with an initial cell and receives the system information. The UE gains the information of the set of usable random access preamble and that of the radio resource which is used for the transmission of random access preamble. The radio resource that is used for the transmission of random access preamble may be specified as the combination of at least one subframe index and an index on the frequency domain. The UE transmits the random access preamble that is randomly selected from the set of random access preamble, and the eNB that receives the random access preamble transmits the timing alignment (TA) value for the UL synchronization to the UE through the random access response. The UE acquires the UL synchronization in this way.

The random access procedure shows common in frequency division duplex (FDD) and time division duplex (TDD). The random access procedure is irrelevant to the cell size, and the number of serving cell in case of the carrier aggregation being configured.

First, the following shows the case that a UE performs the random access procedure.

- In case that the UE performs an initial access in a RRC idle state without any RRC connection to an eNB
- In case that the UE performs a RRC connection re-establishment procedure
- In case that the UE tries to an initial access to a target cell in a handover procedure
- In case that an random access procedure is requested by the order from eNB
- In case that there is any data that is going to be transmitted to DL in a non-synchronized condition during the RRC connected state
- In case that there is any data that is going to be transmitted to UL in a non-synchronized condition and in a condition that the radio resource designated for requesting the radio resource is not allocated during the RRC connected state
- In case that the UE positioning is performed in a condition that timing advance is required during the RRC connected state
- In case that restoration procedure is performed in a radio link failure or handover failure In 3GPP Rel-10, it is considered that the timing advance (TA) value that is applicable to a specific cell (for example, PCell) in a wireless access system that supports the carrier aggregation is applied to a plurality of cells in common. However, the UE may aggregate a plurality of cells that are included in different frequency bands (that is, spaced apart on the frequency domain) or a plurality of cells that have different propagation characteristics. In addition, in case of a specific cell, for the extension of coverage or the removal of coverage hole, in a condition that small cells such as a remote radio header (RRH) (that is, repeater), a femto cell, or a pico cell, etc. or a secondary eNB (SeNB) is arranged in the cell, the UE performs a communication with the eNB (that is, macro eNB), in case of performing the communication with the secondary eNB through another cell, a plurality of cell may have different characteristics of the propagation delay. In this case, if the UL transmission is performed in a way that one TA value is commonly applied to a plurality of cells, it may profoundly affect the synchronization of UL signals that are transmitted on a plurality of cells. Accordingly, it may be desired to have a plurality of TAs in a condition of the CA that a plurality of cells are aggregated, and in 3GPP Rel-11, considered to allocate the TA independently in a specific cell group unit for supporting multiple TA. It is referred to as TA group (TAG), the TAG may include one or more cell(s), and the same TA may be commonly applied in one more cell(s) that are included in the TAG. For supporting the multiple TA, the MAC TA command control element is configured with 2-bit TAG ID and 6-bit TAG command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, may be applied to all the cells within the pTAG. Meanwhile, in case of TAG (that is, secondary TAG (sTAG)) that is configured with SCells only, the TA, which is determined based on a specific SCell within sTAG, may be applied to all the cells within the relevant sTAG, and in this time, the TA may be acquired through the random access procedure by being initiated by the eNB. Particularly, the SCell in the sTAG is set to be RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using Random Access Radio Network Temporary Identifier (RA-RNTI). The TA that is determined based on SCell that successfully completes the random access may be applied to all the cells in the relevant sTAG by the UE. Like this, the random access procedure may be performed in SCell as well in order to acquire timing alignment of the sTAG to which the relevant SCell belongs.

The LTE/LTE-A system provides both of the contention-based random access procedure that the UE randomly selects to use one preamble in a specific set and the non-contention-based random access procedure that the eNB uses the random access preamble that is allocated to a specific UE. However, the non-contention-based random access procedure may be used only for the handover procedure, the UE positioning, case of being requested by the order of eNB and/or the timing advance alignment for the sTAG. After the random access procedure is completed, a normal UL/DL transmission is made.

In the meantime, relay node (RN) also supports both of the contention-based random access procedure and the non-contention-based random access procedure. When the relay node performs the random access procedure, the RN suspends the RN subframe configuration at the moment. That is, it means that the RN subframe configuration is temporarily terminated. But, the RN subframe configuration is initiated at the time when the random access procedure has been successfully completed.

FIG. 11 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The random access preamble is transmitted by 6 bits in the RACH transmission channel, and the 6-bit consists of 5-bit random identity for identifying the RACH transmitted UE and the rest 1-bit (for example, indicating the size of msg 3) for representing additional information.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH. It is desirable to include the information of UE that is to receive the PDSCH, frequency and the time information of the PDSCH radio resource, and transmission type of the PDSCH, etc. in the PDCCH. As described above, if succeeding in detecting the PDCCH that is transmitted to the UE itself, the UE may receive properly the random access response that is transmitted on the PDSCH according to the PDCCH information.

The random access response window represents the maximum time duration when the UE that transmits the preamble is waiting for the random access response message. The random access response window has the length of 'ra-ResponseWindowSize', which starts from the subframe after 3 subframes from the last subframe in which the preamble is transmitted. That is, the UE is waiting for receiving the random access response during the random access window secured after 3 subframes from the subframe in which the preamble transmission is completed. The UE may acquire the random access window size ('ra-ResponseWindowsize') parameter value through the system information, and the random access window size may be determined as a value from 2 to 10.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

As described above, the reason why the random access preamble index is needed in the random access response is that one random access response may include the random access response information for one or more UEs, and so there is required an index to instruct for which UE the above UL grant, TC-RNTI, and TAC are available.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB. In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. In the content based random access procedure, the eNB may not identify which UEs perform the random access procedure, but the eNB is required to identify the UE in order to solve the collision later on.

There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

For the transmission on the UL SCH, the UE-specific scrambling is used. If the UE has been allocated C-RNTI, the scrambling is performed based on the C-RNTI. However, if the UE has not been allocated C-RNTI yet, the scrambling is not performed based on the C-RNTI but uses TC-RNTI that is received from the random access response instead. If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

The following is a description of the method for collision resolution in the random access.

The reason why a collision is occurred in performing the random access is that the number of random access preamble is limited basically. That is, it is not available that the eNB assigns a unique random access preamble for the UE to all the UEs, and the UE should randomly select one among the common random access preambles and transmit. According to this, a case is occurred that two or more UEs select the identical random access preamble through the identical radio resource (PRACH resource) and transmit, but the eNB recognizes it as one random access preamble that is transmitted from one UE. Accordingly, the eNB transmits the random access response to the UE and the random access response is supposed to be received by one UE. However, as described above, as there is a possibility that a collision is occurred, two or more UEs are going to receive one random access response, and according to this, each UE performs an operation by the receipt of random access response. That is, there is a problem that two or more UEs transmit different data to the same radio resource by using one UL grant included in the random access response. According to this, the data transmission might be all failed, and depending on the location of UEs or transmission power, the data of a specific UE only may be received by the eNB. In the latter case, as all of the two or more UEs assume that the data transmission of its own are succeeded, the eNB should inform the fact to the corresponding UEs that they are failed in contention. That is, what to inform the fact of the failure or success in contention is referred to as contention resolution.

There are two ways of contention resolution. The one is to use the contention resolution timer, and the other is to transmit the identifier of successful UE to UEs. The former is applied to the case that the UE already has a unique C-RNTI before the random access procedure. That is, the UE that already has the C-RNTI transmits the data including the C-RNTI of itself according to the random access response and operates the contention resolution timer. And if the PDCCH information that is addressed by the C-RNTI of its own is received before the contention resolution timer is terminated, the UE determines itself to succeed in the contention and normally terminates the random access. In the contrary, if the PDCCH information that is addressed by the C-RNTI of its own is not received before the contention resolution timer is terminated, the UE determines itself to fail in the contention and reinitiates the random access procedure, or informs the fact of failure to the higher layer.

In the latter case of the ways of contention resolution, that is, the case that is to transmit the identifier of successful UE, is used for what the UE does not have a unique C-RNTI before the random access procedure. That is, in case that the UE itself does not have C-RNTI, the UE transmits including a higher identifier (S-TMSI or random number) more than the C-RNTI of data according to the UL Grant information included in the random access response, and operates the contention resolution timer. In case that the data including the higher identifier of its own is transmitted to DL-SCH before the contention resolution timer is terminated, the UE determines that the random access procedure is successful. On the other hand, in case that the data including the higher identifier of its own is not transmitted to DL-SCH before the contention resolution timer is terminated, the UE determines that the random access procedure is failed.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Attach Procedure

FIG. 12 is a diagram schematically exemplifying an attach procedure in a wireless communication system to which the present invention can be applied.

The attach procedure is used to establish connection to a network when a UE enters an E-UTRAN cell, in general. Further, the attach procedure may be used in case of handover from a non-3GPP network to E-UTRAN.

1-2. A UE initiates an attach procedure by transmitting an Attach Request message to an MME.

The Attach Request message includes the international mobile subscriber identity (IMSI) of the UE, a PDN type requested by the UE, and the like. Here, the PDN type indicates an IP version (i.e., IPv4, IPv4v6 or IPv6) requested by the UE.

The Attach Request message is delivered being included in an RRC Connection Setup Complete message through RRC connection and delivered being included in an initial UE message through S1 signaling connection.

The UE may transmit the Attach Request message along with a PDN Connectivity Request message in order to request PDN connectivity.

3. The MME requests information for UE authentication from an HSS, receives the information and performs mutual authentication with the UE.

4. The MME registers the location of the UE with the HSS and receives user subscription information (i.e., subscribed QoS profile) from the HSS in order to generate a default bearer for the UE.

Here, subscription information does not include IP address information about the UE in the case of dynamic IP address allocation but includes static IP address information allocated to the UE in the case of static IP address allocation.

5. The MME assigns a default EPS bearer ID and transmits a Create Session Request message to an S-GW.

The Create Session Request message includes the IMSI of the UE, an EPS bearer ID, a P-GW ID (i.e., P-GW address) selected by the MME for EPS bearer generation, an APN, a subscribed QoS profiled received from the HSS, a PDN type, an IP address (i.e., PDN address) of the UE, etc.

Here, the PDN type is the same as PDN type information received from the UE. The IP address of the UE may be set to 0 in the case of dynamic IP address allocation and set to static IP address information (included in subscription information) assigned to the UE in the case of static IP address allocation.

6. The S-GW assigns an S5 S-GW TEID (Tunnel Endpoint Identifier) to a P-GW included in the Create Session Request message received from the MME in order to generate an S5 bearer and transmits the Create Session Request message to the P-GW.

The Create Session Request message includes the IMSI of the UE, the EPS bearer ID, the S5 S-GW TEID, an APN, the subscribed QoS profile, the PDN type (i.e., IP version), the IP address (i.e., PDN address) of the UE, etc.

7. The P-GW assigns an IP address to be used by the UE and performs an IP connectivity access network (IP_CAN) session establishment/modification procedure with a PCRF.

Here, the P-GW may assign an IP address selected from an IP address pool thereof to the UE in the case of dynamic IP address allocation and assign the same IP address as the static IP address information (included in subscription information) allocated to the UE in the case of static IP address allocation.

8. The P-GW assigns a P-GW TEID (Tunnel Endpoint Identifier) to the S-GW in order to generate an S5 bearer and transmits a Create Session Response message to the S-GW in response to the Create Session Request message.

The Create Session Response message includes the IMSI of the UE, the EPS bearer ID, the S5 P-GW TEID, the subscribed QoS profile, the PDN type, the IP address (i.e., PDN address) allocated to the UE, etc.

If the P-GW selects a PDN type different from a requested PDN type, the P-GW indicates, to the UE, the reason why the PDN type has been modified together with the PDN type.

When this procedure is done, the creation of the S5 bearer is completed between the S-GW and the P-GW so that the S-GW can transmit uplink traffic to the P-GW or receive downlink traffic from the P-GW.

9. The S-GW assigns an S1 S-GW TEID in order to generate S1 bearer and transmits the Create Session Request message to the MME in response to the Create Session Request message.

The Create Session Response message includes the IMSI of the UE, the EPS bearer ID, the S1 S-GW TEID, the PDN type, the IP address (i.e., PDN address) allocated to the UE, etc.

10-11. The MME transmits an Attach Accept message to the UE in response to the Attach Request message.

The Attach Accept message includes the EPS bearer ID, an APN, the ID address (i.e., PDN address) of the UE allocated by the P-GW, PDN type, a tracking area identity (TAI) list, a TAU timer, etc.

The Attach Accept message is delivered being included in an Initial Context Setup Request message to the eNB through the S1 signaling connection.

When this procedure is done, the creation of an uplink S1 bearer is completed between the eNB and the S-GW so that the eNB can transmit uplink traffic to the S-GW.

In addition, the Attach Accept message is delivered being included in an RRC Connection Reconfiguration message from the eNB to the UE through the RRC connection.

When this procedure is done, the creation of DRB is completed between the UE and the eNB so that the UE can transmit uplink traffic to the eNB or receive downlink traffic from the eNB.

12. The eNB transmits an Initial Context Setup Response message to the MME in response to the Initial Context Setup Request message. The Initial Context Setup Response message includes an S1 eNB TEID.

13-14. The UE transmits an Attach Complete message to the MME in response to the Attach Accept message.

The Attach Complete message is delivered being included in a UL Information Transfer message through the RRC connection and delivered being included in an Uplink NAS Transport message through the S1 signaling connection.

When this procedure is done, the creation of an uplink default EPS bearer is completed between the UE and the P-GW so that the UE can transmit uplink data to the P-GW.

15. The MME delivers the S1 eNB TEID received from the eNB to the S-GW through a Modify Bearer Request message.

When this procedure is done, the creation of a downlink S1 bearer is completed between the eNB and the S-GW so that the eNB can receive downlink traffic from the S-GW.

16-17. The bearer between the S-GW and the P-GW is updated as necessary.

18. The S-GW transmits a Modify Bearer Response message to the MME in response to the Modify Bearer Request message.

When this procedure is done, the creation of a downlink default EPS bearer is completed between the UE and the P-GW so that the P-GW can transmit downlink data to the UE. That is, connection between the UE and the PDN is established and thus the UE can be provided with a PDN service using an allocated IP address.

19. The MME transmits a Notify Request message including the P-GW ID (i.e., P-GW address) and APN to the HSS as necessary.

20. The HSS stores the P-GW ID (i.e., P-GW address) and related APN and transmits a Notify Response message to the MME.

FIG. 12 is a diagram exemplifying a UE requested PDN connectivity procedure in a wireless communication system to which the present invention can be applied.

PDN Connectivity Procedure

The UE requested PDN connectivity procedure is used for a UE to request connection to an additional PDN (including allocation of a default bearer) through E-UTRAN.

FIG. 13 is a diagram schematically exemplifying a PDN connectivity procedure in a wireless communication system to which the present invention can be applied.

1. A UE initiates a UE requested PDN procedure by transmitting a PDN Connectivity Request message to an MME.

The PDN Connectivity Request message includes an APN, a PDN type (i.e., IP version) requested by the UE, and the like. As described above, the PDN type indicates an IP version (i.e., IPv4, IPv4v6 or IPv6) requested by the UE.

The MME verifies that the APN provided by the UE is permitted by subscription information. If the UE does not provide the APN through the PDN Connectivity Request message, the MME uses an APN from a default PDN subscription context.

2. The MME allocates an EPS bearer ID and transmits a Create Session Request message to an S-GW.

The Create Session Request message includes the IMSI of the UE, the EPS bearer ID, a P-GW ID (i.e., P-GW address) selected by the MME for EPS bearer generation, an APN, a subscribed QoS profile received from an HSS, a PDN type, the IP address (i.e., PDN address) of the UE, etc.

Here, the same PDN type as the PDM type information received from the UE is included in the Create Session Request message. The IP address of the UE may be set to 0 in the case of dynamic IP address allocation and may be set to static IP address information (included in the subscription information) assigned to the UE in the case of static IP address allocation.

3. The S-GW allocates an S5 S-GW TEID (Tunnel Endpoint Identifier) for generating an S5 bearer to a P-GW included in the Create Session Request message received from the MME and transmits the Create Session Request message to the P-GW.

The Create Session Request message includes the IMSI of the UE, the EPS bearer ID, the S5 S-GW TEID, an APN, a subscribed QoS profile, a PDN type (i.e., IP version), the IP address (i.e., PDN address) of the UE, etc.

4. The P-GW allocates an IP (Internet Protocol) address to be used by the UE and performs an IP-CAN (IP connectivity access network) session establishment/modification procedure with a PCRF.

Here, the P-GW may allocate an IP address selected from an IP address pool thereof to the UE in the case of dynamic IP address allocation and allocate static IP address information (including subscription information) assigned to the UE to the UE in the case of static IP address allocation.

5. The P-GW allocates a P-GW TEID (Tunnel Endpoint Identifier) for generating an S5 bearer to the S-GW and transmits a Create Session Response message to the S-GW in response to the Create Session Request message.

The Create Session Response message includes the IMSI of the UE, the EPS bearer ID, the S5 P-GW TEID, the subscribed QoS profile, the PDN type, the IP address (i.e., PDN address) allocated to the UE, etc.

If the P-GW selects a PDN type different from the requested PDN type, the P-GW indicates, to the UE, the reason why the PDN type has been modified along with the PDN type.

When this procedure is done, the creation of the S5 bearer is completed between the S-GW and the P-GW so that the S-GW can transmit uplink traffic to the P-GW or receive downlink traffic from the P-GW.

6. The S-GW allocates an S1 S-GW TEID for generating an S1 bearer and transmits a Create Session Response message to the MME in response to the Create Session Request message.

The Create Session Response message includes the IMSI of the UE, the EPS bearer ID, the S1 S-GW TEID, PDN type, the IP address (i.e., PDN address) allocated to the UE, etc.

7. The MME transmits a PDN Connectivity Accept message to the UE in response to the PDN Connectivity Request message.

The PDN Connectivity Accept message includes the EPS bearer ID, APN, the IP address (i.e., PDN address) of the UE allocated by the P-GW, PDN type, etc.

The PDN Connectivity Accept message is delivered being included in a Bearer Setup Request message to an eNB through the S1 signaling connection.

When this procedure is done, the creation of an uplink S1 bearer is completed between the eNB and the S-GW so that the eNB can transmit uplink traffic to the S-GW.

8. The PDN Connectivity Accept message is delivered being included in the RRC Connection Reconfiguration message from the eNB to the UE through the RRC connection.

When this procedure is done, the creation of DRB is completed between the UE and the eNB so that the UE can transmit uplink traffic to the eNB or receive downlink traffic from the eNB.

9. The UE transmits an RRC Connection Reconfiguration Complete message to the eNB.

10. The eNB transmits a Bearer Setup Response message to the MME.

The Bearer Setup Response message includes an S1 eNB TEID and the like.

11-12. The UE transmits a PDN Connectivity Complete message including the EPS bearer ID to the MME.

When this procedure is done, the creation of an uplink default EPS bearer is completed between the UE and the P-GW so that the UE can transmit uplink data to the P-GW.

13. The MME delivers the S1 eNB TEID received from the eNB to the S-GW through a Modify Bearer Request message.

When this procedure is done, the creation of a downlink S1 bearer is completed between the eNB and the S-GW so that the eNB can receive downlink traffic from the S-GW.

13a-13b. The bearer between the S-GW and the P-GW is updated as necessary.

14. The S-GW transmits a Modify Bearer Response message to the MME in response to the Modify Bearer Request message.

When this procedure is done, the creation of a downlink default EPS bearer is completed between the UE and the P-GW so that the P-GW can transmit downlink data to the UE. That is, connection between the UE and the PDN is established and the UE may be provided with the PDN service using the allocated IP address.

15. The MME transmits a Notify Request message including the P-GW ID (i.e., P-GW address) and APN to an HSS as necessary.

16. The HSS stores the P-GW ID (i.e., P-GW address) and related APN and transmits a Notify Response message to the MME.

TAU Procedure

A tracking area update (TAU) procedure is performed when a UE in an ECM-IDLE state attempts new location registration or a TAU timer expires.

FIG. 14 is a diagram schematically exemplifying a periodic TAU procedure in a wireless communication system to which the present invention can be applied.

1-2. When a TAU timer of a UE in an ECM-IDLE state expires, a periodic TAU (P-TAU) procedure for reporting a tracking area (TA) to an MME is triggered.

The UE initiates the P-TAU procedure by transmitting a TAU Request message to the MME.

The TAU Request message is delivered being included in an RRC Connection Setup Complete message through the RRC connection and delivered being included in an Initial UE message through the S1 signaling connection.

3. Upon receiving the TAU Request message, the MME resets the TAU timer and transmits a Modify Bearer Request message including an E-UTRAN Cell Global Identifier (ECGI) and a TAI to an S-GW.

4-5. When a cell (ECGI) or a tracking area (TAI) in which the UE is located is changed, the S-GW notifies a P-GW of change of the cell or the tracking area by transmitting the Modify Bearer Request message to the P-GW.

The P-GW performs an EPS session modification procedure and transmits a Modify Bearer Response message to the S-GW in response to the Modify Bearer Request message.

6. The S-GW transmits the Modify Bearer Response message to the MME in response to the Modify Bearer Request message.

7-8. The MME transmits a TAU Accept message to the UE in response to the TAU Request message.

The TAU Accept message may include a TAU timer and the like.

The TAU Accept message is delivered being included in a Downlink NAS Transport message through the S1 signaling connection and delivered being included in a DL Information Transfer message through the RRC connection.

9. Upon completion of UE location update, the MME releases connection with the UE used for transmission and reception of the periodic TAU related messages and transmits a UE Context Release Command message to an eNB in order to release user context set in the E-UTRAN.

10. The eNB deletes the context of the UE and releases resources allocated to the UE. In addition, the eNB transmits an RRC Connection Release message to the UE to release RRC connection with the UE.

11. The eNB transmits a UE Context Release Complete message to the MME in response to the UE Context Release Command message, and thus S1 signaling connection between the eNB and the MME is released.

When this procedure is terminated, the UE enters the ECM-IDLE state again.

Service Request Procedure

Generally, a UE-triggered service request procedure is performed when trying to start new service initiated by UE or when trying to transmit uplink data in response to a paging.

FIG. 15 illustrates a UE trigger Service Request procedure in a wireless communication system to which the present invention can be applied 1-2. The UE initiates a UE-triggered Service Request procedure by transmitting a Service Request message to the MME.

The Service Request message is delivered being included in an RRC connection setup complete message through the RRC connection and delivered being included in an initial UE message through the S1 signaling connection.

3. For authentication of the UE, the MME requests and receives information for the authentication from the HSS; and performs mutual authentication with the UE.

4. The MME transmits an Initial Context Setup Request message to the eNB so that the eNB can configure an S1 bearer with the S-GW and configure a DRB with the UE.

5. The eNB transmits an RRC Connection Reconfiguration message to the UE to create the DRB.

When this procedure is done, the creation of DRB is completed between the eNB and the UE, and all of uplink EPS bearers ranging from the UE to the P-GW are configured. The UE can transmit uplink traffic data to the P-GW.

6. The eNB transmits an Initial Context Setup Complete message including 'S1 eNB TEID' to the MME in response to the Initial Context Setup Request message.

7. The MME delivers the 'S1 eNB TEID' received from the eNB to the S-GW through a Modify Bearer Request message.

When this procedure is done, the creation of S1 bearer is completed between the eNB and the S-GW, and then all of the downlink EPS bearers ranging from the P-GW and the UE are configured. The UE can then receive downlink traffic data from the P-GW.

8. In case that a cell (E-UTRAN cell global Identifier; ECGI) where a UE is located or tracking area (TAI) is changed, the S-GW informs that by transmitting a modify bearer request message to the P-GW.

9. If needed, the P-GW can perform an IP connectivity access network (IP-CAN) session modification procedure with the PCRF.

10. Receiving a Modify Bearer Request message from the S-GW, the P-GW transmits a Modify Bearer Response message to the S-GW in response to the message.

11. The S-GW transmits a Modify Bearer Response message to the MME in response to the Modify Bearer Request message.

A network-triggered Service Request procedure is usually performed when the network attempts to transmit downlink data to the UE staying in the ECM-IDLE state.

FIG. 16 is a diagram exemplifying a UE trigger service request procedure in a wireless communication system to which the present invention can be applied.

1. If downlink data arrives at the P-GW via an external network, the P-GW delivers downlink data to the S-GW.

2. In case that a downlink S1 bearer is unable to transmit downlink data to an eNB (i.e., 'S1 eNB TEID' value is not exist in the S-GW) since the downlink S1 bearer is released, the S-GW buffers the received downlink data. And the S-GW transmits a downlink data notification message to an MME where the eNB is registered for signaling connection and bearer configuration to the corresponding UE.

The MME transmits a Downlink Data Notification ACK message to the S-GW in response to the Downlink Data Notification message.

3. The MME transmits a paging message to an eNB which belongs to a tracking area to which the UE has been registered most recently.

4. The eNB broadcast the paging message upon receiving the paging message from the MME.

5. The UE performs a Service Request procedure to set ECM connection upon recognizing presence of downlink data destined therefor.

The Service Request procedure may be performed in the same manner as the procedure of FIG. 10, and when this procedure is done, the UE can receive downlink data from the S-GW.

APN: Access Point Name

In a GPRS backbone, an APN is a reference for a GGSN. In addition, the APN is a reference for a PDN in an EPS backbone.

That is, the APN represents a PDN identity (i.e., PDN ID) and refers to a character string for indicating or identifying a PDN.

A P-GW that needs to be used by a UE can be determined using the APN and a tunnel for connecting a UE to a PDN can be defined using the APN. Each PDN may have an APN for identifying the PDN and one or more P-GWs associated with the PDN.

The APN is configured by a network operator and may include many parameters for characterizing PDN connectivity from a UE to a PDN. An authorization method and an address allocation method can be determined using the APN. Furthermore, a used IP address pool, a used charging type, a policy model (e.g., whether PCRF is used for policy control) and the like can be determined using the APN.

The APN can be composed of the following two parts.

APN network identifier: The APN network identifier defines an external network connected to a GGSN/PG. That is, the APN network identifier defines a PDN to which a UE is connected through a P-GW. Optionally, the APN network identifier may define a service requested by a UE.

APN operator identifier: The APN operator identifier defines a PLMN GPRS/EPS backbone in which a GGSN/P-GW is located. That is, the APN operator identifier defines the operator of a PDN to which a UE is connected through a P-GW. The APN operator identifier is optional.

The APN may be set to an HSS in advance as subscription information. The APN may be downloaded from the HSS to an MME during attachment of a UE and may be stored in the MME, S-GW and P-GW when PDN connection between a UE and a PDN is established. The MME can use the APN to discover a gateway (i.e., GGSN or P-GW) which connects a UE to the PDN defined by the APN.

Bearer ID Mapping

For E-UTRAN access to an EPC, a PDN connectivity service may be provided by an EPS bearer composed of GTP based S5/S8 bearer or an EPS bearer composed of PMIP (proxy mobile IP) based S5/S8 bearer.

An EPS bearer uniquely identifies a traffic flow of receiving a common QoS treatment.

A packet filter signaled in a NAS procedure is associated with a unique packet filter identifier per PDN connection.

An EPS bearer is a unit level for controlling QoS at the bearer level in an EPC/E-UTRAN. That is, packet forwarding treatment (e.g., scheduling policy, queue management policy, rate shaping policy, PLC configuration, etc.) of the same bearer level is applied to all traffics mapped to the same EPS bearer. Different EPS bearers are required for packet forwarding treatments of different bearer levels.

A single EPS bearer is established when a UE is connected to a PDN and the establishment of the EPS bearer is continuously maintained while PDN connection is maintained in order to provide Always-on IP connection with the PDN to the UE. Such a bearer is called a default bearer. An additional EPS bearer for the same PDN connectivity is referred to as a dedicated bearer.

An EPS bearer ID (EBI) uniquely identifies an EPS bearer for accessing of a single UE through E-UTRAN. The EPS bearer ID is allocated by an MME. An EPS radio bearer (RB) is one-to-one mapped to an EPS bearer, and mapping between an EPS RB ID and an EBI is made by E-UTRAN An E-RAB ID uniquely identifies E-RAB for a single UE. An E-RAB ID value used for S1 and X2 interfaces to identify E-RAB is the same as an EPS bearer ID value used to identify a related EPS bearer. In other words, an E-RAB ID value used for S1 and X2 interfaces to identify E-RAB allocated to a UE is the same as an EPS bearer ID value used for Uu interface to identify a related EPS bearer and used in the NAS layer.

A data RB (DRB) delivers E-RAB packets between a UE and an eNB. E-RAB is one-to-one mapped to a DRB.

As described above, an EPS RB and an EPS bearer have a one-to-one relationship therebetween, and E-UTRAN (i.e., eNB) creates and stores mapping between an EPS RB ID and an EBI and also stores mapping between an E-RAB ID and an EPS RB.

A traffic flow template (TFT) of the EPS bearer is a set of all packet filters connected to the corresponding EPS bearer.

An uplink TFT (UL TFT) is a set of uplink packet filters in the TFT. A downlink TFT (DL TFT) is a set of downlink packet filters in the TFT.

All dedicated EPS bearers are associated with the TFT. In addition, the TFT may be allocated to a default EPS bearer.

A UE uses a UL TFT to map traffic to an EPS bearer on uplink. A PCRF (for GTP based S5/S8) or a BBERF (Bearer Binding and Event Reporting Function) (for PMIP based S5/S8) uses a DL TFT to map traffic to an EPS bearer on downlink.

The UE may use the UL TFT and the DL TFT in order to associate an EPS bearer activation or EPS bearer modification procedure with an application or traffic flow aggregates of the application. Accordingly, a P-GW provides, to the UE, all of traffic flow description information (e.g., source and destination IP addresses, a port number and protocol information) available in a Create Dedicated Bearer Request message or an Update Bearer Request message.

The UE routes uplink packets to different EPS bearers on the basis of uplink packet filters in TFTs allocated to EPS bearers.

The UE evaluates an uplink packet filter having a lowest evaluation precedence index among all TFTs for matching between uplink packets and uplink packet filters, and when matching is not discovered, performs evaluation of uplink packet filters in increasing order of the evaluation precedence index. This procedure is performed until matching is discovered or all uplink packet filters are evaluated. When matching between an uplink packet and an uplink packet filter is discovered, uplink data packets are transmitted on an EPS bearer associated with the TFT of the matched uplink packet filter. When no matching is discovered, uplink data packets are transmitted through an EPS bearer to which no uplink packet filter is allocated. If all EPS bearers (including a default EPS bearer for a PDN) are allocated to one or more uplink packet filters, the UE discards uplink data packets.

A P-GW routes downlink packets to different EPS bearers on the basis of downlink packet filters in TFTs allocated to EPS bearers in PDN connection. Upon reception of a downlink data packet, the P-GW evaluates a downlink packet filter having a lowest evaluation precedence index, and when no matching is discovered, performs evaluation of downlink packet filers in increasing order of evaluation precedence index. When a downlink data packet is tunneled to an S-GW on an EPS bearer associated with a TFT matched to the downlink packet filter, this procedure is performed until matching is discovered. When no matching is discovered, downlink data packets are transmitted through an EPS bearer to which no TFT is allocated. If TFTs are allocated to all EPS bearers (including a default EPS bearer for a PDN), the P-GW discards downlink data packets.

FIG. 17 is a diagram for describing bearer mapping in a wireless communication system to which the present invention can be applied.

In a UE, a UL TFT maps a traffic flow aggregate to an EPS bearer (i.e., EPS bearer ID) on uplink.

The UE stores mapping between uplink packet filters and radio bearers in order to generate mapping between traffic flow aggregates and radio bearers on uplink.

Radio bearers deliver packets of EPS bearers between the UE and an eNB. When radio bearers exist, EPS bearers are one-to-one mapped to the radio bearers. That is, EPS bearer IDs and RB IDs are one-to-one mapped. In other words, in the UE, an UL TFT maps a traffic flow aggregate to a radio bearer (i.e., RB ID) on uplink.

In a P-GW, a DL TFT maps a traffic flow aggregate to an EPS bearer (i.e., EPS bearer ID).

The P-GW stores mapping between downlink packet filters and S5/S8 bearers in order generate mapping between traffic flow aggregates and S5/S8 bearers on downlink.

S5/S8 bearers deliver packets of EPS bearers between an S-GW and the P-GW. EPS bearers are one-to-one mapped to S5/S8 bearers. That is, EPS bearers IDs are one-to-one mapped to S5/S8 TEIDs. In other words, in the P-GW, a DL TFT maps a traffic flow aggregate to an S5/S8 bearer (i.e., S5/S8 TEID) on downlink.

S1 bearers deliver packets of EPS bearers between the eNB and the S-GW.

The eNB stores one-to-one mapping between radio bearers and S1 bearers in order to generate mapping between radio bearers and S1 bearers on uplink and downlink. That is, RB IDs are one-to-one mapped to S1 TEIDs.

The S-GW stores one-to-one mapping between S1 bearers and S5/S8 bearers in order to generate mapping between S1 bearers and S5/S8 bearers on uplink and downlink. That is, S1 TEIDs are one-to-one mapped to S5/S8 TEIDs.

TFT: Traffic Flow Template

A TFT is composed of one or more packet filters identified by unique packet filter identifiers. A packet filter has an evaluation precedence index which is unique in all packet filters related to PDP contexts (or EPS bearers) which share the same packet data protocol (PDP) address (or PDN address/UE IP address) and an APN. The evaluation precedence index has a range between 255 (lowest evaluation precedence) and 0 (highest evaluation precedence). A UE manages packet filter identifiers and evaluation precedence indices thereof and generates packet filter content for packet filters generated thereby. A GGSN/P-GW manage packet filter identifiers and evaluation precedence indices thereof and generate packet filter content for packet filters generated by a network.

A packet filter has a direction attribute which indicates a direction of a traffic flow (i.e., whether a traffic flow is uplink, downlink or bi-directional).

The UE and the GGSN/P-GW use TFT and packet filter identifiers for operations for controlling a TFT and a packet filter.

The UE or GGSN/P-GW needs to include at least one valid packet filter when a new TFT is generated or an existing TFT is modified.

During modification of a TFT, one or more existing packet filters may be modified or deleted, or a new packet filter may be generated. To modify an existing packet filter, a new value for a packet filter attribute is transmitted from the UE to the GGSN/P-GW or transmitted from the GGSN/P-GW to the UE in addition to the packet filter ID.

When a related PDP context (or EPS bearer) is deactivated, a TFT is deleted.

Each valid downlink/uplink packet filter includes a unique ID in a set TFT, includes a unique evaluation precedence index among all packet filters for a pair of a PDP address (or PDN address/UE IP address) and an APN, and may include at least one of the following attributes.

IP 5 tuple (source IP address or source IPv6 network prefix, destination IP address or IPv4 network prefix, a source port number, a destination port number and a protocol ID)

Here, an IP address may be combined with a prefix mask. That is, a remote address and subnet mask, and a local address and mask may be included.

In addition, a port number may be specified as a port range. That is, the port range may be referred to as a local port range or a remote port range.

The protocol ID may be called a protocol number (IPv4) or a next header (IPv6).

Type of service (TOS) (IPv4)/traffic class (IPv6) and mask
IP security protocol (IPSec) security parameter index (IPSec SPI)
Flow label (IPv6)

In the above attribute list, "remote" refers to an external network entity and "local" refers to a UE.

In the above attribute list, some attributes may coexist in a packet filter and other attributes may be excluded.

Table 2 shows combinations of valid packet filter attributes.

TABLE 2

| Packet filter attribute | Valid combination types | | |
|---|---|---|---|
| | I | II | III |
| Remote Address and Subnet Mask | X | X | X |
| Protocol Number (IPv4)/Next Header (IPv6) | X | X | |
| Local Address and Mask | X | X | X |
| Local Port Range | X | | |
| Remote Port Range | X | | |
| IPSec SPI | | X | |
| TOS (IPv4)/Traffic Class (IPv6) and Mask | X | X | X |
| Flow Label (IPv6) | | | X |

Referring to Table 2, only attributes marked with "X" can be specified for a single packet filter. Here, all marked attributes may be specified or at least one attribute may be specified.

When parameters of a received packet header are matched to all specified attribute values in the packet filter, it can be considered that matching for this packet filter has been discovered. In this case, the evaluation procedure is suspended. Until such matching is discovered, other packet filters are evaluated in increasing order of evaluation precedence index.

SDT: Small Data Transmission

Efficient SDT is a key essential issue with respect to SDT.

Many MTC applications transmit or receive a small amount of data. MTC applications may cause inefficient use of resources in 3GPP systems. Due to this key issue, a solution for efficiently transmitting and receiving a small amount of data through a 3GPP system is required. The exact amount of data, which can be regarded as a small amount, may be different for proposals for system improvement. That is, the amount of data can correspond to the amount of data providing gain in proposals for system improvement.

It is assumed that SDT can occur at any time when data transmission is required according to an application. Prior to SDT, an MTC device can be attached to or detached from a network.

With respect to architectural requirements, the following functions are required for SDT.

A system needs to efficiently support small data transmission while minimizing effects (e.g., signaling overhead, network resources, delay for reallocation, etc.) on a network.

Optimization of frequent SDT is a key issue with respect to SDT.

Many mobile data applications (e.g., social networking applications, VoIP applications and the like) are characterized in that they transmit small data packets (from the viewpoint of packet size) on uplink and downlink. If a UE enters an idle mode immediately after completion of small data transmission, SDT may cause frequent transition of a UE between an idle state and a connected state.

If the UE remains in the connected mode for an extended period, this affects UE power consumption and a larger amount of control plane signaling for handover is required.

Such frequency transmission may have the following negative effects for networks and UEs.

Increased control plane signaling in a radio access network and a core network

Increased UE power consumption

A certain solution for optimization of SDT (e.g., keep-alive message) is considered in small data and device triggering enhancements (SDDTE). Here, signaling decrease according to the solution can reduce UE power consumption.

With respect to architectural requirements, the following functions are required to control frequent SDT in a network.
- A system needs to efficiently support frequent small data transmission while minimizing effects (e.g., signaling overhead, network resources, delay for reallocation, etc.) on a network.
- A system needs to support a mechanism for reducing high frequency of a signaling procedure (e.g., RRC signaling, paging/service request procedure or the like) caused by frequent SDT or frequent UE state transition.
- Specific Access Point Name (APN) for MTC UE As the number of MTC devices exponentially increases, there may be limitation in handling MTC devices using a limited IP version (IP version 4 (IP4)) address pool.

To solve this, the following model was proposed. This will be described below with reference to the following figure.

FIG. 18 is a diagram exemplifying an IP address assignment method in a wireless communication system to which the present invention can be applied.

FIG. 18 illustrates exemplary IP address assignment when servers 1, 2 and 3 are disposed by a mobile network operator (MNO) or owned by an application provider having MTC servers.

In the case of MTC, servers may be disposed by an application provider which uses a specific APN assigned by a PLMN operator or a PLMN having MTC servers.

In both the above cases, a tunneling mechanism between a GGSN (GPRS support node)/P-GW and a PDN of a server is used to permit a UE used for MTC to carry IP packets which enable private IP address assignment.

In the case of FIG. 18, the tunneling mechanism is used between GGSN/P-GW A and a PDN (i.e., PDN A) of server 1, between GGSN/P-GW B and a PDN (i.e., PDN B) of server 2 and between GGSN/P-GW C and a PDN (i.e., PDN C) of server 3. In addition, tunneling enables connection between server(s) using public IP network(s) and a PLMN.

Furthermore, tunneling enables multiple GGSNs/P-GWs and multiple servers to set up private network. Here, all GGSNs, P-GWs or servers may be disposed at different positions.

When an application (provider) uses an individual APN, servers with respect to different applications can use the same redundant private IP address as necessary without implementing a NAT function in a network when servers used for MTC belonging to one application and a UE used for MTC share the same private IP address space.

In the above model, an MTC server uses a specific APN assigned in the PLMN. In addition, tunneling exists between the GGSN/P-GW of the APN and the server.

A private IP address is assigned to a UE by a server. When the UE transmits traffic to an MTC server, a packet is routed to a GGSN/P-GW through a preconfigured APN and the GGSN/P-GW can transmit the corresponding packet to the server through a corresponding tunnel using the IP address of the corresponding server.

Here, a private IP address may be used as the IP address of the server.

Alternatively, the same IP address as the IP address of another server may be used. This is because the specific APN is used between the UE and the server and thus the corresponding packet is routed only to a specific GGSN/P-GW and the GGSN/P-GW can deliver the corresponding packet to the server through a tunneling path using the IP address of the server.

The terms that can be used in the specification are defined as follows.
- Home NodeB: a base state of a UMTS network, which is installed indoor and has a micro-cell coverage.
- Home eNodeB: a base station of an EPS network, which is installed indoor and has a micro-cell coverage.
- OMA DM (Open Mobile Alliance Device Management): a protocol which is designed to manage mobile devices such as cellular phones, PDA, portable computers, etc. and performs device configuration, firmware upgrade, error reporting, etc.
- OAM (Operation Administration and Maintenance): a network management function set providing network defect indication, performance information, data and diagnosis function.
- NAS configuration MO (Management Object): a management object used to configure NAS functionality related parameters for a UE.
- PDN (Packet Data Network): a network in which a server supporting a specific service (e.g. MMS (Multimedia Messaging Service) server, WAP (Wireless Application Protocol) server, etc.) is located.
- PDN connection: an association (connection) between a UE represented by an Internet protocol (IP) address and a PDN represented by an access point name (APN).
- APN (Access Point Name): a string for indicating or identifying a PDN. A service or network (PDN) requested by a UE is accessed through a corresponding PGW. A name (string) (e.g., internet.mnc012.mcc345.gprs) is pre-defined in the network to detect the PGW.
- NAS (Non-Access-Stratum): an upper stratum of a control plane between a UE and an MME, which supports mobility management, session management, IP address maintenance, etc. between the UE and the network.
- AS (Access-Stratum): a stratum including a protocol stack between a UE and a radio (or access) network and transmitting data and network control signals.

Uplink/Downlink Data Transmitting and Receiving Method

In conventional EPS systems, all UEs perform the predetermined procedure for transmitting and receiving the same mobile originated (MO)/mobile terminated (MT) data.

Conventional enhancement for SDT focuses on reduction of signaling of the procedure performed by each MTC UE.

However, it is inefficient for MTC UEs to repeat the same GTP signaling procedure in an environment in which multiple MTC UEs that transmit and receive similar small data exist. Further, a procedure which considers environments of MTC UEs having limited mobility and delimited destination is needed.

In addition, when all pieces of packet data are transmitted having IP addresses (source ID address and destination IP address) encapsulated therein, IP address overhead increases.

The present invention proposes a method in which multiple MTC UEs which transmit and receive small data use a configured common bearer to reduce a signaling load in a procedure for transmitting and receiving MO/MT data.

In other words, the present invention proposes a method of defining a common bearer which can be used for one or more UEs (i.e., UE group) and a method of transmitting uplink/downlink data using the same.

In addition, the present invention proposes an IP handling method performed by a P-GW. That is, the present invention proposes a method in which a UE transmits uplink data without an IP address and a P-GW encapsulates the uplink data (i.e., adds source/destination IP addresses) and transmits the uplink data to an external server (e.g., application server) through a tunnel in the case of uplink. The present invention proposes a method in which the P-GW decapsulates downlink data (i.e., removes IP addresses) and transmits the decapsulated downlink data to the UE in the case of downlink. In this manner, overhead with respect to IP addresses can be reduced by handling the IP addresses by the P-GW.

Although the present invention will be described on the basis of an SDT UE which has low mobility and one or fewer destinations for the sake of convenience, the present invention is not limited thereto. That is, in the following description of the present invention, an SDT UE may be replaced by a UE and an SDT group may be replaced by a UE group.

Common Bearer (or Group Bearer)

A group bearer or a common bearer proposed in the present invention refers to the same bearer assigned per UE group composed of one or more UEs. UEs belonging to a corresponding group can perform transmission and reception of MO/MT data through the corresponding bearer.

To uniquely identify each common bearer in a network, a group/common bearer ID (or group ID) may be assigned per common bearer. In this case, nodes in the network may equally identify a specific group bearer only using the group bearer ID.

In addition, to uniquely identify UEs belonging to each group, a UE ID may be assigned per UE. In the following description of the present invention, an ID for identifying a UE in each group is referred to as "in-group UE ID" to be discriminated from existing UE IDs (e.g., UE IP address, IMSI, S-TMSI, etc.).

As a method for realizing (or supporting) a common bearer, one bearer context (or group context) may be generated per SDT UE group and UEs belonging to each group may share the corresponding bearer context (or group context).

Alternatively, a method of generating a bearer context per UE and equally setting a bearer context per group may be used. In other words, a UE context may be generated per UE and UE contexts may be mapped to UE groups.

The common bearer can be configured and operated as follows.

1. Basic Operation of Common Bearer

A. A Radio Bearer May be Configured Per UE Group.

UEs (e.g., UEs camping on a cell of the same eNB) which belong to the same group may transmit uplink packets (or data) to an eNB through a common radio bearer configured for the corresponding group. Upon reception of the uplink packets, the eNB may transmit the uplink packets to an S-GW through a common S1 bearer configured for the corresponding group. Upon reception of the uplink packets, the S-GW may transmit the uplink packets to a P-GW through a common S5/S8 bearer configured per group. The P-GW may transmit the received uplink packets to an application server.

Here, the eNB may configure a dedicated radio resource pool per group and UEs may transmit uplink packets by using (occupying) radio resources in a contention manner in a radio resource pool configured for the group to which the UEs belong.

Similarly, when the P-GW receives downlink packets (or data) from the application server, the P-GW may check a group to which the received downlink packets need to be delivered and transmit the downlink packets to the S-GW through a common S5/S8 bearer configured for the group. Upon reception of the downlink packets, the S-GW may transmit the downlink packets to the eNB through a common S1 bearer configured for the corresponding group. Upon reception of the downlink packets, the eNB may transmit the downlink packets to UEs in the group through a common radio bearer configured for the group.

B. A Radio Bearer can be Configured Per UE.

A UE may transmit uplink packets (or data) to an eNB through a radio bearer configured therefor.

Here, the eNB needs to store a mapping relationship between radio bearers set for UEs belonging to a group and a group bearer configured for the group for each group.

Alternatively, the eNB may provide a dedicated resource pool for a group to UEs. In this case, the resource pool and a contention ID configured for the group may be used to identify a UE (or uplink/downlink traffic of the UE) in the group. Here, a contention ID may correspond to a value randomly selected by a UE within an arbitrary range or a value derived from a UE ID (e.g., IMSI, S-TMSI or the like).

Upon reception of uplink packets from a UE, the eNB may transmit the uplink packets to an S-GW through a common S1 bearer configured for the group to which the UE belongs. Upon reception of the uplink packets, the S-GW may transmit the uplink packets to a P-GW through a common S5/S8 bearer configured per group. Here, the P-GW may check the UE in the group, from which the uplink packets have been transmitted, and transmit the uplink packets to the application server.

Similarly, when the P-GW receives downlink packets (or data) from the application server, the P-GW may check a group and a UE in the group to which the received downlink packets need to be delivered and transmit the downlink packets to the S-GW through a common S5/S8 bearer configured for the group. Upon reception of the downlink packets, the S-GW may transmit the downlink packets to the eNB through a common S1 bearer configured for the corresponding group. Upon reception of the downlink packets, the eNB may check the UE in the group to which the downlink packets need to be transmitted and then transmit the downlink packets through a common radio bearer configured for the UE.

The method of checking, by the P-GW, a UE in the group from which the uplink packets have been transmitted and or the method of checking, by the P-GW/eNB, the UE in the group to which the downlink packets need to be transmitted will be described in detail below.

2. Configuration of Common Bearer

When the number of common bearers increases, handling can be subdivided for UEs (or UE groups) whereas the effect for reducing signaling overhead may be decreased. To maximize the effect, the number of UE groups can be limited. Furthermore, the number of UEs which transmit and receive packets through a common bearer can be maximized In addition, change of designated intermediate nodes (e.g., eNB and/or S-GW) can be restricted in order to improve the efficiency of common bearers. For example, S-GW changing operation such as selected IP traffic offload (SIPTO) can be limited.

A. Case in which One Common Bearer is Matched to One Group

A common bearer may be configured for one group through the same intermediate node (e.g., eNB and/or S-GW).

In this case, only packets of SDT UEs of the same group are transmitted through one common bearer, and thus network entities can identify a group corresponding to a packet delivered through a specific common bearer. Accordingly, only a UE identifier (ID) may be necessary for the network entities to identify a UE in the corresponding group (i.e., to identify UEs belonging to the group in the common bearer), which corresponds to the packet delivered through the specific common bearer. That is, the UE ID can be included in the packet.

B. Case in which the Same Common Bearer is Matched to Two or More Groups

1) Case in which Groups Matched to a Common Bearer are Identical Over all Interfaces An intermedia node (e.g., eNB and/or S-GW) associated with a path to which a common bearer is configured may match two or more groups to the same common bearer and handle the same in order to increase the efficiency of the common bearer.

In this case, network entities need to recognize a UE in a group which corresponds to a packet delivered through a specific common bearer. Accordingly, a group ID may be additionally included (or marked) in the delivered packet such that the network entities recognize whether the packet delivered through the specific common bearer is a packet for the corresponding group. That is, the group ID can be included along with the UE in the packet.

2) Case in which Groups Matched to a Common Bearer are Different for Interfaces

To increase the efficiency of a common bearer, a default intermediate node through which the common bearer needs to pass may be determined and common bearers of groups may be configured to pass the determined default intermediate node.

In this case, the efficiency of the common bearer can be improved through a way of sharing a bearer by interfaces of intermediate nodes. For example, when group 1 is configured such that a common bearer is generated through eNB1 and group 2 is configured such that the common bearer is generated through eNB2, an S5/S8 interface between an S-GW and a P-GW can be configured such that group 1 and group 2 share the common bearer by setting the same default S-GW for group 1 and group 2.

Here, when the default S-GW cannot be directly connected in an eNB of a cell on which a UE is currently camped, the common bearer can be generated to be connected to the default S-GW through other eNBs.

When a default eNB for specific groups is configured, a UE camped on a cell of another eNB transmits packets through the eNB to which the UE belongs and a configured (common) radio bearer, and then the packets may be delivered to the default eNB through X2 interface.

In this case, groups may have a hierarchical structure. That is, a group configured per interface may exist and a group of an upper interface may include a group of a lower interface.

In other words, a group which uses a common bearer in S5/S8 interface can include a group which uses a common bearer in S1 interface. In addition, a group which uses a common bearer in S1 interface can include a group which uses a common bearer in a radio interface.

For example, a group which uses a common bearer in S5/S8 interface can be configured to group A, groups which uses a common bearer in S1 interface can be configured to group A-A, group A-B, . . . . In addition, groups which uses a common bearer in a radio interface can be configured to group A-A-A, group A-A-B, . . . . Here, each node may need to recognize a group inclusion relationship.

3. Configuration of SDT UE for Common Bearer Handling

1) SDT UE Indication for Common Bearer

Only specific UEs instead of all UEs may use a common bearer. In this case, a network may need to know that a UE is an SDT UE which uses a common bearer in order to apply a packet delivery method using the common bearer.

the UE may directly notify the network that the UE is a UE which can use the common bearer or the fact that the UE is a UE which can use the common bearer may be pre-configured as subscription information of the UE so that the network know that the UE is a UE available the common bearer.

In the case of notifying the network, the UE may indicate that the UE is a UE which can use the common bearer through NAS layer signaling (e.g., attach, tracking area update (TAU), a message in a service request procedure, etc.) to the network. Alternatively, the network may regard a low-precedence UE as a UE (e.g., SDT UE) which can use the common bearer.

2) IP Address

A PDN address of a UE may be a private address assigned by an application server or an IP address allocated by a P-GW.

In this manner, a PDN address may be assigned by the P-GW or the application server when PDN connection is generated. Alternatively, a PDN address may be pre-configured as subscription information.

3) APN

An APN may be configured as subscription information, or an MME may store default APN information about a group.

4) Intermediate Node for Common Bearer

An intermediate node (e.g., S-GW and/or eNB) on a path through which a UE configures a common bearer may be pre-configured in UE subscription information, pre-configured in an MME or configured by the MME on the basis of pre-configured information or current configuration (e.g., UE group information).

4. Configuration of UE Group (or SDT Group)

A UE group (or SDT group) refers to a set of UEs which transmit packets (or data) on the same common bearer.

UEs (e.g., MTC UE and SDT UE) for which the same APN is configured can be configured as the same group.

An APN for each UE may be pre-configured in subscription information or an MME may store default APN information about each UE group.

When the MME configures an additional (or subdivided) group, the MME can configure a further subdivided group in consideration of an EPS subscribed QoS value or the current configuration of the UE (e.g., eNB and/or S-GW). In this case, UEs configured to the same APN may be configured as different SDT groups. For example, a group may be configured depending on whether EPS subscribed QoS has identical or similar values (e.g., QoS values belonging to a specific range) or whether an eNB and/or an S-GW are configured. Further, a group may be configured depending on destination (e.g., application server).

A group may be pre-configured on the basis of the aforementioned information depending on UEs or the MME may configure a group depending on pre-configured information or current configuration.

When a common bearer is configured, an intermediate node (e.g., S-GW and/or eNB) on a path through which a UE configures a common bearer may be pre-configured in UE subscription information. Alternatively, the intermediate node may be pre-configured in the MME or configured by the MME depending on pre-configured information or current configuration of the UE (e.g., UE group information). Here, the intermediate node (e.g., S-GW and/or eNB) may include the intermediate node described in 2. B. 1).

For example, all UEs belonging to the same eNB may be configured as the same group. The same group may perform data reception/transmission through the same network node (e.g., eNB, MME, S-GW and/or P-GW).

5. Common Bearer Activation/Deactivation

1) A common bearer may exist constantly. That is, activation of the common bearer may be requested by a UE or a network.

When activation of the common bearer is requested by a UE, the UE may indicate that the UE is a UE which can use the common bearer through a PDN connection request message and transmit the indication to an MME (refer to 3.1). The MME may confirm that the UE is an SDT UE using the common bearer and check or determine a group to which the UE belongs (refer to 4) to activate the common bearer.

When activation of the common bearer is requested by the network, it is possible to confirm that the UE is an SDT UE (refer to 3.1) and check or determine a group to which the UE belongs (refer to 4) to activate the common bearer.

In addition, the MME may configure an intermediate node for configuring the common bearer. Such an intermediate node may be pre-configured in UE subscription information, pre-configured in the MME per group, or configured by the MME with reference to pre-configured information or current configuration.

Here, when intermediate nodes are limited in order to increase the efficiency of the common bearer as mentioned in 2. B. 2), a default intermediate node (e.g., eNB and/or S-GW) can be set to a pre-configured node. Alternatively, the MME may determine the default intermediate node when the default intermediate node is not a pre-configured node. Alternatively, the MME may indicate the default intermediate node to other eNBs, S-GWs or UEs.

2) A network (e.g., eNB, MME, S-GW or P-GW) may activate/deactivate/modify the common bearer. Here, the common bearer may be activated/deactivated/modified per bearer interface (e.g., radio bearer, S1 bearer, S5 bearer).

In addition, the network (e.g., eNB, MME, S-GW or P-GW) may deactivate the common bearer upon determining that the efficiency of the common bearer is reduced or there is no packet transmission. Here, the bearer may be activated or deactivated per UE.

Furthermore, the network (e.g., eNB, MME, S-GW or P-GW) may modify the common bearer depending on the current configuration of the bearer (e.g. the quantity or type of traffic and the number of groups).

The above description is arranged as follows.

FIG. 19 is a diagram exemplifying the concept of a common bearer according to an embodiment of the present invention.

In FIG. 19, it is assumed that UEs belonging to the same group transmit and receive data using the same eNB, S-GW and P-GW and UEs belonging to the same eNB are included in the same group.

According to this assumption, UE 1 and UE 2 belonging to eNB 1 (that is, connected to eNB 1) belong to group 1 and use a common bearer for group 1, and UE 3 and UE 4 belonging to eNB 2 (that is, connected to eNB 2) belong to group 2 and use a common bearer for group 2 in FIG. 12.

Common Bearer Per Group

A common bearer per group can be activated all the time.

When deactivated generation is observed for a predetermined time (e.g., guard time) (i.e., when there is not UE traffic) in a conventional S1 based system (refer to FIG. 9), common bearers can be released. Here, only bearer (i.e., S1 bearer and/or S5 bearer) of a specific connection may be released.

Radio Bearer

As shown in the example of FIG. 19, an individual radio bearer may be set per UE.

In this case, the following two scenarios may be provided in operation of radio bearers.

A radio bearer can be activated only when a UE transmits data and the radio bearer can be released immediately after data transmission of the UE is completed.

Alternatively, when deactivated generation is observed for a predetermined time (e.g., guard time) (i.e., when there is not UE traffic) in a conventional S1 based system (refer to FIG. 9), radio bearers can be released.

Location Update Procedure

Since UEs belonging to the same eNB are included in the same group, as described above, a group to which a UE belongs needs to be changed when an eNB including the UE is changed due to mobility of the UE. Accordingly, a location update (i.e., tracking area update (TAU) or routing area update (RAU)) procedure can be performed per eNB.

Alternatively, a UE may perform the location update procedure whenever a tracking area (TA) (or routing area (RA)) is changed or at predetermined intervals as in conventional systems.

An eNB, an MME and a P-GW may update a group context whenever the location update procedure is performed. Here, group context update may be performed by a specific entity (e.g., any one of the eNB, the MME and the P-GW), and group context synchronization between entities may be performed.

S-GW Operation

There is a high likelihood of an SDT UE or an MTC UE applying a power saving mode (PSM) or enhanced discontinuous reception (eDRX).

In this case, in order to transmit downlink data to the UE rapidly and efficiently, an S-GW may be previously aware of a timing at which the UE can receive downlink data or paging. That is, the S-GW may be aware of a timing at which the UE wakes up from the PSM or eDRX by receiving the timing from an MME through interaction with the MME. In addition, when the S-GW receives downlink data to be transmitted to the UE from a P-GW before the timing at which the UE wakes up from the PSM or eDRX, the S-GW may buffer the downlink data of the UE until the timing.

Downlink Data Reception Procedure

The following operation can be performed on the assumption that the S-GW knows a timing at which the UE can receive downlink data or paging.

If an eNB can buffer downlink data, downlink data traffic can be immediately delivered from the S-GW to the eNB at a timing when the S-GW determines that the UE can receive the downlink data. Here, the eNB can directly transmit the received downlink data to the UE.

On the contrary, when the eNB cannot buffer downlink data, the S-GW can notify the eNB of information on the timing at which the UE can receive downlink data or paging immediately before or prior to the timing. In this case, the eNB may transmit paging to the UE at the timing when the UE wakes up (i.e., timing when the UE can receive downlink data or paging) to wake up the UE and then notify the S-GW of wake-up of the UE or the S-GW may immediately transmit downlink data to the UE at the timing when the UE wakes up.

If a packet size is very small, a burden of the eNB for downlink data buffering may be small.

Paging with DL Traffic

Alternatively, the eNB may transmit a downlink packet to the UE simultaneously with the paging.

In this case, it is necessary to securely process downlink data such that only the corresponding UE can decode and restore data. To this end, security needs to be configured between UEs and the eNB or between UEs and the MME per UE.

Hereinafter, operation of each network entity to realize a method of transmitting packets using a common bearer will be described.

FIG. 20 is a diagram exemplifying a packet forwarding method in a wireless communication system to which the present invention can be applied.

FIG. 20 illustrates a downlink packet forwarding process.

First, the downlink packet forwarding method is described.

When an application server (AS) has a packet that the AS desires to transmit to UEs, the application server (AS) transmits the downlink packet 2010 to a P-GW.

Here, the downlink packet 2010 is composed of an IP header 2011 and an IP payload 2012. The IP header 2011 includes a source IP (SIP) and a destination IP (DIP). In addition, the IP header 2011 includes a source port number, a destination port number and a protocol identifier, which are not shown in FIG. 20. Since FIG. 20 illustrates the downlink packet forwarding process, the SIP may be set to the IP address of the AS and the DIP may be set to IP address of a UE. The IP payload 2012 includes content to be forwarded from the AS to UEs.

The P-GW checks the identity (e.g., IP addresses, IMSIs or the like) of UEs to which the downlink packet needs to be transmitted through the DIP of the IP header 2011 of the downlink packet. In addition, the P-GW identifies an EPS bearer carrying the downlink packet on the basis of a downlink packet filter in TFT allocated per EPS bearer using a 5-tuple (i.e., a source IP address, a destination IP address, a source port number, a destination port number and a protocol identifier) included in the IP header 2011 of the downlink packet received from the AS. That is, the P-GW identifies the ID (e.g., EPS bearer ID and/or S5/S8 bearer TEID) of the bearer through which the downlink packet needs to be transmitted. In other words, the P-GW forwards a downlink packet 2020 to the S-GW through an EPS bearer determined on the basis of a downlink packet filter in TFT allocated per EPS bearer.

Here, the P-GW forwards the downlink packet 2020, which is generated by attaching a GPRS tunneling protocol (GTP) tunneling header 2021 to the downlink packet 2010 and 2022 received from the AS, to the S-GW. Here, the P-GW may forward the downlink packet 2020 to the S-GW through an S5/S8 bearer mapped to the EPS bearer identified using the 5-tuple of the downlink packet 2010.

The GTP tunneling header 2021 includes an SIP, a DIP and a GTP header (GTP-U). Since FIG. 20 illustrates the downlink packet forwarding process, the SIP may be set to the IP address of the P-GW, the DIP may be set to the IP address of the S-GW and the GTP header may be set to the S5 bearer TEID (downlink).

S-GW checks the ID (e.g., an E-RAB bearer ID and/or an S1 bearer TEID) of a bearer through which the downlink packet needs to be transmitted and the IDs (e.g., IMSIs, S-TMSIs or the like) of UEs through the GTP header (i.e., S5 bearer TEID) included in the GTP tunneling header 2021 of the downlink packet received from the P-GW.

Here, the S-GW forwards a downlink packet 2030, which is generated by modifying the GTP tunneling header (or removing the GTP tunneling header 2021 and attaching a new tunneling header 2031) in the downlink packet 2020 received from the P-GW, to eNBs. Here, the S-GW may forward the downlink packet 2030 to the eNBs through an S1 bearer mapped to the S5/S8 bearer through which the downlink packet 2020 is transmitted.

Since FIG. 20 illustrates the downlink packet forwarding process, the SIP may be set to the IP address of the S-GW, the DIP may be set to the IP address of an eNB and the GTP header may be set to the S1 bearer TEID (downlink).

The eNBs check the ID (e.g., a DRB ID) of a bearer through which the downlink packet needs to be transmitted and the IDs (e.g., C-RNTIs) of UEs through the GTP header (i.e., S1 bearer TEID) included in the GTP tunneling header 2031 of the downlink packet received from the S-GW or an E-RAB ID mapped to the GTP header.

Here, the eNBs remove the GTP tunneling header 2031 from the downlink packet 2030 received from the S-GW and forward a downlink packet 2040 to UEs through the identified bearer (i.e., DRB). That is, the eNBs may attach the identified DRB ID (or LCID) to a payload 2232 of the downlink packet received from the S-GW and forward the downlink packet 2040 to the UEs through the corresponding DRB.

Next, an uplink packet forwarding method will be described.

When a UE has a packet that the UE desires to transmit to an AS, the UE transmits the uplink packet to an eNB through a DRB allocated thereto.

Here, the uplink packet is composed of an IP header and an IP payload. The IP header includes a source IP (SIP) and a destination IP (DIP). In addition, the IP header includes a source port number, a destination port number and a protocol identifier. In the case of the uplink packet, the SIP may be set to the IP address of the UE and the DIP may be set to the IP address of the AS. The IP payload includes content to be forwarded from the UE to the AS.

The UE identifies an EPS bearer carrying the uplink packet on the basis of an uplink packet filter in TFT allocated per EPS bearer using a 5-tuple (i.e., a source IP address, a destination IP address, a source port number, a destination port number and a protocol identifier) included in the IP header of the uplink packet. That is, the UE checks the ID (e.g., EPS bearer ID and/or DRB ID) of the bearer through which the uplink packet needs to be transmitted. In other words, the UE forwards the uplink packet to the eNB through a DRB (i.e., DRB one-to-one mapped to the EPS bearer) determined on the basis of an uplink packet filter in TFT allocated per EPS bearer.

The eNB checks the identifier (e.g., IP address, IMSI or the like) of the UE to which the corresponding downlink packet needs to be forwarded through the SIP of the IP header 2011 of the uplink packet received from the UE. In addition, the eNB checks an S1 bearer TEID mapped to the DRB ID forwarded in the downlink packet (or included in the uplink packet).

Here, the eNB forwards the uplink packet, which is generated by attaching a GTP tunneling header to the uplink packet received from the UE, to the S-GW. Here, the eNB may forward the uplink packet to the S-GW through an S1 bearer mapped to the DRB through which the uplink packet is forwarded.

For example, the SIP may be set to the IP address of the eNB, the DIP may be set to the IP address of the S-GW and the GTP header may be set to the S1 bearer TEID (uplink).

S-GW checks the ID (e.g., S5/S8 bearer TEID (uplink)) of a bearer through which the uplink packet needs to be transmitted and the ID (e.g., IMSI, S-TMSI or the like) of the UE from the GTP header (i.e., S1 bearer TEID (uplink)) included in the GTP tunneling header of the uplink packet received from the eNB.

Here, the S-GW forwards an uplink packet, which is generated by modifying the GTP tunneling header (or removing the GTP tunneling header and attaching a new tunneling header) in the uplink packet received from the eNB, to a P-GW. Here, the S-GW may forward the uplink packet to the P-GW through an S5/S8 bearer mapped to the S1 bearer through which the uplink packet is transmitted.

For example, the SIP may be set to the IP address of the S-GW, the DIP may be set to the IP address of the P-GW and the GTP header may be set to the S5/S8 bearer TEID (uplink).

The P-GW removes the GTP tunneling header from the received uplink packet, checks the AS to which the uplink packet is to be transmitted through the DIP included in the IP header of the uplink packet and then transmits the uplink packet to the AS.

FIG. 21 is a diagram exemplifying a packet forwarding method using a group bearer according to an embodiment of the present invention.

FIG. 21 illustrates a downlink packet forwarding process.

First, the downlink packet forwarding method will be described.

When an application server (AS) has a packet that the AS desires to transmit to UEs, an application server (AS) transmits the downlink packet 2110 to a P-GW.

Here, the downlink packet 2110 is composed of an IP header 2111 and an IP payload 2112. The IP header 2111 includes a source IP (SIP) and a destination IP (DIP). In addition, the IP header 2111 includes a source port number, a destination port number and a protocol identifier, which are not shown in FIG. 21. Since FIG. 21 illustrates the downlink packet forwarding process, the SIP may be set to the IP address of the AS and the DIP may be set to the IP address of a UE. The IP payload 2112 includes content to be forwarded from the AS to the UE.

A PDN address (i.e., IP address) with respect to connection of a PDN to which a common bearer of UEs belongs may be assigned by the P-GW or the AS or pre-configured as subscription information.

The P-GW knows information about UEs whish uses the common bearer and a group to which the UEs belong. Here, the P-GW may know the information by receiving the same from an HSS or being signaled by a UE. The P-GW has a mapping table with respect to IP address information and group information of such SDT UEs.

When the downlink packet arrives at the P-GW, the P-GW may recognizes that the downlink packet is destined for SDT UE through a 5-tuple (i.e., a source IP address, a destination IP address, a source port number, a destination port number and a protocol identifier) included in the IP header 2111 of the packet and check information on a group to which the UEs belong. In addition, the P-GW can check a common bearer corresponding to the group by checking the group information.

Here, the P-GW may indicate in-group UE IDs in the downlink packet. If when one or more groups share the same common bearer (refer to 2.B), the P-GW may additionally indicate a group ID in the packet. Here, if groups are hierarchically configured, the P-GW may indicate finally fragmented group IDs in the packet.

That is, the P-GW may remove the IP header from the downlink packet 2010 received from the AS and attach in-group UE IDs (or additionally group IDs) to the downlink packet to generate a new IP packet 2122, differently from FIG. 20.

Subsequently, the P-GW may encapsulate an S-GW address and group ID in the packet depending on configuration of a common bearer configured per group and forward the packet through a corresponding GTP tunnel. That is, the P-GW forwards a downlink packet 2120 generated by attaching a GTP tunneling header 2121 to the generated IP packet 2122 to the S-GW. Here, the P-GW may forward the downlink packet 2120 to the S-GW through a group bearer identified using the 5-tuple of the downlink packet 2110.

The GTP tunneling header 2121 includes an SIP, a DIP and a GTP header (GTP-U). Since FIG. 21 illustrates the downlink packet forwarding process, the SIP may be set to the IP address of the P-GW, the DIP may be set to the IP address of the S-GW and the GTP header may be set to a group bearer ID (i.e., group ID).

The S-GW checks a group bearer through which the downlink packet needs to be forwarded and IDs (e.g., IMSIs, S-TMSIs or the like) of UEs through the GTP header (i.e., group ID) included in the GTP tunneling header 2121 of the downlink packet received from the P-GW.

The S-GW may also encapsulate eNB addresses and a group ID configured in the corresponding common bearer in the downlink packet and forward the downlink packet through the corresponding GTP tunnel. In other words, the S-GW forwards, to eNBs, a downlink packet 2130 generated by modifying the GTP tunneling header (or removing the GTP tunneling header 2121 and attaching a new GTP tunneling header 2131) in the downlink packet 2120 received from the P-GW. Here, the S-GW may forward the downlink packet 2130 to the eNBs through the group bearer identified through the group ID included in the downlink packet 2120.

Since FIG. 21 illustrates the downlink packet forwarding process, the SIP may be set to the IP address of the S-GW, the DIP may be set to the IP address of an eNB and the GTP header may be set to the group ID.

Here, if one or more groups share the same common bearer (refer to 2.B) and the common bearer is branched off into one or more bearers at an intermediate node, the packet can be forwarded to a default intermediate node.

If the default intermediate node is configured only in the S-GW, the packet can be forwarded to the S-GW. In addition, the S-GW can confirm a path through which the packet is forwarded to an eNB by checking a group ID.

When the default intermediate node is configured in both the S-GW and an eNB, the packet can be forwarded to the eNB. In addition, when the eNB checks the group ID and recognizes that the packet needs to be forwarded to another eNB, the eNB can forward the packet to the other eNB. If the eNB is the last intermediate node to which the packet is forwarded, the eNB may recognize UEs to which the packet needs to be forwarded by checking the group ID and UE IDs of the packet. The process through which the eNB forwards the packet to the UEs may conform to a conventional technique.

The eNB checks a DRB identifier (i.e., DRB ID) configured for a UE to which the downlink packet needs to be forwarded through the GTP header (i.e., group ID) and UE IDs included in the GTP tunneling header 2131 of the downlink packet received from the S-GW and checks a UE ID (e.g., C-RNTI).

In addition, the eNB removes the GTP tunneling header 2131 from the downlink packet 2130 received from the S-GW and forwards a downlink packet 2140 to the UE through the identified bearer (i.e., DRB). That is, the eNB may attach the identified DRB ID (or LCID) to the downlink packet 2130 received from the S-GW and forward the downlink packet 2140 to the UE through the corresponding DRB.

Here, when the eNB matches one or more common bearers to one group (refer to 2.A), the eNB needs to know mapping between UE IDs (i.e., in-group UE UDs) and in-cell UE IDs (e.g., C-RNTIs). Similarly, when two or more groups are matched to the same common bearer (refer to 2.B), the eNB needs to know in-cell UE IDs (e.g., C-RNTIs) mapped to UE IDs and group IDs.

Accordingly, the eNB can recognize a UE to which the packet needs to be forwarded, attach a logical channel ID (LCID) of the UE to a header of a MAC PDU and forward the packet to the UE.

Next, an uplink packet forwarding method will be described.

When uplink traffic is transmitted, a UE may attach a logical channel ID (LCID) corresponding to a common bearer to a header of a MAC PDU and transmit the uplink traffic to an eNB.

The eNB encapsulates an S-GW address of an S1 bearer and a group ID mapped to the LCID in an uplink packet and transmits the uplink packet to an S-GW through a corresponding GTP tunnel.

Here, the eNB may indicate the UE ID corresponding to the UE or indicate the UE ID and the group ID tougher and forward the uplink packet to the next intermediate node.

The subsequent process of forwarding the uplink traffic to a P-GW corresponds to a reverse of the process of forwarding downlink traffic.

The S-GW may also encapsulate a P-GW address and group ID configured in the corresponding common bearer in the uplink packet and forward the packet through a corresponding GTP tunnel. In other words, the S-GW forwards, to the P-GW, an uplink packet generated by modifying the GTP tunneling header (or removing the GTP tunneling header and attaching a new GTP tunneling header) in the uplink packet received from the eNB. Here, the S-GW may forward the uplink packet to the P-GW through a group bearer identified using the group ID included in the uplink packet.

When the uplink packet arrives at the P-GW, the P-GW transmits the uplink packet to the AS.

A procedure using a group bearer on the following assumption will be described in more detail.

All UEs belonging to the same eNB may not be included in the same group. In this case, network entities (e.g., an eNB, an MME, an S-GW and a P-GW) need to share group information (e.g., a group number (Group#)) during signaling and need to have group contexts. In addition, group information needs to be updated whenever the group information is changed.

If all UEs belonging to the same eNB are included in the same group, group information sharing and group context related (i.e., group context generation and update) processes may be omitted in the following example.

It is assumed that "a common bearer is matched to one group" (refer to 2. configuration of common bearer).

In the description of the present invention, a common bearer used by the same group is defined per section. A radio bearer, an S1 bearer and an S5/S8 bearer for a group are referred to as a group radio bearer, a group S1 bearer and a group S5/S8 bearer, respectively.

In addition, it is assumed that UEs belonging to the same group use the same S1 bearer and the same S5/S8 bearer by default in the present embodiment. In the case of a radio bearer, a group radio bearer may be commonly configured per group. For example, the same resource pool is configured per group and UEs in a group may operate on the basis of contention in the same resource pool. Here, when contention intensifies, an eNB may modify the group radio bearer for the corresponding group or configure an additional group radio bearer.

A) Attach Procedure

FIGS. 22A and 22B exemplify an attach procedure using a group bearer according to the embodiment of the present invention.

Although the present invention will be description based on the attach procedure, the present invention can be equally applied to a PDN connectivity procedure.

A Option 1)

FIG. 22 assumes a state in which group context is activated in an eNB and an MME/SGSN, a group S1 bearer is activated between the eNB and an S-GW and a group S5/S8 bearer is activated between the S-GW and a P-GW.

Referring to FIG. 22, a UE initiates the attach procedure by transmitting an Attach Request message to the MME (S2201 and S2202).

The Attach Request message may include the IMSI (International Mobile Subscriber Identity) of the UE and a PDN type requested by the UE. Here, the PDN type indicates an IP version (i.e., IPv4, IPv4v6 or IPv6) requested by the UE.

The Attach Request message may be transmitted being included in an RRC Connection Setup Complete message through RRC connection (S2201) and transmitted being included in an initial UE message through S1 signaling connection (S2202).

The UE may transmit the Attach Request message along with a PDN Connectivity Request message in order to request PDN connectivity.

Steps 3 to 11 of the existing attach procedure may be performed in the same manner (S2203). This may be incorporated into the present procedure with reference to 3GPP TS 23.401.

The MME/SGSN checks SDT UEs and groups (S2204).

First, a method of checking whether a UE which has transmitted an Attach Request (and a PDN Connectivity Request) is an SDT UE will be described.

According to the present embodiment, upon reception of the Attach Request (and PDN Connectivity Request), the MME/SGSN checks whether the corresponding UE is an SDT UE. To perform this operation, the MME/SGSN can recognize that the corresponding UE is not an SDT UE through one of the following methods.

UE subscription information may include information indicating that the corresponding UE is an SDT UE. In this case, the MME/SGSN may check whether the UE is an SDT UE by acquiring UE subscription information from an HSS.

An Attach Request message or a PDN Connectivity Request message including information indicating that the corresponding UE is an SDT UE may be transmitted. In this case, although radio connection overhead may occur, this message can be used to discriminate an individual bearer from a group bearer when SDT UEs use individual bearers instead of a group/common bearer along with a group bearer.

Subsequently, when the corresponding UE is an SDT UE, the MME/SGSN may be aware of information on the group to which the corresponding UE belongs through one of the following methods.

UE subscription information may include information on the group to which the UE belongs. In this case, the MME/SGSN may check the group information of the UE by acquiring UE subscription information.

A NAS message (e.g., Attach/TAU Request/Service Request messages) including information indicating a group to which the UE belongs may be transmitted.

The MME/SGSN may determine the group of the corresponding UE depending on pre-configured information or information configured currently in the UE (refer to 4. configuration of UE group (or SDT group)).

The MME/SGSN updates the group context (S2205).

Upon checking that the corresponding UE is an SDT UE and recognizing the group to which the corresponding UE belongs in the previous step, the MME checks whether the group context of the group to which the corresponding UE belongs has been generated, and when the generated group context exists, updates the corresponding UE information in the group context.

The MME/SGSN transmits a Group Context Updating Request message to the eNB (S2206) and transmits a Group Context Updating Request message to an S-GW (2207).

Here, the Group Context Updating Request message includes an in-group UE ID for identifying the UE in the group to which the UE belongs and a group ID for identifying a group bearer.

Although FIG. 22 illustrates a case in which S2207 is performed after S2206, this is for the sake of convenience of description and S2207 may be performed prior to S2206 or S2206 and S2207 may be simultaneously performed.

The S-GW transmits a Group Context Updating Request message to a P-GW (S2208).

Here, the Group Context Updating Request message includes an in-group UE ID for identifying the UE in the group to which the UE belongs and a group ID for identifying a group bearer.

Upon reception of the Group Context Updating Request message from the MME/SGSN, the eNB updates the group context (S2209).

Upon confirming the group to which the corresponding UE belongs, the eNB checks whether the group context of the group to which the corresponding UE belongs has been generated, and when the generated group context exists, updates the corresponding UE information in the group context.

Similarly, upon reception of the Group Context Updating Request message from the S-GW, P-GW updates the group context (S2210).

Upon confirming the group to which the corresponding UE belongs, the P-GW checks whether the group context of the group to which the corresponding UE belongs has been generated, and when the generated group context exists, updates the corresponding UE information in the group context.

The P-GW transmits a Group Context Updating Response message to the S-GW in response to the Group Context Updating Request message (S2211).

The S-GW transmits a Group Context Updating Response message to the MME/SGSN in response to the Group Context Updating Request message (S2212).

Since it is assumed that the group bearer is configured all the time, GTP signaling (session generation request/request messages) for configuring the group S1 bearer and group S5/S8 bearer may not be performed.

The MME transmits an Attach Accept message to the UE in response to the Attach Request message (S2213 and S2214).

The Attach Accept message may include a group ID, an APN, a UE IP address (i.e., PDN address) assigned by the P-GW, a PDN type, a tracking area identity (TAI) list, a TAU timer, etc.

The Attach Accept message may be included in an Initial Context Setup Request message and transmitted to the eNB through S1 signaling connection (S2213).

In addition, the Attach Accept message may be included in an RRC Connection Reconfiguration message and transmitted from the eNB to the UE through RRC connection (S2214).

The eNB establishes a radio bearer per UE in execution of S2213 and S2214. The eNB may have information on mapping between the radio bearer per UE and a group S1 bearer. Even when a resource pool is configured per group, the eNB may store information on mapping between the resource pool per group and a group S1 bearer.

When one or more groups share a group radio bearer, the eNB or the MME needs to recognize a relationship between group radio bearers and group S1 bearers and the S-GW also needs to recognize a relationship between group S1 bearers and group S5/S8 bearers.

The UE transmits an RRC Connection Reconfiguration Complete message to the eNB (S2215).

The UE transmits an Attach Complete message to the MME in response to the Attach Accept message (S2216 and S2217).

The Attach Complete message is forwarded being included in a Direct Transfer message through RRC connection (S2216) and forwarded being included in an Uplink NAS Transport message through S1 signaling connection (S2217).

Upon completion of this procedure, the UE can recognize that the group has been successfully registered to the network and, when uplink data is generated, transmit the uplink data to the P-GW through the group (common) bearer.

As necessary, the MME may transmit a Modify Bearer Request message to the S-GW (S2218).

As necessary, the S-GW may transmit a Modify Bearer Response message to the MME in response to the Modify Bearer Request message (S2219).

Here, the Modify Bearer Request/Response messages transmission and reception procedures may not performed in steps S2218 and S2219 because the group S1 bearer has been activated.

Upon completion of this procedure, the P-GW may transmit downlink data to the UE through the group (common) bearer.

The MME may transmit a Notify Request message including the P-GW ID (i.e., P-GW address) and the APN to the HSS as necessary (S2220).

The HSS may store the P-GW ID (i.e., P-GW address) and related APN and transmit a Notify Response message to the MME (S2221).

A Option 2)

FIG. 23 exemplifies an attach procedure using a group bearer according to an embodiment of the present invention.

The attach procedure of FIG. 23 illustrates a case in which the first UE in a group performs the attach procedure. In other words, this means a state in which any UE belonging to the corresponding group does not perform attachment (PDN connectivity request), that is, the group context for the corresponding group exists.

Referring to FIG. 23, a UE initiates the attach procedure by transmitting an Attach Request message to an MME (S2301 and S2302).

The Attach Request message may include the IMSI (International Mobile Subscriber Identity) of the UE, a PDN type requested by the UE and the like. Here, the PDN type refers to an IP version (i.e., IPv4, IPv4v6 or IPv6) requested by the UE.

The Attach Request message may be transmitted being included in an RRC Connection Setup Complete message through RRC connection (S2301) and transmitted being included in an Initial UE message through S1 signaling connection (S2302).

The UE may transmit the Attach Request message along with a PDN Connectivity Request message in order to request PDN connectivity.

Steps 3 to 11 of the existing attach procedure may be equally performed (S2303). The steps may be incorporated into the present procedure with reference to 3GPP TS 23.401.

The MME/SGSN checks SDT UEs and groups (S2304).

First, a method of checking whether a UE which has transmitted an Attach Request (and a PDN Connectivity Request) is an SDT UE will be described.

According to the present embodiment, upon reception of the Attach Request (and PDN Connectivity Request), the MME/SGSN checks whether the corresponding UE is an SDT UE. To perform this operation, the MME/SGSN can recognize that the corresponding UE is not an SDT UE through one of the following methods.

UE subscription information may include information indicating that the corresponding UE is an SDT UE. In this case, the MME/SGSN may check whether the UE is an SDT UE by acquiring UE subscription information from an HSS.

An Attach Request message or a PDN Connectivity Request message including information indicating that the corresponding UE is an SDT UE may be transmitted. In this case, although radio connection overhead may occur, this message can be used to discriminate an individual bearer from a group bearer when SDT UEs use individual bearers instead of a group/common bearer along with a group bearer.

Subsequently, when the corresponding UE is an SDT UE, the MME/SGSN may be aware of information on the group to which the corresponding UE belongs through one of the following methods.

UE subscription information may include information on the group to which the UE belongs. In this case, the MME/SGSN may check the group information of the UE by acquiring UE subscription information from the HSS.

A NAS message (e.g., Attach/TAU Request/Service Request messages) including information indicating a group to which the UE belongs may be transmitted.

The MME/SGSN may determine the group of the corresponding UE depending on pre-configured information or information configured currently in the UE (refer to 4. configuration of UE group (or SDT group)).

The MME/SGSN updates the group context (S2305).

Upon confirming that the corresponding UE is an SDT UE and recognizing the group to which the corresponding UE belongs in the previous step, the MME/SGSN generates a group context including information on mapping between the UE and the group.

The MME/SGSN assigns a group ID to the group/common bearer and transmits a Create Session Request message including the group ID to the S-GW (S2306).

The Create Session Request message may further include the IMSI of the UE, a P-GW ID (i.e., P-GW address) generated by the MME for common bearer generation, an APN, a subscribed QoS profile received from an HSS, a PDN type, a UE IP address (i.e., PDN address), etc.

The S-GW transmits a Create Session Request message including the group ID to a P-GW included in the Create Session Request message received from the MME (S2307).

The Create Session Request message may further include the IMSI of the UE, an APN, a subscribed QoS profile, a PDN type (i.e., IP version), a UE IP address (i.e., PDN address), etc.

The P-GW needs to know group information of the UE. To signal the group information of the UE to the P-GW, GTP signaling such as the Create Session Request message may be transmitted to the P-GW as in the example of FIG. 23.

Alternatively, differently from FIG. 23, the group information of the UE may be transmitted to the P-GW through GTP signaling such as a Modify Bearer Request message in steps S2319 and S2320.

Alternatively, the PDN Connectivity Request message indicates the group information of the UE. In this case, the group information of the UE may not be transmitted in S2306 and S2307 or S2319 and S2320. In this case, the UE needs to have information on the group to which the UE belongs.

Here, the S-GW may be aware of the group information, and when two or more groups are matched to the same common bearer, use the group information.

Upon confirmation of the group information of the UE, the P-GW generates a group context including information on mapping between the UE and the group (S2308).

The P-GW assigns an IP (Internet Protocol) address to be used by the UE and performs PCRF and IP-CAN (IP connectivity access network) session establishment/modification procedure (S2309).

Here, the P-GW may assign an IP address selected from an IP address pool owned thereby to the UE in the case of dynamic IP address allocation, and assign static IP address information (included in subscription information) allocated to the corresponding UE equally in the case of static IP address allocation.

The P-GW transmits a Create Session Response message to the S-GW in response to the Create Session Request message (S2310).

The Create Session Response message may include the IMSI of the UE, the group ID, a subscribed QoS profile, a PDN type, the IP address (i.e., PDN address) assigned to the UE, etc.

Upon completion of this procedure, generation of an S5/S8 bearer between the S-GW and the P-GW is completed and thus the S-GW can transmit uplink traffic to the P-GW or receive downlink traffic from the P-GW.

The S-GW transmits a Create Session Response message to the MME in response to the Create Session Request message (S2311).

The Create Session Response message may include the IMSI of the UE, the group ID, the PDN type, the IP address (i.e., PDN address) of the UE, etc.

The MME transmits an Attach Accept message to the UE in response to the Attach Request message (S2312 and S2314).

The Attach Accept message may include the group ID, the APN, the IP address (i.e., PDN address) of the UE assigned by the P-GW, the PDN type, a TAI list, a TAU timer, etc.

The Attach Accept message is included in an Initial Context Setup Request message and transmitted to an eNB through S1 signaling connection (S2312).

Upon completion of this procedure, generation of an uplink group S1 bearer between the eNB and the S-GW is completed and thus the eNB can transmit uplink traffic to the S-GW.

The eNB generates a group context including information on mapping between the UE and the group upon confirmation of the group information of the UE (S2313).

The Attach Accept message is included in an RRC Connection Reconfiguration message and transmitted from the eNB to the UE through RRC connection (S2314).

In execution of steps S2312 to S2314, the eNB establishes a radio bearer per UE. The eNB may have information on mapping between the radio bearer per UE and a group S1 bearer. Even when a resource pool is configured per group, the eNB may stores information on mapping between the resource pool per group and a group S1 bearer.

When one or more groups share a group radio bearer, the eNB or the MME needs to recognize a relationship between group radio bearers and group S1 bearers and the S-GW also needs to recognize a relationship between group S1 bearers and group S5/S8 bearers.

The UE transmits an RRC Connection Reconfiguration Complete message to the eNB (S2315).

The eNB transmits an Initial Context Setup Response message to the MME in response to the Initial Context Setup Request message (S2316).

The UE transmits an Attach Complete message to the MME in response to the Attach Accept message (S2317 and S2318).

The Attach Complete message is forwarded being included in a Direct Transfer message through RRC connection (S2317) and forwarded being included in an Uplink NAS Transport message through S1 signaling connection (S2318).

Upon completion of this procedure, generation of an uplink group (common) bearer between the UE and the P-GW is completed and thus the UE can transmit uplink data to the P-GW.

The MME transmits a Modify Bearer Request message to the S-GW (S2319).

Upon completion of this procedure, generation of a group downlink S1 bearer between the eNB and the S-GW is completed and thus the eNB can receive downlink traffic from the S-GW.

As necessary, the S-GW transmits a Modify Bearer Request message to the P-GW (S2320), and the P-GW transmits a Modify Bearer Response message to the S-GW in response to the Modify Bearer Request message (S2321).

Here, the group information of the UE may be transmitted to the P-GW through GTP signaling such as the Modify Bearer Request message as described above.

The S-GW transmits a Modify Bearer Response message to the MME in response to the Modify Bearer Request message (S2322).

Upon completion of this procedure, generation of a group (common) bearer between the UE and the P-GW is completed, and thus the P-GW can transmit downlink data to the UE. That is, connection between the UE and the PDN is established and the UE can be provided with a PDN service using the IP address assigned thereto.

The MME may transmit a Notify Request message including the P-GW ID (i.e., P-GW address) and the APN to the HSS as necessary (S2323).

The HSS may store the P-GW ID (i.e., P-GW address) and related APN and transmit a Notify Response message to the MME (S2324).

B) Tracking Area Update (TAU) Procedure

A TAU procedure according to the present invention can be performed per eNB (or per cell). In other words, when a UE belonging to an eNB (or cell) is included in one group, the UE performs the TAU procedure when the eNB (or cell) is changed, and thus a network needs to perform a group context updating procedure.

When the UE transmits a TAU request message to an MME, the MME can perform the group context updating procedure upon determining that the group context updating procedure is required (i.e., upon recognizing that the eNB is changed). Updating UE information in a group context means deletion or addition of the UE information from or to the group context.

This will be described in more detail with reference to the drawings.

FIGS. 24A and 24B exemplify a TAU procedure using a group bearer according to an embodiment of the present invention.

In FIG. 24, it is assumed that a group context is activated in an eNB and an MME/SGSN, a group S1 bearer is activated between the eNB and an S-GW and a group S5/S8 bearer is activated between the S-GW and a P-GW.

Referring to FIG. 24, one of predetermined trigger conditions is generated to start the TAU procedure (S2401).

For example, the trigger condition may be satisfied when a UE enters a new tracking area which does not belong to a tracking area identity (TAI) list registered to the network or a periodic TA update timer expires.

The UE initiates a P-TAU procedure by transmitting a TAU Request message to the MME (S2402 and S2403).

The TAU Request message may transmitted being included in an RRC Connection Setup Complete message through RRC connection (S2402) and transmitted being included in an Initial UE message through S1 signaling connection (S2403).

When a new MME/SGSN differs from the old node, the MME/SGSN transmits a Context Request message to the old MME/SGSN in order to acquire user information (S2404).

Upon reception of the Context Request message, the old MME/SGSN replies with a Context Response message (S2404).

The MME/SGSN requests information for authentication/security from an HSS for UE authentication, receives the information and performs a mutual authentication/security procedure with the UE (S2406).

When the MME/SGSN has been changed, the new MME/SGSN transmits a Context Acknowledge message to the old MME/SGSN (S2407).

Subsequently, a group context update procedure (A) is performed between the MME and a P-GW.

The MME/SGSN checks SDT UEs and groups (S2408).

First, a method of checking whether a UE which has transmitted a TAU Request message is an SDT UE will be described.

According to the present embodiment, upon reception of the TAU Request message, the MME/SGSN checks whether the corresponding UE is an SDT UE. To perform this operation, the MME/SGSN can recognize that the corresponding UE is not an SDT UE through one of the following methods.

UE subscription information may include information indicating that the corresponding UE is an SDT UE. In this case, the MME/SGSN may check whether the UE is an SDT UE by acquiring UE subscription information from an HSS.

A TAU Request message including information indicating that the corresponding UE is an SDT UE may be transmitted. In this case, although radio connection overhead may occur, this message can be used to discriminate an individual bearer from a group bearer when SDT UEs use individual bearers instead of a group/common bearer along with a group bearer.

Subsequently, when the corresponding UE is an SDT UE, the MME/SGSN may be aware of information on the group to which the corresponding UE belongs through one of the following methods.

UE subscription information may include information on the group to which the UE belongs. In this case, the MME/SGSN may check the group information of the UE by acquiring UE subscription information from the HSS.

A NAS message (e.g., Attach/TAU Request/Service Request messages) including information indicating a group to which the UE belongs may be transmitted.

The MME/SGSN may determine the group of the corresponding UE depending on pre-configured information or information configured currently in the UE (refer to 4. configuration of UE group (or SDT group)).

The MME/SGSN updates the group context (S2409).

Upon checking that the corresponding UE is an SDT UE and recognizing the group to which the corresponding UE belongs in the previous step, the MME checks whether the group context of the group to which the corresponding UE belongs has been generated, and when the generated group context exists, updates the corresponding UE information in the group context.

The MME/SGSN transmits a Group Context Updating Request message to the S-GW (S2410) and the S-GW transmits a Group Context Updating Request message to a P-GW (2411).

Here, the Group Context Updating Request message includes an in-group UE ID for identifying the UE in the group to which the UE belongs and a group ID for identifying a group bearer.

Upon reception of the Group Context Updating Request message, the P-GW updates the group context (S2412).

Upon confirmation of the group to which the corresponding UE belongs, the P-GW checks whether the group context of the group to which the corresponding UE belongs has been generated, and when the generated group context exists, updates the corresponding UE information in the group context.

The P-GW transmits a Group Context Updating Response message to the S-GW in response to the Group Context Updating Request message (S2413).

The S-GW transmits a Group Context Updating Response message to the MME/SGSN in response to the Group Context Updating Request message (S2414).

Subsequently, the MME/SGSN performs a group context update procedure (B) in the eNB upon determining that the eNB to which the UE belongs has been changed (i.e., the group to which the UE belongs has been changed).

B-option 1) for group context update, the MME may transmit a Group Context Updating Request message to all eNBs connected thereto, or the MME may transmit a Group Context Updating Request message to only the old eNB and a new eNB (S2415).

Here, the Group Context Updating Request message includes an in-group UE IE for identifying the UE in the group to which the UE belongs and a group ID for identifying a group bearer.

Upon reception of the Group Context Updating Request message from the MME, eNBs can update the group context (S2416 and S2417).

An eNB having the group context may be regarded as an old eNB and an eNB which has transmitted the TAU Request message to the MME may be regarded as a new eNB.

When the Group Context Updating Request message is transmitted, the old eNB may delete the corresponding UE (ID) from the group context and the new eNB may check whether the group context of the group to which the corresponding UE belongs has been generated upon confirmation of the group to which the corresponding UE belongs, and when the generated group context exists, update the UE information in the group context.

B-option 2) For group context update, the MME may transmit a Group Context Updating Request message to the new eNB (S2418). Here, the Group Context Updating Request message may include the ID (or address of the old eNB).

Upon reception of the Group Context Updating Request message from the MME, the new eNB may update the group context (S2419).

The new eNB may transmit a Group Context Updating Request message to the old eNB using the received ID (or address) of the old eNB (S2420).

Upon reception of the Group Context Updating Request message from the new eNB, the old eNB may update the group context by deleting the corresponding UE (i.e., UE ID) from the group context (S2421). For this purpose, an IE or a cause value for UE (i.e., UE ID) deletion may be added to the Group Context Updating Request message or a new message may be used.

Here, the Group Context Updating Request message includes an in-group UE ID for identifying the UE in the group to which the UE belongs and a group ID for identifying a group bearer.

Upon confirmation of the group to which the corresponding UE belongs, the new/old eNB checks whether the group context of the group to which the corresponding UE belongs has been generated, and when the generated group context exists, may update the UE information in the group context. Here, updating the UE information in the group context means deletion or addition of the UE information from or to the group context.

Steps 11 to 14 of the existing location update procedure may be equally performed (S2422). These steps may be incorporated into the present procedure with reference to 3GPP TS 23.401.

The MME transmits a TAU Accept message to the UE in response to the TAU Request message (S2423).

The TAU Accept message is transmitted being included in a downlink NAS Transport message through S1 signaling connection and transmitted being included in a DL Information Transfer message through RRC connection.

The UE transmits a TAU Complete message to the MME as acknowledgement for the TAU Accept message (S2424).

In the example of FIG. 24, conventional session establishment for individual UEs may not be considered. That is, related procedures may not be performed.

Furthermore, steps S2410, S2411, S2413, S2414, S2415 and S2418 represent the processes of updating the group context in the eNB, the MME and the P-GW. If all UEs belonging to the same eNB are regarded as the same group, group information Group# may not be included in corresponding messages.

In addition, when the eNB, the MME, the S-GW and the P-GW are merged (e.g., the eNB and the MME are implemented as one entity and the MME and the S-GW are implemented as one entity), the functions of current entities can be equally executed by new entities.

C) Uplink Traffic Transmission Procedure

FIG. 25 exemplifies an uplink traffic transmission procedure using a group bearer according to an embodiment of the present invention.

In FIG. 25, it is assumed that a group context is activated in an eNB and an MME/SGSN, a group S1 bearer is activated between the eNB and an S-GW and a group S5/S8 bearer is activated between the S-GW and a P-GW.

A random access procedure (or message) in FIG. 25 is the same as the random access procedure (or message of FIG. 11, and thus detailed description thereof is omitted.

Referring to FIG. 25, a UE transmits a first random access (RA) message to the eNB (S2501).

The eNB transmits a second RA message to the UE (S2502).

The UE transmits a third RA message to the eNB (S2503). Here, the third RA message may include the S-TMSI of the UE.

The eNB checks SDT UEs and groups (S2504).

The eNB may confirm a group to which the corresponding UE belongs from previously stored group contexts using the S-TMSI transmitted being included in the third RA message.

If the group to which the corresponding UE belongs exists (i.e., the group bearer of the group to which the UE belongs is activated), the following steps S2505 to S2510 may be omitted.

On the contrary, when the group to which the corresponding UE belongs does not exist (i.e., the group bearer of the group to which the UE belongs is not activated), steps S2505 to S2510 can be performed as follows.

The eNB transmits a fourth RA message to the UE (S2505).

The UE transmits a Service Request message to the MME (S2506 and S2507).

The Service Request message is transmitted being included in an RRC Connection Setup Complete message through RRC connection (S2506) and transmitted being included in an Initial UE message through S1 signaling connection (S2507).

The MME/SGSN checks SDT UEs and groups (S2508).

First, a method of checking whether a UE which has transmitted a Service Request message is an SDT UE will be described.

UE subscription information may include information indicating that the corresponding UE is an SDT UE. In this case, the MME/SGSN may check whether the UE is an SDT UE by acquiring UE subscription information from an HSS.

A Service Request message including information indicating that the corresponding UE is an SDT UE may be transmitted. In this case, although radio connection overhead may occur, this message can be used to discriminate an individual bearer from a group bearer when SDT UEs use individual bearers instead of a group/common bearer along with a group bearer.

Subsequently, when the corresponding UE is an SDT UE, the MME/SGSN may be aware of information on the group to which the corresponding UE belongs through one of the following methods.

UE subscription information may include information on the group to which the UE belongs. In this case, the MME/SGSN may check the group information of the UE by acquiring UE subscription information.

A NAS message (e.g., Attach/TAU Request/Service Request messages) including information indicating a group to which the UE belongs may be transmitted.

The MME/SGSN may determine the group of the corresponding UE depending on pre-configured information or information configured currently in the UE (refer to 4. configuration of UE group (or SDT group)).

The MME/SGSN transmits a Group Context Updating Request message to the eNB (S2509).

Here, the Group Context Updating Request message includes an in-group UE ID for identifying the UE in the group to which the UE belongs and a group ID for identifying a group bearer.

Upon reception of the Group Context Updating Request message from the MME/SGSN, the eNB updates the group context (S2510).

Upon confirming the group to which the corresponding UE belongs, the eNB checks whether the group context of the group to which the corresponding UE belongs has been generated, and when the generated group context exists, updates the corresponding UE information in the group context.

The eNB establishes a radio bearer for the corresponding UE (S2511).

The eNB may transmit an RRC Connection Reconfiguration message to the UE in order to generate a DRB.

Here, the eNB may have information on mapping between a radio bearer per UE and a group S1 bearer. Even when a resource pool is configured per group, the eNB may store information on mapping between the resource pool per group and a group S1 bearer.

When one or more groups share a group radio bearer, the eNB or the MME needs to recognize a relationship between group radio bearers and group S1 bearers and the S-GW also needs to recognize a relationship between group S1 bearers and group S5/S8 bearers.

The UE may transmit uplink traffic to the eNB through the radio bearer. In addition, the uplink traffic may be forwarded from the eNB to the P-GW through the common/group bearer.

D) Downlink Traffic Transmission Procedure

A downlink traffic transmission procedure using a group bearer according to an embodiment of the present invention is exemplified.

D-Option 1)

FIG. 26 exemplifies a downlink traffic transmission procedure using a group bearer according to an embodiment of the present invention.

In FIG. 26, it is assumed that a group context is activated in an eNB and an MME/SGSN, a group S1 bearer is activated between the eNB and an S-GW and a group S5/S8 bearer is activated between the S-GW and a P-GW.

Referring to FIG. 26, the P-GW transmits downlink traffic to the eNB through group bearers because the group bearers have been activated (S2601).

Here, the downlink traffic may include an in-group UE ID.

Here, the P-GW may transmit a group bearer mapped to the downlink traffic using a 5-tuple and transmit the downlink traffic. The P-GW may forward the downlink traffic to the S-GW through the group S5/S8 bearer and the S-GW may forward the downlink traffic to the eNB through the group S1 bearer.

The eNB transmits paging to the UE (S2602).

Here, the eNB may confirm the S-TMSI of the UE from the in-group UE ID included in the downlink traffic, include the S-TMSI in the paging and transmit the paging.

Alternatively, the eNB may check a control plane group bearer ID and the in-group UE ID and then confirm the S-TMSI of the corresponding UE. In this case, the eNB may store a mapping table with respect to mapping between the control plane group bearer ID, the in-group UE ID and the S-TMSI of the UE.

Upon reception of the paging from the eNB, the UE may establish a radio bearer with the eNB and then receive the downlink traffic from the eNB by performing the uplink traffic transmission procedure (i.e., mobile originating procedure) illustrated in FIG. 26.

D-Option 2)

FIG. 27 exemplifies a downlink traffic forwarding operation using a group bearer according to an embodiment of the present invention.

FIG. 27 exemplifies a process of forwarding downlink traffic to a UE when an S1 group bearer is established/activated.

Referring to FIG. 27, a P-GW forwards downlink traffic to an S-GW (S2701).

Here, the P-GW may select a bearer mapped to the downlink traffic using a 5-tuple and transmit the downlink traffic. The P-GW may forward the downlink traffic through a group bearer if the downlink traffic is mapped to the group bearer and forward the downlink traffic through a bearer configured per UE if the downlink traffic is mapped to the bearer per UE as in the conventional system.

The S-GW transmits a downlink data notification (DDN) message to an MME irrespective of whether the group S1 bearer is activated or deactivated (S2702).

Here, the DDN message may include an in-group UE ID for identifying a UE in a group. Since an IMSI is defined as an information element (IE) in the DDN message, an IMSI IE may include an in-group UE ID for identifying a UE in a group as shown in the following table 3.

Table 3 exemplifies an IMSI IE according to the present invention.

TABLE 3

| IMSI | CO | This IE shall be included on the S11/S4 interface as part of the network triggered service restoration procedure if both the SGW and the MME/S4-SGSN support this optional feature (see 3GPP TS 23.007 [17])). | IMSI | 0 |

Upon reception of the DDN from the S-GW, the MME transmits a DDN acknowledgement (Ack) message to the S-GW (S2703).

Here, the DDN Ack message may include the in-group UE ID or the IMSI of the UE.

The MME transmits paging to the eNB (S2704).

Here, the paging may include the in-group UE ID or the IMSI of the UE.

Upon reception of the paging from the MME, the eNB forwards the paging to the UE (S2705).

E) S1 Release Procedure

When an S1 release procedure is performed for a group bearer, if only a group radio bearer is determined to be deactivated, only a radio bearer per UE can be released through an eNodeB-initiated procedure. Here, UE context information stored in the eNB is deleted.

On the contrary, when a group S1 bearer is also determined to be deactivated, the group S1 bearer can also be released.

F) ESM Procedure for Group Bearers

When an (E)SM procedure is performed for group (common) bearers, a modification or allocation request for a previously configured group bearer may be limited for UEs. This may be determined by a network and configured for UEs.

However, when a group radio bearer is configured per UE, a UE may request modification of a group bearer. In addition, when the UE is changed to another group or congestion of the current group bearer intensifies, the UE may notify a network (e.g., eNB or MME) of the UE change or congestion intensification. Accordingly, the network may change the group of the UE or induce the UE to configure a new group bearer.

Optimization for IP Address Handling

An IP address handling method described below may be used along with the above-described group bearer methods or independently used.

Hereinafter, data transmitted and received using the IP address handling method according to the present invention may be called non-IP data.

If the IP address handling method is independently used instead of being used along with a common bearer method, a group ID for identifying a group in a common bearer or an in-group UE ID for identifying a UE in the corresponding group is not applied to the following description.

A. Method for Supporting Multiple Destinations (Multiple Sources)

The number of destinations to which an uplink packet is transmitted from an SDT UE (or sources to which a downlink packet is transmitted) may be limited to one or a predetermined number. Hereinafter, description will be based on a destination for the sake of convenience of description.

In this case, routes of a P-GW and an application server in the EPC may be limited for the SDT UE. To support one or more destinations, the following method methods can be used.

1. Method of Using Separate Paths

Packets may be transmitted to destinations through different paths and the P-GW may identify destinations (or sources) to which corresponding packets are transmitted through paths through which the packets are transmitted.

1) PDN Connection can be Set as a Path.

A path per PDN (per AS) can be set through PDN connection as in the example of FIG. 18. That is, the P-GW may configure a tunnel with one or a limited number of destinations (or sources) (e.g., PDN or AS).

A specific APN may be set as a destination (or source) of an SDT UE, to which packets are transmitted. In addition, the SDT UE may establish PDN connection to the configured APN (i.e., a PDN identified by the APN) and perform transmission and reception of packets through the PDN connection with a destination. When the SDT UE transmits a packet through a specific PDN connection, the corresponding P-GW can forward the packet to a configured destination through a configured tunnel. Here, when the specific PDN connection is generated, a specific APN can be designated.

2) A Bearer May be Configured as a Path.

Specific bearers may be used by being mapped to destinations in the same PDN connection.

A UE and the P-GW may recognize mapping between bearers and destinations. Accordingly, the UE and the P-GW know the mapping relationship between the bearers and the destinations and thus determine a bearer mapping a corresponding packet depending on a destination and transmit the packet through the bearer.

Here, the mapping relationship between bearers and destinations may be configured as follows.

When additional signaling is used or a bearer is established between the UE and the P-GW, the mapping relationship between bearers and destinations can be configured. When such a procedure is performed, an indication for specifying a destination mapped to a corresponding bearer needs to be delivered. The indication for specifying the destination mapped to the bearer may be indicated by the UE or the P-GW.

Alternatively, the mapping relationship between bearers and destinations may be pre-configured without the aforementioned procedure.

2. Method of Using a Destination ID

An SDT UE may indicate a destination with a destination ID simpler than an IP address in order to indicate a limited number of destinations. The P-GW can recognize a destination (e.g., PDN or application server) through a destination ID. In addition, the P-GW may store a mapping table for mapping between destination IDs and IP addresses of destinations specified by the destination IDs.

If this method is used along with the common bearer method, the P-GW needs to also recognize the relationship between destination IDs and group IDs. Here, one or more group IDs may be mapped to the same destination ID, for example.

B. UE IP Address Handling

1. When this method is used along with the common bearer method, the P-GW may have a mapping table for mapping between UE IP addresses and UE IDs and group IDs.

Here, a method for configuration a UE ID may be as follows.

A UE ID may be a unique value in a group. For example, a UE ID may be a unique UE ID in a destination domain (e.g., application server). Here, when the above-described tunneling is used (i.e., when a destination to which a packet is transmitted is identified through a path through which the packet is delivered), the P-GW can identify and recognize a UE by combining a corresponding UE ID and a tunnel.

Here, the UE ID may be configured as a C-RNTI which can be recognized by an eNB, an IMSI which can be recognized by a network, a globally unique temporary identity (GUTI) or an S-TMSI.

2. On the contrary, when the method is used independently of the common bearer method, the P-GW may recognize a relationship between corresponding PDN connection and a UE IP address. This can be achieved by conventional techniques.

C. Downlink Packet Transmission Scheme

A downlink packet transmission operation using the IP address handling method according to the present invention is as follows.

1) Case in which the Method is Used Along with the Common Bearer Method

When the P-GW receives a downlink packet from an application server, the P-GW checks a group ID and a UE ID mapped to a source IP address and a destination IP address of the downlink packet.

In addition, the P-GW may remote the source IP address and the destination IP address of the downlink packet (i.e., perform decapsulation), indicate (or attach) a destination ID, the group ID and the UE ID to the downlink packet, and then forward the downlink packet to an S-GW through a common bearer corresponding to the group corresponding to the group ID.

Here, when one common bearer is mapped to one group (refer to 2.A), the downlink packet may not include the group ID.

In addition, when only one destination exists or separate paths are used for destinations, the downlink packet may not include the destination ID.

The following operation may be performed in the same manner as the method described in FIG. 21.

2) Case in which the Method is not Used Along with the Common Bearer Method

When the IP address handling method is used independently instead of being used along with the common bearer method, the aforementioned group ID and UE ID may not be considered. This will be described in more detail below.

D. Uplink Packet Transmission Scheme

An uplink packet transmission operation using the IP address handling method according to the present invention is as follows.

1) Case in which the Method is Used Along with the Common Bearer Method

In case of uplink packet transmission, when a UE transmit an uplink packet, the UE can indicate a destination ID in a packet payload (e.g., MAC PDU) and transmit the uplink packet to an eNB without a source IP address and a destination IP address.

Here, when only one destination exists or separate paths are used for destinations, the uplink packet may be transmitted without a destination ID.

Upon reception of the uplink packet, the eNB may recognize the UE, check the group ID and the UE ID of the UE, indicate the group ID and the UE ID in the uplink packet and transmit the uplink packet to the next intermediate node.

Here, when one common bearer is matched to one group (refer to 2.A), the group ID may not be included.

Subsequently, the operation of delivering the uplink packet to the P-GW can be performed in the same manner as the method described in FIG. 21.

Upon arrival of the uplink packet at the P-GW, the P-GW checks the group ID, the UE ID and the destination ID to confirm a destination IP address and a source IP address (i.e., UE IP address), attaches the destination IP address and the source IP address to the uplink packet (i.e., encapsulating the destination IP address and the source IP address in the uplink packet) and transmits the uplink packet to the application server.

2) Case in which the Method is not Used Along with the Common Bearer Method

When the IP address handling method is used independently instead of being used along with the common bearer method, the aforementioned group ID and UE ID may not be considered. This will be described in more detail below.

E. IP Assignment Procedure

According to a conventional scheme, a UE may acquire an IP address in a PDN connectivity generation process. According to the present invention, an IP address of a UE may be assigned in a PDN connectivity generation process as in the conventional scheme, or the P-GW may generate a UE IP address in a PDN connectivity generation process but may not deliver the generated UE IP address to a UE.

Meanwhile, the above-described packet forwarding method may be performed through a control plane (C-plane). Alternatively, the packet forwarding method may be performed through an ESM message.

A packet forwarding method when the IP address handling method is used independently instead of being used along with the common bearer method will be described in detail.

First, a packet forwarding method when a single bearer is configured per UE and a single PDN connection with a single APN (i.e., a PDN identified by an APN) is established will be described.

More specifically, a UE may establish a non-IP type PDN connection with an APN (i.e., a PDN identified by the APN) configured for the UE through an initial attach procedure or a PDN connectivity procedure. The non-IP type PDN connection may refer to a PDN connection through which uplink/downlink data to which an IP header is not attached is transmitted and received in an EPS (i.e., between the UE and the P-GW) and uplink/downlink data to which an IP header has been attached is transmitted and received in a connection other than the EPS (i.e., between the P-GW and the PDN (i.e. AS)).

Here, one or more EPS bearers (i.e., a default EPS bearer and/or a dedicated EPS bearer) may be generated per UE, APN (i.e., the PDN identified by the APN) and generated PDN in the conventional case. However, in the case of a non-IP type PDN connection, a single EPS bearer may be assigned to the non-IP PDN connection.

That is, a PDN connection between the UE and the APN (i.e., the PDN identified by the APN) can be generated during the initial attach procedure or the PDN connectivity procedure and a single bearer ID (i.e., EPS bearer ID) can be assigned to the PDN connection. Accordingly, a one-to-one mapping relationship among the IP address (i.e., source address) of the UE, the address (i.e., destination address) of the AS and the EPS bearer ID can be set.

Here, transmission and reception of non-IP data may be performed through a point-to-point tunnel between the P-GW and the AS (i.e., PDN). The point-to-point tunnel may be set up by a tunnel parameter at both ends (i.e., P-GW and AS) of the tunnel.

The following parameters may be set in advance per APN in the P-GW.

User datagram protocol (UDP) destination port number (i.e., destination port number for non-IP data) to be used when non-IP data is transmitted UDP port number of a UDP port (i.e., port number for non-IP data) through which non-IP data is desired to be received Destination IP address used to transmit non-IP data The following parameters may be pre-configured in an AP.

UDP destination port number (i.e., destination port number for non-IP data) to be used when non-IP data is transmitted UDP port number of a UDP port (i.e., port number for non-IP data) through which non-IP data is desired to be received An IP address assignment procedure (i.e., PDN connectivity establishment procedure) for a UE can be performed by the P-GW. Here, a single IP address (i.e., all of IPv4 and IPv6 prefix+suffix are not assigned) may be used.

Here, a UE IP address for corresponding PDN connectivity may be used as a source address and an AS address for the point-to-point tunnel may be used as a destination address in the P-GW.

In the case of uplink non-IP address, the P-GW may forward received data to the AS through the point-to-point tunnel using IP encapsulation (or UDP/IP encapsulation) of a destination address of the AS and a set destination port number (e.g., UDP destination port number) for the non-IP data.

As described above, when a single PDN connection (i.e., non-IP PDN connection) with a single APN (i.e., a PDN identified by the APN) is established per UE and a single bearer is assigned to the PDN connection, the P-GW can identify a UE which has transmitted uplink data and an APN (or AS) to which the uplink data needs to be delivered through the ID of a bearer (i.e., the ID of an EPS bearer) through which the uplink data is delivered. Accordingly, the P-GW can encapsulate an IP header including the destination IP address (i.e., AS address) configured in the APN identified by the ID of the bearer (i.e., the ID of the EPS bearer) through which the uplink data is delivered and information indicating non-IP data (i.e., destination port number for the non-IP data) (or encapsulate the IP header along with the UE IP address) in data and transmit the IP header encapsulated data to the AS.

In the case of downlink non-IP data, the AS may transmit data in which an IP address of a UE is encapsulated as a destination address and an IP header is encapsulated as a destination port number (i.e., UDP destination port number) for configured non-IP data (or a UDP/IP header is encapsulated). In addition, the P-GW may decapsulate the received data (i.e., remove the IP header (or UDP/IP header) from the received data) and deliver the data to an S-GW through a GTP-U tunnel (i.e., an EPS bearer) identified by the IP address of the UE (e.g., IPv4 address or IPv6 prefix).

As described above, when a single PDN connection (i.e., non-IP PDN connection) with a single APN (i.e., a PDN identified by the APN) is established per UE and a single bearer is assigned to the PDN connection, the P-GW can identify a bearer ID (i.e., EPS bearer ID) using the IP address of the UE included in the downlink data. Accordingly, the P-GW can remove the IP header (or UDP/IP header) including the IP address of the UE and information indicating the non-IP data (i.e., destination port number for the non-IP data) from the received data and transmit the downlink data to the UE through the bearer ID (i.e., EPS bearer ID) identified by the IP address of the UE.

FIG. 28 is a diagram exemplifying a packet forwarding process using the IP address handling method according to an embodiment of the present invention.

FIG. 28 illustrates a downlink packet forwarding process.

First, the downlink packet forwarding method will be described.

When an application server (AS) has a packet that the AS desires to transmit to UEs, the application server (AS) may transmit the downlink packet 2810 to a P-GW.

Here, the downlink packet 2810 may be composed of an IP header 2811 and an IP payload 2812. The IP header 2811 may include a source IP (SIP) and a destination IP (DIP). In addition, the IP header 2811 includes a source port number, a destination port number and a protocol identifier, which are not shown in FIG. 28. Since FIG. 28 illustrates the downlink packet forwarding process, the SIP may be set to the IP address of the AS and the DIP may be set to IP address of a UE. The IP payload 2812 includes content to be forwarded from the AS to UEs.

The P-GW may identify the identity (e.g., IP addresses, IMSIs or the like) of UEs to which the downlink packet needs to be transmitted through the DIP of the IP header 2811 of the downlink packet (or a 5-tuple (i.e., a source IP address, a destination IP address, a source port number, a destination port number and a protocol identifier) included in the IP header 2811).

In addition, the P-GW may identify a single EPS bearer (i.e., EPS bearer ID) configured for a corresponding UE using the DIP of the IP header 2811 of the downlink packet. As described above, the EPS bearer ID is one-to-on mapped to an S5/S8 bearer TEID (i.e., GTP-U tunnel), and thus the P-GW may identify the S5/S8 bearer TEID (i.e., GTP-U tunnel) using the DIP of the IP header 2811 of the downlink packet.

The P-GW may decapsulate the downlink packet received from the AS (i.e., remove the IP header (i.e., the source IP address and the destination IP address) of the downlink packet).

In addition, the P-GW can forward the downlink packet 2820 to an S-GW through the S5/S8 bearer (i.e., GTP-U tunnel) identified by the DIP (i.e., UE IP address) of the IP header 2811 of the received downlink packet. Here, the P-GW may forward the downlink packet 2820 generated by attaching a GTP tunneling header 2821 to the received downlink packet to the S-GW.

The GTP tunneling header 2821 includes an SIP, a DIP and a GTP header (GTP-U). Since FIG. 28 illustrates the downlink packet forwarding process, the SIP may be set to the IP address of the P-GW, the DIP may be set to the IP address of the S-GW and the GTP header may be set to the S5 bearer TEID (downlink).

S-GW may identify the ID (e.g., an E-RAB bearer ID and/or an S1 bearer TEID) of a bearer through which the downlink packet needs to be transmitted and the IDs (e.g., IMSIs, S-TMSIs or the like) of UEs through the GTP header (i.e., S5 bearer TEID) included in the GTP tunneling header 2821 of the downlink packet received from the P-GW.

The S-GW may identify an S1 bearer TEID (or E-RAB bearer ID) mapped to the ID of the S5/S8 bearer through which the downlink packet 2820 received from the P-GW is delivered.

In addition, the S-GW may forward the downlink packet 2820 received from the P-GW to eNBs through the identified S1 bearer. Here, the S-GW may forward a downlink packet 2830, which is generated by modifying the GTP tunneling header (or removing the GTP tunneling header 2821 and attaching a new tunneling header 2831) in the downlink packet 2820 received from the P-GW, to eNBs.

Since FIG. 28 illustrates the downlink packet forwarding process, the SIP in the GTP tunneling header may be set to the IP address of the S-GW, the DIP in the GTP tunneling header may be set to the IP address of an eNB and the GTP header in the GTP tunneling header may be set to the S1 bearer TEID (downlink).

The eNBs may identify the ID (e.g., a DRB ID) of a bearer through which the downlink packet needs to be transmitted and the IDs (e.g., C-RNTIs) of UEs through the GTP header (i.e., S1 bearer TEID) included in the GTP tunneling header 2831 of the downlink packet received from the S-GW or an E-RAB ID mapped to the GTP header.

The eNBs remove the GTP tunneling header 2831 from the downlink packet 2830 received from the S-GW and forward a downlink packet 2840 to UEs through the identified bearer (i.e., DRB). That is, the eNBs may attach the identified DRB ID (or LCID) to a payload of the downlink packet received from the S-GW and forward the downlink packet 2840 to the UEs through the corresponding DRB.

Next, an uplink packet forwarding method will be described.

When a UE has a packet that the UE desires to transmit to an AS, the UE transmits the uplink packet to an eNB through a DRB allocated thereto. Here, the uplink packet may include a DRB ID (or LCID) assigned to the UE.

Here, the uplink packet may not include an IP header and an IP payload.

The eNB may identify an S1 bearer TEID mapped to the DRB (DRB ID included in the uplink packet) through which the uplink packet received from the UE is delivered.

In addition, the eNB may forward the uplink packet received from the UE to an S-GW through the identified S1 bearer. Here, the eNB may attach a GTP tunneling header to the uplink packet received from the UE and forward the uplink packet to the S-GW.

For example, the SIP in the GTP tunneling header may be set to the IP address of the eNB, the DIP in the GTP tunneling header may be set to the IP address of the S-GW and the GTP header in the GTP tunneling header may be set to the S1 bearer TEID (uplink).

The S-GW may identify the ID (e.g., S5/S8 bearer TEID (uplink)) of a bearer through which the uplink packet needs to be transmitted and the ID (e.g., IMSI, S-TMSI or the like) of the UE from the GTP header (i.e., S1 bearer TEID (uplink)) included in the GTP tunneling header of the uplink packet received from the eNB.

In addition, the S-GW may forward the uplink packet received from the eNB to a P-GW through the identified S5/S8 bearer. Here, the S-GW may modify the GTP tunneling header in the uplink packet received from the eNB and forward the uplink packet to the P-GW.

For example, the SIP in the GTP tunneling header may be set to the IP address of the S-GW, the DIP in the GTP tunneling header may be set to the IP address of the P-GW and the GTP header in the GTP tunneling header may be set to the S5/S8 bearer TEID (uplink).

The P-GW may perform IP encapsulation on the uplink packet received from the S-GW. That is, the P-GW may attach an IP header (i.e., a source IP address and a destination IP address) to the uplink packet received from the S-GW.

Here, the P-GW may identify the IP address and/or the destination IP address (i.e., the IP address of the application server) from the GTP header (i.e., S5/S8 bearer TEID (uplink)) included in the GTP tunneling header of the uplink packet received from the S-GW or an EPS bearer ID mapped to the GTP header.

In addition, the P-GW may transmit an uplink packet received through a point-to-point tunnel to a destination (e.g., the application server). That is, the P-GW may use a tunnel set between the P-GW and a destination indicated by a destination ID (or destination IP address) in order to transmit a received packet to the destination. Accordingly, the P-GW can transmit an uplink packet received through a tunnel specified by a destination ID (or destination IP address) to the destination. Here, the P-GW may store information on mapping between destination IDs (or destination IP addresses) and tunnels.

In addition, a packet does not include a source IP address and a destination IP address in a connection other than a packet transmission and reception connection between the P-GW and the application server, and thus the UE IP address may not be provided to the UE as described above. That is, the P-GW performs an IP related operation such as IP address assignment for PDN connection but an IP address (e.g., IPv4 address of IPv6 prefix) may not be provided to the UE.

Next, a packet forwarding method when a single bearer is configured per UE and multiple PDN connections with multiple APNs (i.e., PDNs identified by the APNs) are established will be described.

FIG. 29 is a diagram exemplifying a packet forwarding process using the IP address handling method according to an embodiment of the present invention.

FIG. 29 illustrates a downlink packet forwarding process.

First, the downlink packet forwarding method will be described.

When an application server (AS) has a packet that the AS desires to transmit to UEs, the application server (AS) may transmit the downlink packet 2910 to a P-GW.

Here, the downlink packet 2910 may be composed of an IP header 2911 and an IP payload 2912. The IP header 2911 may include a source IP (SIP) and a destination IP (DIP). In addition, the IP header 2911 includes a source port number, a destination port number and a protocol identifier, which are not shown in FIG. 29. Since FIG. 29 illustrates the downlink packet forwarding process, the SIP may be set to the IP address of the AS and the DIP may be set to IP address of a UE. The IP payload 2912 includes content to be forwarded from the AS to UEs.

The P-GW may identify the identity (e.g., IP addresses, IMSIs or the like) of UEs to which the downlink packet needs to be transmitted through the DIP of the IP header 2911 of the downlink packet (or a 5-tuple (i.e., a source IP address, a destination IP address, a source port number, a destination port number and a protocol identifier) included in the IP header 2911).

In addition, the P-GW may identify a single EPS bearer (i.e., EPS bearer ID) configured for a corresponding UE using the DIP of the IP header 2911 of the downlink packet. As described above, the EPS bearer ID is one-to-on mapped to an S5/S8 bearer TEID (i.e., GTP-U tunnel), and thus the P-GW may identify the S5/S8 bearer TEID (i.e., GTP-U tunnel) using the DIP of the IP header 2911 of the downlink packet.

The P-GW may decapsulate the downlink packet received from the AS (i.e., remove the IP header (i.e., the source IP address and the destination IP address) of the downlink packet).

In addition, the P-GW can forward the downlink packet 2920 to an S-GW through the S5/S8 bearer (i.e., GTP-U tunnel) identified by the DIP (i.e., UE IP address) of the IP header 2911 of the received downlink packet.

Here, the P-GW may forward the downlink packet 2920, which is generated by attaching a GTP tunneling header 2921 and a destination ID for indicating the AS from which the downlink packet has been transmitted to the received downlink packet, to the S-GW.

The GTP tunneling header 2921 includes an SIP, a DIP and a GTP header (GTP-U). Since FIG. 29 illustrates the downlink packet forwarding process, the SIP may be set to the IP address of the P-GW, the DIP may be set to the IP address of the S-GW and the GTP header may be set to the S5 bearer TEID (downlink).

S-GW may identify the ID (e.g., an E-RAB bearer ID and/or an S1 bearer TEID) of a bearer through which the downlink packet needs to be transmitted and the IDs (e.g., IMSIs, S-TMSIs or the like) of UEs through the GTP header (i.e., S5 bearer TEID) included in the GTP tunneling header 2921 of the downlink packet received from the P-GW.

The S-GW may identify an S1 bearer TEID (or E-RAB bearer ID) mapped to the ID of the S5/S8 bearer through which the downlink packet 2920 received from the P-GW is delivered.

In addition, the S-GW may forward the downlink packet 2920 received from the P-GW to eNBs through the identified S1 bearer. Here, the S-GW may forward a downlink packet 2930, which is generated by modifying the GTP tunneling header (or removing the GTP tunneling header 2921 and attaching a new tunneling header 2931) in the downlink packet 2920 received from the P-GW, to eNBs.

Since FIG. 29 illustrates the downlink packet forwarding process, the SIP in the GTP tunneling header may be set to the IP address of the S-GW, the DIP in the GTP tunneling header may be set to the IP address of an eNB and the GTP header in the GTP tunneling header may be set to the S1 bearer TEID (downlink).

The eNBs may identify the ID (e.g., a DRB ID) of a bearer through which the downlink packet needs to be transmitted and the IDs (e.g., C-RNTIs) of UEs through the GTP header (i.e., S1 bearer TEID) included in the GTP tunneling header 2931 of the downlink packet received from the S-GW or an E-RAB ID mapped to the GTP header.

The eNBs remove the GTP tunneling header 2931 from the downlink packet 2930 received from the S-GW and forward a downlink packet 2940 to UEs through the identified bearer (i.e., DRB). That is, the eNBs may attach the identified DRB ID (or LCID) to a payload of the downlink packet received from the S-GW and forward the downlink packet 2940 to the UEs through the corresponding DRB.

Next, an uplink packet forwarding method will be described.

When a UE has a packet that the UE desires to transmit to an AS, the UE transmits the uplink packet to an eNB through a DRB allocated thereto. Here, the uplink packet may include a DRB ID (or LCID) assigned to the UE and a destination ID to which the uplink packet needs to be delivered.

Here, the uplink packet may not include an IP header and an IP payload.

The eNB may identify an S1 bearer TEID mapped to the DRB (DRB ID included in the uplink packet) through which the uplink packet received from the UE is delivered.

In addition, the eNB may forward the uplink packet received from the UE to an S-GW through the identified S1 bearer. Here, the eNB may attach a GTP tunneling header to the uplink packet received from the UE and forward the uplink packet to the S-GW.

For example, the SIP in the GTP tunneling header may be set to the IP address of the eNB, the DIP in the GTP tunneling header may be set to the IP address of the S-GW and the GTP header in the GTP tunneling header may be set to the S1 bearer TEID (uplink).

The S-GW may identify the ID (e.g., S5/S8 bearer TEID (uplink)) of a bearer through which the uplink packet needs to be transmitted and the ID (e.g., IMSI, S-TMSI or the like) of the UE from the GTP header (i.e., S1 bearer TEID (uplink)) included in the GTP tunneling header of the uplink packet received from the eNB.

In addition, the S-GW may forward the uplink packet received from the eNB to a P-GW through the identified S5/S8 bearer. Here, the S-GW may modify the GTP tunneling header in the uplink packet received from the eNB and forward the uplink packet to the P-GW.

For example, the SIP in the GTP tunneling header may be set to the IP address of the S-GW, the DIP in the GTP tunneling header may be set to the IP address of the P-GW and the GTP header in the GTP tunneling header may be set to the S5/S8 bearer TEID (uplink).

The P-GW may perform IP encapsulation on the uplink packet received from the S-GW. That is, the P-GW may attach an IP header (i.e., a source IP address and a destination IP address) to the uplink packet received from the S-GW.

Here, the P-GW may identify the IP address of the UE from the GTP header (i.e., S5/S8 bearer TEID (uplink)) included in the GTP tunneling header of the uplink packet received from the S-GW or an EPS bearer ID mapped to the GTP header and identify the destination IP address (i.e., the IP address of the application server) from the destination ID included in the uplink packet.

In addition, the P-GW may transmit an uplink packet received through a point-to-point tunnel to a destination (e.g., the application server). That is, the P-GW may use a tunnel configured between the P-GW and a destination indicated by a destination ID (or destination IP address) in order to transmit a received packet to the destination. Accordingly, the P-GW can transmit an uplink packet received through a tunnel specified by a destination ID (or destination IP address) to the destination. Here, the P-GW may store information on mapping between destination IDs (or destination IP addresses) and tunnels.

In addition, a packet does not include a source IP address and a destination IP address in a connection other than a packet transmission and reception connection between the P-GW and the application server, and thus the UE IP address may not be provided to the UE as described above. That is, the P-GW performs an IP related operation such as IP address assignment for PDN connection but an IP address (e.g., IPv4 address of IPv6 prefix) may not be provided to the UE.

Next, a packet forwarding method when multiple bearers are configured per UE and multiple PDN connections with multiple APNs (i.e., PDNs identified by the APNs) are established will be described.

First, a downlink packet forwarding method will be described with reference to FIG. 29 again.

When an application server (AS) has a packet that the AS desires to transmit to UEs, the application server (AS) may transmit the downlink packet 2910 to a P-GW.

Here, the downlink packet 2910 may be composed of an IP header 2911 and an IP payload 2912. The IP header 2911 may include a source IP (SIP) and a destination IP (DIP). In addition, the IP header 2911 includes a source port number, a destination port number and a protocol identifier, which are not shown in FIG. 29. Since FIG. 29 illustrates the downlink packet forwarding process, the SIP may be set to the IP address of the AS and the DIP may be set to IP address of a UE. The IP payload 2912 includes content to be forwarded from the AS to UEs.

The P-GW may identify the identity (e.g., IP addresses, IMSIs or the like) of UEs to which the downlink packet needs to be transmitted through the DIP of the IP header 2911 of the downlink packet (or a 5-tuple (i.e., a source IP address, a destination IP address, a source port number, a destination port number and a protocol identifier) included in the IP header 2911).

In addition, the P-GW may identify a single EPS bearer (i.e., EPS bearer ID) configured for a corresponding UE using the SIP and the DIP of the IP header 2911 of the downlink packet. As described above, the EPS bearer ID is one-to-on mapped to an S5/S8 bearer TEID (i.e., GTP-U tunnel), and thus the P-GW may identify the S5/S8 bearer TEID (i.e., GTP-U tunnel) using the DIP of the IP header 2911 of the downlink packet.

In this case, one or more destinations may be mapped per EPS bearer configured for the corresponding UE and may be stored in the P-GW. That is, the P-GW may store information on mapping between the SIP and DIP and an EPS ID. Accordingly, the P-GW can identify an EPS bearer through the packet is delivered using the SIP of a source which has transmitted the packet and the DIP to which the packet needs to be delivered.

The P-GW may decapsulate the downlink packet received from the AS (i.e., remove the IP header (i.e., the source IP address and the destination IP address) of the downlink packet).

In addition, the P-GW can forward the downlink packet 2920 to an S-GW through the S5/S8 bearer (i.e., GTP-U tunnel) identified by the DIP (i.e., UE IP address) of the IP header 2911 of the received downlink packet. Here, the P-GW may forward the downlink packet 2920, which is generated by attaching a GTP tunneling header 2921 and a destination ID for indicating the AS from which the downlink packet has been transmitted to the received downlink packet, to the S-GW.

The GTP tunneling header 2921 includes an SIP, a DIP and a GTP header (GTP-U). Since FIG. 29 illustrates the downlink packet forwarding process, the SIP may be set to the IP address of the P-GW, the DIP may be set to the IP address of the S-GW and the GTP header may be set to the S5 bearer TEID (downlink).

S-GW may identify the ID (e.g., an E-RAB bearer ID and/or an S1 bearer TEID) of a bearer through which the downlink packet needs to be transmitted and the IDs (e.g., IMSIs, S-TMSIs or the like) of UEs through the GTP header (i.e., S5 bearer TEID) included in the GTP tunneling header 2921 of the downlink packet received from the P-GW.

The S-GW may identify an S1 bearer TEID (or E-RAB bearer ID) mapped to the ID of the S5/S8 bearer through which the downlink packet 2920 received from the P-GW is delivered.

In addition, the S-GW may forward the downlink packet 2920 received from the P-GW to eNBs through the identified S1 bearer. Here, the S-GW may forward a downlink packet 2930, which is generated by modifying the GTP tunneling header (or removing the GTP tunneling header 2921 and attaching a new tunneling header 2931) in the downlink packet 2920 received from the P-GW, to eNBs.

Since FIG. 29 illustrates the downlink packet forwarding process, the SIP in the GTP tunneling header may be set to the IP address of the S-GW, the DIP in the GTP tunneling header may be set to the IP address of an eNB and the GTP header in the GTP tunneling header may be set to the S1 bearer TEID (downlink).

The eNBs may identify the ID (e.g., a DRB ID) of a bearer through which the downlink packet needs to be transmitted and the IDs (e.g., C-RNTIs) of UEs through the GTP header (i.e., S1 bearer TEID) included in the GTP tunneling header 2931 of the downlink packet received from the S-GW or an E-RAB ID mapped to the GTP header.

The eNBs remove the GTP tunneling header 2931 from the downlink packet 2930 received from the S-GW and forward a downlink packet 2940 to UEs through the identified bearer (i.e., DRB). That is, the eNBs may attach the identified DRB ID (or LCID) to a payload of the downlink packet received from the S-GW and forward the downlink packet 2940 to the UEs through the corresponding DRB.

Next, an uplink packet forwarding method will be described.

When a UE has a packet that the UE desires to transmit to an AS, the UE may transmit an uplink packet to an eNB through an EPS bearer (i.e., DRB) mapped to the AS.

Here, the uplink packet may include a DRB ID (or LCID) assigned to the UE and a destination ID to which the uplink packet needs to be delivered.

In this case, one or more destinations may be mapped per EPS bearer configured for the corresponding UE and may be stored in the UE. Accordingly, the UE can identify an EPS bearer through which the packet is delivered using a destination ID to which the UE intends to deliver the packet.

Here, the uplink packet may not include an IP header and an IP payload.

The eNB may identify an S1 bearer TEID mapped to the DRB (DRB ID included in the uplink packet) through which the uplink packet received from the UE is delivered.

In addition, the eNB may forward the uplink packet received from the UE to an S-GW through the identified S1 bearer. Here, the eNB may attach a GTP tunneling header to the uplink packet received from the UE and forward the uplink packet to the S-GW.

For example, the SIP in the GTP tunneling header may be set to the IP address of the eNB, the DIP in the GTP tunneling header may be set to the IP address of the S-GW and the GTP header in the GTP tunneling header may be set to the S1 bearer TEID (uplink).

The S-GW may identify the ID (e.g., S5/S8 bearer TEID (uplink)) of a bearer through which the uplink packet needs to be transmitted and the ID (e.g., IMSI, S-TMSI or the like) of the UE from the GTP header (i.e., S1 bearer TEID (uplink)) included in the GTP tunneling header of the uplink packet received from the eNB.

In addition, the S-GW may forward the uplink packet received from the eNB to a P-GW through the identified S5/S8 bearer. Here, the S-GW may modify the GTP tunneling header in the uplink packet received from the eNB and forward the uplink packet to the P-GW.

For example, the SIP in the GTP tunneling header may be set to the IP address of the S-GW, the DIP in the GTP tunneling header may be set to the IP address of the P-GW and the GTP header in the GTP tunneling header may be set to the S5/S8 bearer TEID (uplink).

The P-GW may perform IP encapsulation on the uplink packet received from the S-GW. That is, the P-GW may attach an IP header (i.e., a source IP address and a destination IP address) to the uplink packet received from the S-GW.

Here, the P-GW may identify the IP address of the UE from the GTP header (i.e., S5/S8 bearer TEID (uplink)) included in the GTP tunneling header of the uplink packet received from the S-GW or an EPS bearer ID mapped to the GTP header and identify the destination IP address (i.e., the IP address of the application server) from the destination ID included in the uplink packet.

In addition, the P-GW may transmit an uplink packet received through a point-to-point tunnel to a destination (e.g., the application server). That is, the P-GW may use a tunnel set between the P-GW and a destination indicated by a destination ID (or destination IP address) in order to transmit a received packet to the destination. Accordingly, the P-GW can transmit an uplink packet received through a tunnel specified by a destination ID (or destination IP address) to the destination. Here, the P-GW may store information on mapping between destination IDs (or destination IP addresses) and tunnels.

In addition, a packet does not include a source IP address and a destination IP address in a connection other than a packet transmission and reception connection between the P-GW and the application server, and thus the UE IP address may not be provided to the UE as described above. That is, the P-GW performs an IP related operation such as IP address assignment for PDN connection but an IP address (e.g., IPv4 address of IPv6 prefix) may not be provided to the UE.

FIG. 30 is a diagram exemplifying an IP address handling method according to an embodiment of the present invention.

Referring to FIG. 30, a P-GW receives downlink data in which an IP header including an IP address of a UE has been encapsulated from an application server (S3001).

Here, the IP header may include a source IP address and/or a destination IP address (or one or more of a source port number, a destination port number and a protocol identifier in addition to the source IP address and/or the destination IP address). Here, the destination IP Address may be set to the IP address of the UE because the received data is downlink data.

In addition, if the received downlink data is downlink data for non-IP PDN connection, the P-GW may remove the IP header from the downlink data. Here, information for identifying the downlink data as non-IP data (e.g., a port number for non-IP data) may be encapsulated in the downlink data and the P-GW can identify the downlink data for non-IP PDN connection through the information for identifying non-IP data (e.g., a port number for non-IP data).

Here, an AS address and/or the IP address of the UE can identify a packet data network (PDN) of the UE.

As described above, a single bearer may be assigned per PDN connection. In this case, a bearer ID assigned to PDN connection of the UE may be identified from the AS address and/or the IP address of the UE included in the downlink data.

In addition, when the IP address handling method according to the present invention is used, the IP address of the UE is assigned by the P-GW but may not be provided to the UE.

The P-GW removes (i.e., decapsulates) the IP header from the downlink data (S3002).

Here, the P-GW can remove (i.e., decapsulate) the IP header when the information for identifying the downlink data as non-IP data (e.g., a destination port number for non-IP data) has been encapsulated in the downlink data received from the AS.

The P-GW transmits the downlink data from which the IP header has been removed to an S-GW through the bearer identified by the IP address of the UE (S3003).

That is, in order to transmit the downlink data from which the IP header has been removed to the UE, the P-GW may transmit the downlink data from which the IP header has been removed to the S-GW through the bearer identified by the IP address of the UE.

Here, the P-GW may identify a bearer (e.g., an EPS bearer ID configured per UE or a group bearer ID configured for each of one or more UE groups) mapped to the IP address of the UE and/or the source IP address included in the received downlink packet and/or a UE to which the downlink packet is delivered.

The following downlink packet forwarding process may be performed according to the process described in FIG. 20, 21, 33 or 34.

For example, the P-GW may identify PDN connection of the UE from the source IP address (i.e., AS address) and/or the IP address of the UE. In addition, the P-GW may transmit the downlink data to the UE through the bearer assigned to the PDN connection.

FIG. 31 is a diagram exemplifying an IP address handling method according to an embodiment of the present invention.

Referring to FIG. 31, a P-GW receives uplink data from which an IP address including an IP address of a UE has been removed from an S-GW (S3101).

Here, the IP header may include a source IP address and a destination IP address (or a source port number, a destination port number and a protocol identifier in addition thereto). Here, the destination IP address may be set to the IP address of the UE because the data is downlink data.

Here, an AS address and/or the IP address of the UE can identify a packet data network (PDN) of the UE.

As described above, a single bearer can be assigned per PDN connection. In this case, corresponding PDN connection may be identified from the ID of a bearer through which the uplink data is delivered. In addition, the AS address and/or the IP address of the UE according to (or mapped to) the corresponding PDN connection may be identified.

In addition, when the IP address handling method according to the present invention is used, the IP address of the UE is assigned by the P-GW but may not be provided to the UE.

The P-GW encapsulates the IP header in the uplink data (S3102).

Here, the P-GW may attach the IP header to the received uplink data when the received uplink data is uplink data for non-IP PDN connection.

As described above, a single bearer can be assigned per PDN connection. The P-GW may identify PDN connection from the ID of a bearer through which the uplink data received from the S-GW is delivered (e.g., an S5/S8 bearer TEID (uplink) or an EPS bearer ID). That is, when non-IP PDN connection is identified from the ID of the bearer through which the uplink data is delivered, the P-GW can attach (i.e., encapsulate) the IP header to the uplink data. Here, the P-GW may attach information for identifying non-IP data (e.g., a port number for non-IP data) to the uplink data.

In addition, the P-GW may encapsulate an IP header including the IP address of the UE and/or a destination IP (i.e., the IP address of an application server) according to PDN connection in the uplink data.

The P-GW transmits the IP header encapsulated uplink data to the application server (S3103).

Here, the IP header encapsulated uplink data may be delivered to the application server through a predetermined tunnel (i.e., a point-to-point tunnel).

Overview of Devices to which the Present Invention can be Applied

FIG. 32 illustrates a block diagram of a communication device according to one embodiment of the present invention.

With reference to FIG. 32, a wireless communication system comprises a network node 3210 and a plurality of UEs 3220.

A network node 3210 comprises a processor 3211, memory 3212, and communication module 3213. The processor 3211 implements proposed functions, processes and/or methods proposed through FIG. 1 to FIG. 31. The processor 3211 can implement layers of wired/wireless interface protocol. The memory 3212, being connected to the processor 3211, stores various types of information for driving the processor 3211. The communication module 3213, being connected to the processor 3211, transmits and/or receives wired/wireless signals. Examples of the network node 3210 include an eNB, MME, HSS, SGW, PGW, application server and so on. In particular, in case the network node 3210 is an eNB, the communication module 3213 can include an Radio Frequency (RF) unit for transmitting/receiving a radio signal.

The UE 3220 comprises a processor 3221, memory 3222, and communication module (or RF unit) 3223. The processor 3221 implements proposed functions, processes and/or methods proposed through FIG. 1 to FIG. 31. The processor 3221 can implement layers of wired/wireless interface protocol. The memory 3222, being connected to the processor 3221, stores various types of information for driving the processor 3221. The communication module 3223, being connected to the processor 3221, transmits and/or receives wired/wireless signals.

The memory 3212, 3222 can be installed inside or outside the processor 3211, 3221 and can be connected to the processor 3211, 3221 through various well-known means. Also, the network node 3210 (in the case of an eNB) and/or the UE 3220 can have a single antenna or multiple antennas.

FIG. 33 illustrates a block diagram of a wireless communication apparatus according to an embodiment of the present invention.

Particularly, in FIG. 33, the UE described above FIG. 32 will be exemplified in more detail.

Referring to FIG. 33, the UE includes a processor (or digital signal processor) 3310, RF module (RF unit) 3335, power management module 3305, antenna 3340, battery 3355, display 3315, keypad 3320, memory 3330, Subscriber Identification Module (SIM) card 3325 (which may be optional), speaker 3345 and microphone 3350. The UE may include a single antenna or multiple antennas.

The processor 3310 may be configured to implement the functions, procedures and/or methods proposed by the present invention as described in FIG. 1-31. Layers of a wireless interface protocol may be implemented by the processor 3310.

The memory 3330 is connected to the processor 3310 and stores information related to operations of the processor 3310. The memory 3330 may be located inside or outside the processor 3310 and may be connected to the processors 3310 through various well-known means.

A user enters instructional information, such as a telephone number, for example, by pushing the buttons of a keypad 3320 or by voice activation using the microphone 3350. The microprocessor 3310 receives and processes the instructional information to perform the appropriate function, such as to dial the telephone number. Operational data may be retrieved from the SIM card 3325 or the memory module 3330 to perform the function. Furthermore, the processor 3310 may display the instructional and operational information on the display 3315 for the user's reference and convenience.

The RF module 3335 is connected to the processor 3310, transmits and/or receives an RF signal. The processor 3310 issues instructional information to the RF module 3335, to initiate communication, for example, transmits radio signals comprising voice communication data. The RF module 3335 comprises a receiver and a transmitter to receive and transmit radio signals. An antenna 3340 facilitates the transmission and reception of radio signals. Upon receiving radio signals, the RF module 3335 may forward and convert the signals to baseband frequency for processing by the processor 3310. The processed signals would be transformed into audible or readable information outputted via the speaker 3345.

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the methods of transmitting/receiving uplink data/downlink data in a wireless communication system of the present invention have been described on the basis of examples applied to 3GPP LTE/LTE-A systems, the methods can be applied to various wireless communication systems in addition to the 3GPP LTE/LTE-A systems.

The invention claimed is:

1. A method for transmitting downlink (DL) data in a wireless communication system, the method performed by a packet data network (PDN) gateway (P-GW) and comprising:
receiving DL data in which an Internet protocol (IP) header including an IP address of a user equipment (UE) has been encapsulated from an application server;
removing the IP header from the received DL data;
determining one of a plurality of groups to which the UE belongs based on the IP address;
generating revised DL data by incorporating an identifier of the UE into the received DL data to identify the UE in the one of a plurality of groups;
updating a group context for the UE when an evolved-NodeB (eNB) serving the UE changes; and
transmitting the revised DL data to a serving gateway (S-GW) through a group bearer configured for the one of a plurality of groups in order to transmit the revised DL data to the UE,
wherein the IP header is not incorporated into the revised DL data when the DL data is for a non-IP PDN connection,
wherein the IP header is incorporated in the revised DL data when the DL data is for an IP PDN connection,
wherein a different path is configured for each group bearer from the P-GW to the UE,
wherein all UEs belonging to a same evolved-NodeB (eNB) are configured to a same group,
wherein a tracking area update (TAU) procedure is performed when the eNB serving the UE changes,
wherein a dedicated radio resource pool is configured for each of the plurality of groups,
wherein a resource for transmitting uplink data is arbitrarily selected from the dedicated radio resource pool configured for a group to which the UE belongs, and
wherein updating the group context comprises:
receiving, from a serving gateway, a group context updating request including an in-group UE ID for identifying the UE in a group to which the UE belongs and a group ID for identifying a group bearer,
checking whether the group context of the group to which the UE belongs has been generated;
updating the UE information in the group context; and
transmitting a group context updating response message to the serving gateway.

2. The method of claim 1, wherein the IP address identifies a PDN connection of the UE.

3. The method of claim 1, further comprising assigning the IP address but not providing the assigned IP address to the UE.

4. The method of claim 1, wherein:
a same group bearer is configured for two or more of the plurality of groups;
the two or more of the plurality of groups are identical over an entire section of a network node; and
the two or more of the plurality of groups are different for sections between network nodes.

5. The method of claim 1, wherein information informing whether a group bearer is applied to the UE is transmitted from the UE to a network or preconfigured in subscription information of the UE.

6. The method of claim 1, wherein a group comprises one or more UEs for which a same default access point name is configured or one or more UEs requiring a same quality of service.

7. The method of claim 1, wherein the group bearer always maintains an activated state or is deactivated from the activated state for a predetermined time and re-activated after the predetermined time.

8. The method of claim 1, wherein the revised DL data is transmitted through one or more intermediate nodes on a path configured for the group bearer.

9. The method of claim 1, wherein the revised DL data is transmitted through one or more intermediate nodes on a path configured for the group bearer.

10. A packet data network (PDN) gateway (P-GW) apparatus for transmitting downlink (DL) data in a wireless communication system, the apparatus comprising:
a communication module configured to transmit and receive signals; and
a processor configured to:
control the communication module to receive DL data in which an Internet protocol (IP) header including an IP address of a user equipment (UE) has been encapsulated from an application server;

remove the IP header from the received DL data;
determine one of a plurality of groups to which the UE belongs based on the IP address;
generate revised DL data by incorporating an identifier of the UE into the received DL data to identify the UE in the one of a plurality of groups;
update a group context for the UE when an evolved-NodeB (eNB) serving the UE changes; and
control the communication module to transmit the revised DL data to a serving gateway (S-GW) through a group bearer configured for the one of a plurality of groups in order to transmit the revised DL data to the UE,
wherein the IP header is not incorporated into the revised DL data when the DL data is for a non-IP PDN connection,
wherein the IP header is incorporated in the revised DL data when the DL data is for an IP PDN connection,
wherein a different path is configured for each group bearer from the P-GW to the UE,
wherein all UEs belonging to a same evolved-NodeB (eNB) are configured to a same group,
wherein a tracking area update (TAU) procedure is performed when the eNB serving the UE changes,
wherein a dedicated radio resource pool is configured for each of the plurality of groups,
wherein a resource for transmitting uplink data is arbitrarily selected from the dedicated radio resource pool configured for a group to which the UE belongs, and
wherein updating the group context comprises:
   receiving, from a serving gateway, a group context updating request including an in-group UE ID for identifying the UE in a group to which the UE belongs and a group ID for identifying a group bearer,
   checking whether the group context of the group to which the UE belongs has been generated;
   updating the UE information in the group context; and
   transmitting a group context updating response message to the serving gateway.

11. The apparatus of claim 10, wherein the IP address identifies a PDN connection of the UE.

12. The apparatus of claim 10, wherein the processor is further configured to assign the IP address but is not provide the assigned IP address to the UE.

13. The apparatus of claim 10, wherein the revised DL data is transmitted through one or more intermediate nodes on a path configured for the group bearer.

14. The apparatus of claim 10, wherein:
a same group bearer is configured for two or more of the plurality of groups;
the two or more of the plurality of groups are identical over an entire section of a network node; and
the two or more of the plurality of groups are different for sections between network nodes.

15. The apparatus of claim 10, wherein information informing whether a group bearer is applied to the UE is transmitted from the UE to a network or preconfigured in subscription information of the UE.

16. The apparatus of claim 10, wherein a group comprises one or more UEs for which a same default access point name is configured or one or more UEs requiring a same quality of service.

17. The apparatus of claim 10, wherein the group bearer always maintains an activated state or is deactivated from the activated state for a predetermined time and re-activated after the predetermined time.

\* \* \* \* \*